United States Patent [19]

Peterson et al.

[11] Patent Number: 4,897,834
[45] Date of Patent: Jan. 30, 1990

[54] BIT ORIENTED COMMUNICATIONS NETWORK

[75] Inventors: James R. Peterson, Brown Deer, Wis.; Richard C. Harwell, Broken Arrow, Okla.

[73] Assignee: Allen-Bradley Company, Inc., Milwaukee, Wis.

[21] Appl. No.: 87,034

[22] Filed: Aug. 18, 1987

[51] Int. Cl.$^4$ ............................................... H04J 3/02
[52] U.S. Cl. ................................. 370/85.1; 340/825.5
[58] Field of Search .................. 370/85, 110.1, 94, 86, 370/825.5

[56] References Cited

U.S. PATENT DOCUMENTS

| | | | |
|---|---|---|---|
| 4,319,338 | 3/1982 | Grudowski et al. | 364/900 |
| 4,354,226 | 10/1982 | Flickinger et al. | 364/200 |
| 4,477,882 | 10/1984 | Schumacher et al. | 364/900 |
| 4,550,366 | 10/1985 | Toyama | 364/136 |
| 4,550,380 | 10/1985 | Bukowski et al. | 364/494 |
| 4,577,281 | 3/1986 | Bukowski et al. | 364/494 |
| 4,591,967 | 5/1986 | Mattes et al. | 364/132 |
| 4,603,394 | 7/1986 | Bukowski et al. | 364/494 |
| 4,635,189 | 1/1987 | Kendall | 364/200 |
| 4,641,307 | 2/1987 | Russell | 370/85 |
| 4,663,704 | 5/1987 | Jones et al. | 364/188 |
| 4,680,253 | 2/1987 | Fulton et al. | 370/85 |
| 4,725,834 | 2/1988 | Chang et al. | 370/85 |

OTHER PUBLICATIONS

Houser, Kirk D., "Data Highway Provides Database Management", Computer Design, Nov. 1983.
Morris, Henry M., "Distributed System Makes Wide Use of Bubble Memory", Control Engineering, Jan. 1982.
David R. Porter et al., "A High-Speed Fiber Optic Data Bus for Local Data Communications", IEEE Journal on Selected Areas in Communications, vol. SAC-1, No. 3, Apr. 1983, pp. 485 et seq.
Stanislav I. Samoylenko, "Time-Token Multiple Access", The New World of the Information Society Proceedings of the Seventh International Conference on Computer Communication, Sydney, Australia, Oct. 30, 1984.
Paul J. Nicholson, "The AGORA Fiber Optic Local Area Network-Information Marketplace", Synmark Sales Co., Oct. 1983.

Primary Examiner—Joseph A. Orsino
Assistant Examiner—Frank M. Scutch, III
Attorney, Agent, or Firm—Quarles & Brady

[57] ABSTRACT

A bit oriented communications network includes a plurality of nodes interconnected by a broadcast communications medium. Each node samples inputs connected to it and broadcasts the values of those inputs. All of the nodes then monitor the broadcasts and map selected bits to outputs connected locally through an output mapping process. Connections are established between inputs and outputs by the output mapping process, and such connections may be changed simply by changing the output mapping selections. Both the input and output bits may be either physical devices or, as described in a second embodiment, may be exchanged with an external system through a shared memory. A Dynamic Time Division Multiple Access (DTDMA) time slot allocation scheme is used to synchronize transmissions from each node in a round robin fashion. Each node is allocated one time slot for transmission and maintains a current time slot value in a gap timer. The gap timers of all nodes are synchronized by monitoring a source address field in the round robin broadcasts.

38 Claims, 26 Drawing Sheets

NETWORK MESSAGE FORMATS

| SLOT # | CONTENTS |
|---|---|
| 0 | PROGRAM FRAME |
| 1 | DATA FRAME - NODE INPUT VALUES |
| 2 | DATA FRAME - NODE 2 INPUT VALUES |
| 3 | DATA FRAME - NODE 3 INPUT VALUES |
| 4 | DATA FRAME - NODE 4 INPUT VALUES |
| 0 | PROGRAM FRAME |
| 1 | DATA FRAME - NODE 1 INPUT VALUES |
FIG. 3A
TIME SLOT CONTENTS
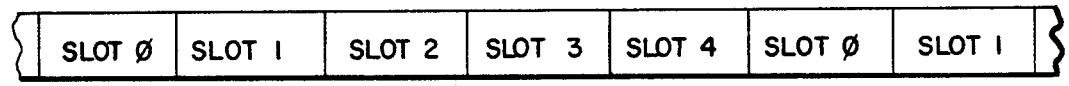
FIG. 3B   NORMAL TIME SLOT ALLOCATION
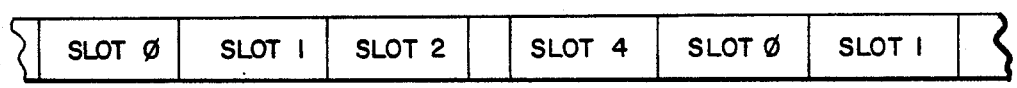
FIG. 3C   TIME SLOT ALLOCATION WITH ONE SLOT MISSING
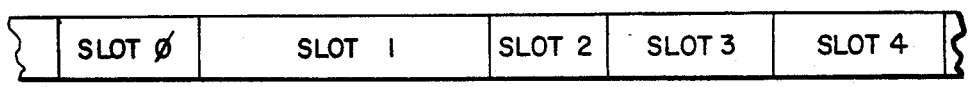
FIG. 3D   TIME SLOT ALLOCATION WITH UNEQUAL SLOT LENGTHS

NODE INTERNAL TIMEKEEPING

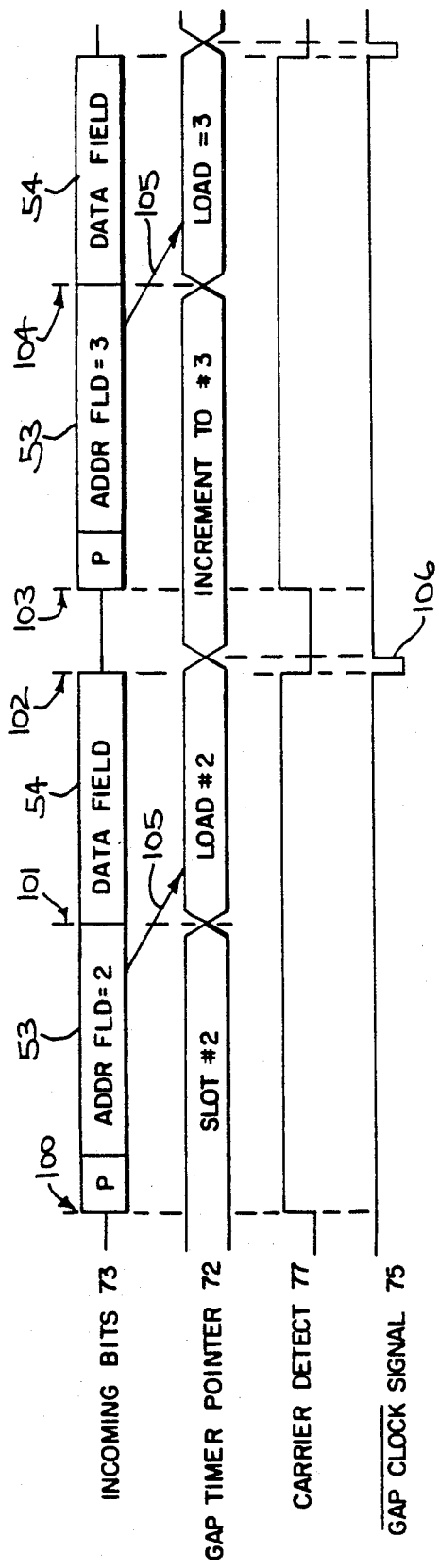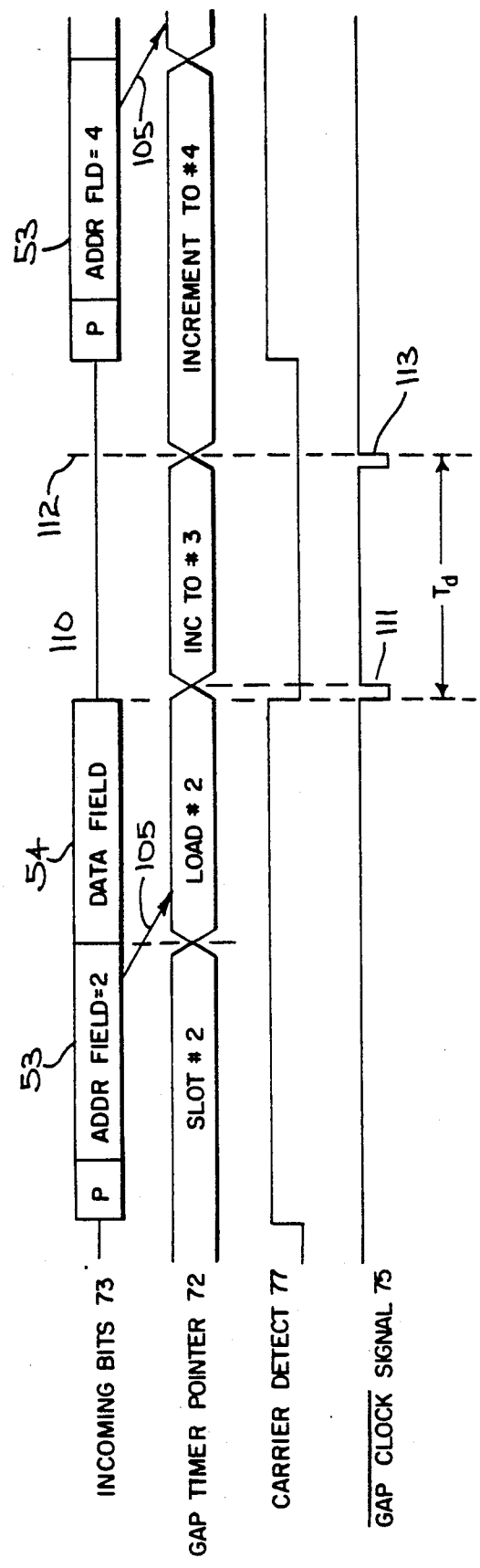
FIG. 5A NORMAL TIME SLOT ALLOCATION
FIG. 5B TIME SLOT ALLOCATION WITH ONE SLOT MISSING

TRANSMIT STATE DIAGRAM

BIT ORIENTED COMMUNICATIONS NETWORK

BACKGROUND OF THE INVENTION

The field of the invention is communications networks, and more particularly, bit oriented communications networks for use in industrial environments.

Industrial installations typically contain a large number of electrical devices which must be connected together. These devices can generally be classified as input resources and output resources. Examples of input resources typically used are switches of many types, relay contacts, and signals generated by controllers used in the installation. Typical output resources include relay coils, indicator lamps, and again, signals fed into controllers. The nature of the connections between the input and output resources is largely bit oriented, consisting of single bits, or on/off values for the various switches, relays, and indicators.

Originally, connections were made between the various input and output resources using discrete wiring. Individual wires were run between each input point and output point. This of course results in large wire bundles and enormous amounts of wiring which is very difficult to change should future alteration be desired.

Communications networks have been used to perform Input and Output (I/O) from controllers, however this approach requires a large and usually quite expensive controller to, in effect, replace the discrete connectios. in operation, the controller must first read the values of the input resources into is own processor and then transmit to the output resources.

While this approach is generally satisfactory, there are several drawbacks. First of all is the cost of obtaining and programming the controller. Secondly, if there are many input and output resources, the processing loop of the controller can become very long, which means that servicing time needed to detect a change in the state of an input resource is equally long.

Other examples of known communications networks include many types of token passing logical ring networks, Carrier Sense Multiple Access with Collision Detection (CSMA/CD) networks such as Ethernet, and Dynamic Time Slot Allocation (DTSA) networks. Prior applications of these communications networks have been primarily word oriented. In addition, most prior networks communicate on a point-to-point basis, with messages specifically addressed from one network node to another. This is also not practical for large bit level communications systems, as the large number of messages required would slow servicing time to unacceptable levels.

SUMMARY OF THE INVENTION

A bit oriented communications network of the present invention provides for bit level communications between input resources and output resources. A plurality of nodes make up the network and are all connected by a broadcast communications medium. At least one of the nodes on the network includes input mapping means for accepting one or more data bits from the input resource. These data bits are then assembled into a data field.

The nodes which have input mapping means also have transmissions means for broadcasting a message on the network. The message includes the data field developed by the input mapping means and a source address field which identifies the sending node.

At least one node on the network includes reception means for receiving the messages broadcast onto the network. The nodes which have reception means also include output mapping means for then extracting the data field from the received message and mapping the data bits from the data field to the output resource.

An object of the invention is to provide a bit oriented communications network to replace discrete wiring used to connect input resources with output resources.

Another object of the invention is to provide a bit oriented communications network which is highly efficient in the utilization of the network bandwidth. By broadcasting input values onto the network, each receiving node may "grab" any input desired without the need for specifically addressed messages or acknowledgements from the sending node. This reduces both the number of messages required and the amount of overhead information in each message.

The input resource may be a physical input bit, in which case the input mapping means includes level translator means for converting the physical input bit into a binary value to be included in the data field. The input resource may also be an external system which contains a shared memory common to both the external system and the input mapping means. In the latter case, the data bits are obtained by the input mapping means directly from the shared memory.

Similarly, the output resource may be either a shared memory of an external system or a physical output bit. For output mapping to a physical bit, the output mapping means includes selection means, and the selection means in turn maintains a map address. The map address contains information which specifies the identity of exactly one data bit. Each received message is then examined by the selection means and if the data bit identified by the map address is received, the output mapping means directs the contents of the selected data bit to the physical output bit.

Yet another object of the invention is to allow connections between input resources and output resources to be quickly and easily established and changed. The above described mapping to a physical output bit in essence establishes a "connection" between the selected data bit at the input resource and the physical output bit. Such connections may be established and changed simply by changing the map address instead of having to rewire discrete wiring.

Still another object of the invention is to provide a capability to change the mapping assignment to a physical output bit remotely, utilizing the network. A programming terminal may be used to change the map address used by the selection means described above. The programming terminal generates programming information which includes a new map address and a destination field. The destination field indicates the selection means to which the new map address is directed. A programming port on one node of the network accepts the programming information and assembles it into a programming message, which is then broadcast onto the network. All of the selection means on the network examine each received message. If a programming message is received, and if the programming information contained therein is directed to the selection means, then the map address is updated with the new map address.

Another advantage of the invention is the ability to achieve time synchronization between all of the nodes on the network so that each node may be allocated a time slot for broadcasting. Each node then takes a turn at broadcasting, and the time slots progress in a round robin fashion. To accomplish this, each node includes reception means, and the reception means in turn includes a gap timer and a gap clock. The gap timer maintains a current time slot value which indicates the currently active time slot. Each message received by the reception means includes a source address field which identifies the sending node. When a message is received, the current time slot value is updated to a time slot value corresponding to the sending node. Since the message was broadcast, all nodes receive it at essentially the same time and therefore synchronization to the same current time slot value is achieved. At the end of the message, that time slot is considered to be over, and the gap clock means increments the gap timer to the next time slot in the round robin sequence. The transmission means then examines the gap timer to determine when the node's own time slot for broadcasting is active. Each node is allocated a unique fixed time slot in which to broadcast, and if the current time slot value is equal to that fixed time slot, then broadcasting is commenced.

Another advantage of the invention is to provide a synchronized network as described above in which one or more time slots may be eliminated to increase network utilization. If a node should fail to begin broadcasting before a fixed, predetermined amount of time elapses, the gap clock increments the gap timer to the next time slot in the round robin sequence. The predetermined amount of time is chosen to be greater than twice the maximum one way propagation delay between any two nodes on the network so that it is guaranteed that all nodes heard the end of the message and have had adequate time to hear the beginning of another message.

Yet another advantage of the invention is the ability to dynamically alter the length of each time slot. Since the length of each time slot is determined by the length of time that each individual node broadcasts, time slot lengths can be varied at will by each node without loss of synchronization.

The foregoing and other objects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims herein for interpreting the scope of the invention.

BRIEF DESCRIPTION OF THE DRAWINGS

FIG. 3A is a table of slot numbers with the corresponding contents of the network of FIG. 1;

FIG. 3B is a schematic diagram showing the normal time slot allocation on the network of FIG. 1;

FIG. 3C is a schematic diagram showing the time slot allocation for the network of FIG. 1 with one slot missing;

FIG. 3D is a schematic diagram showing the time slot allocation for the network of FIG. 1 with unequal slot lengths;

FIG. 5A is a timing diagram for the normal time slot allocation of FIG. 3B;

FIG. 5B is a timing diagram for the time slot allocation with one slot missing of FIG. 3C;

GENERAL DESCRIPTION OF THE INVENTION

Figure 1:
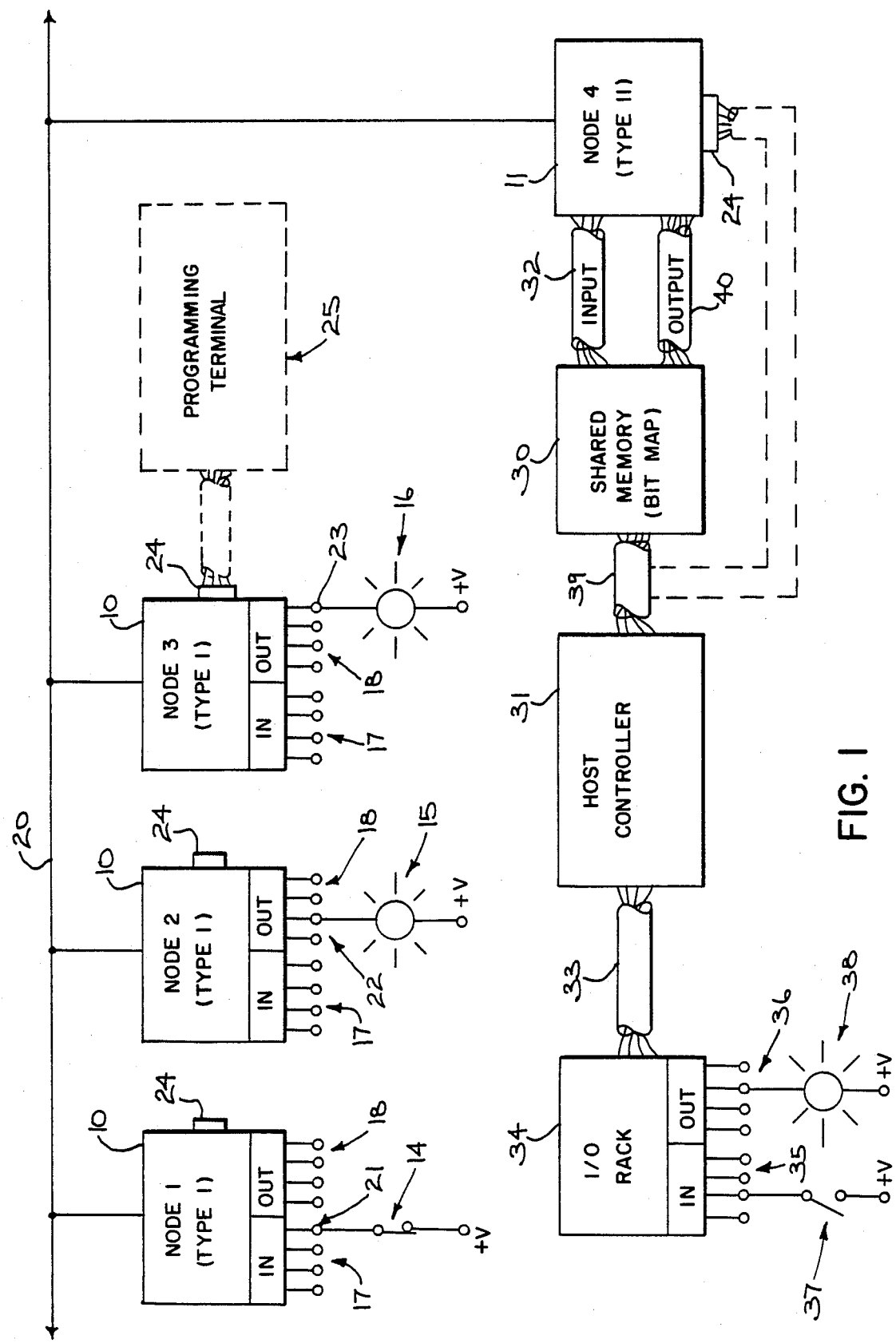
FIG. 1 is a block diagram of a bit oriented communications network of the present invention.

FIG. 1 shows an example bit level network according to this invention. The bit level network includes two types of nodes 10 and 11, designated herein as Type I nodes 10 and Type II nodes 11. The type I nodes, node #'s 1-3, are a simpler embodiment which connect directly to I/O devices 14, 15 and 16. Typical input devices represented by switch 14 may be, for example, toggle switches, limit switches, sensor switches, relay contacts, or the like. Similarly, lamps 15 and 16 represent typical output devices such as, for example, relay coils, motor starters, indicator lamps, or the like.

One objective of the bit level network of this invention is to replace the discrete wiring which would otherwise be required between the various input and output devices. Instead, each Type I node 10 samples input states 17 and converts that information into binary on-/off values (i.e. single bits). The logic bits are then broadcast in a periodic fashion onto a bus 20. Other nodes 10 on the bus 20 can select any one of the broadcast logic bits and convert the selected logic bit into one or more output signals 18. The output signals 18 are of the proper voltage and current to drive the outputs 15 and 16. By programming the receiving nodes 10 to select the desired input bit in this manner, "connections" are established between input and output devices 14, 15 and 16. For example, switch 14 is connected to node #1, input #4, shown at 21. When node #1 broadcasts its input values onto the bus 20, it prefixes its own node address onto those input values so that the other nodes 10 on the bus 20 know that these input values are from node #1. Similarly, lamp 15 is connected to node #2, output #2, shown at 22. In this example, node #2 is programmed to monitor the bus 20, and when the broadcast from node #1 is heard, to select the input value corresponding to input #4 21 and apply it to output #2 22. As a further example, lamp 16 is connected to node #3, output #4 shown at 23. Node #3 could then also be programmed to select the same bit from node #1, input #4 21, and lamp 16 would then also be connected to switch 14. "Connections" can be changed by re-programming the nodes 10 to select a different input bit, which is much easier than changing discrete wiring.

Type I nodes also include a programming port 24 for connecting to an optional programming terminal 25. The programming terminal 25 is used to formulate special programming messages. The programming messages are loaded into the nodes 10 through the programming ports 24 and are subsequently broadcast out over the bus 20. The programming messages contain information directing one of the nodes 10 to re-program one of its outputs 18. In this way, connections on the network can be both downloaded and changed dynamically. A programming terminal 25 is only needed if such reprogramming features are desired. If a programming terminal 25 is not used, then re-programming may still be done manually at each node, for example, by using switches to program the outputs 18.

A Type II node, for example node #4, is more complex than a Type I node 10 in that bit level I/O data is obtained through a shared memory 30 instead of being connected directly to the I/O devices. The Type II node 11 places all logic bits received over the bus 20 into the shared memory 30 at dedicated locations via an input bus 32. The shared memory 30 thus contains a bit map, which represents the logical values of every input on the network.

A host controller 31 connects to the shared memory 30 over a host controller system bus 39 and therefore has access to all of the input values stored there. Those input values can then be processed in the host controller 31 just as if the actual devices were connected directly. The host controller 31 also connects over a separate, dedicated bus 33 to an I/O rack 34. The I/O rack 34 provides physical inputs 35 and physical outputs 36, which are in turn connected to physical I/O devices, represented by switch 37 and lamp 38. The input values stored in the shared memory 30 can then be mapped to the outputs 36 by the host controller 31.

Similarly, the host controller 31 can place its own output values into the shared memory 30 for the Type II node to broadcast onto the bus 20. Those host controller output values may be either generated from within the host controller itself, obtained from the physical inputs 35, or a combination of both. The host controller output values are placed in a dedicated location in the shared memory 30. When it is time for the Type II node 11 to take its turn at broadcasting inputs, it reads the input values from the shared memory 30 over an output bus 40 and broadcasts those input values out over the bus 20.

A Type II node 11 also has a programming port 24 for the input of programming data. In the example network of FIG. 1, the host controller system bus 39 may optionally be extended to connect to the programming port 24 of Type II node 11. Programming data can then be sent directly from the host controller 31 to the Type II node 11. Alternatively, the programming terminal 25 could be connected to the programming port 24 of the Type II node 11 (not shown).

In either the Type I node 10 or the Type Ii node 11, inputs 17 or the shared memory 30, as appropriate, are sampled and the corresponding logic bits are broadcast on a round robin basis, each node 10 and 11 taking a turn at transmitting its logic bits onto the bus 20. The amount of time needed to complete a round robin sampling of all inputs is short, usually less than 10 milliseconds, and depends only upon the total number of inputs being broadcast on the network 20.

The output signals 18 and the shared memory 30 are thereby kept almost continually refreshed, and any change in state of a physical input 17 or an input from the shared memory 30 is reflected in a change in the corresponding output signal 18 and the shared memory 30 in not more than the round robin sampling time.

Moreover, since all input values from the physical inputs 17 and the inputs from the shared memory 30 are broadcast from each node 10 and 11 in turn, all input values 17 are available on the bus 20. Connections can therefore be established between any input and any output. Each node 10 and 11 also monitors its own broadcast, so connections can even be made between inputs 17 and outputs 18 within a node.

As will be explained in detail below, a variety of node types other than the Types I and II can be constructed according to this invention. Node Types I and II, and other node types, vary primarily on internal details of how the programming, or mapping, which routes input bits to the desired output is performed. However, all node types conform to common formats for messages on the bus 20. The result is that all node types are interoperable with each other. For example, lamps 15 and 16 on Type I nodes #2 and #3 may be "mapped" from inputs in the shared memory 30 which are broadcast by Type II node #4.

Figure 2:
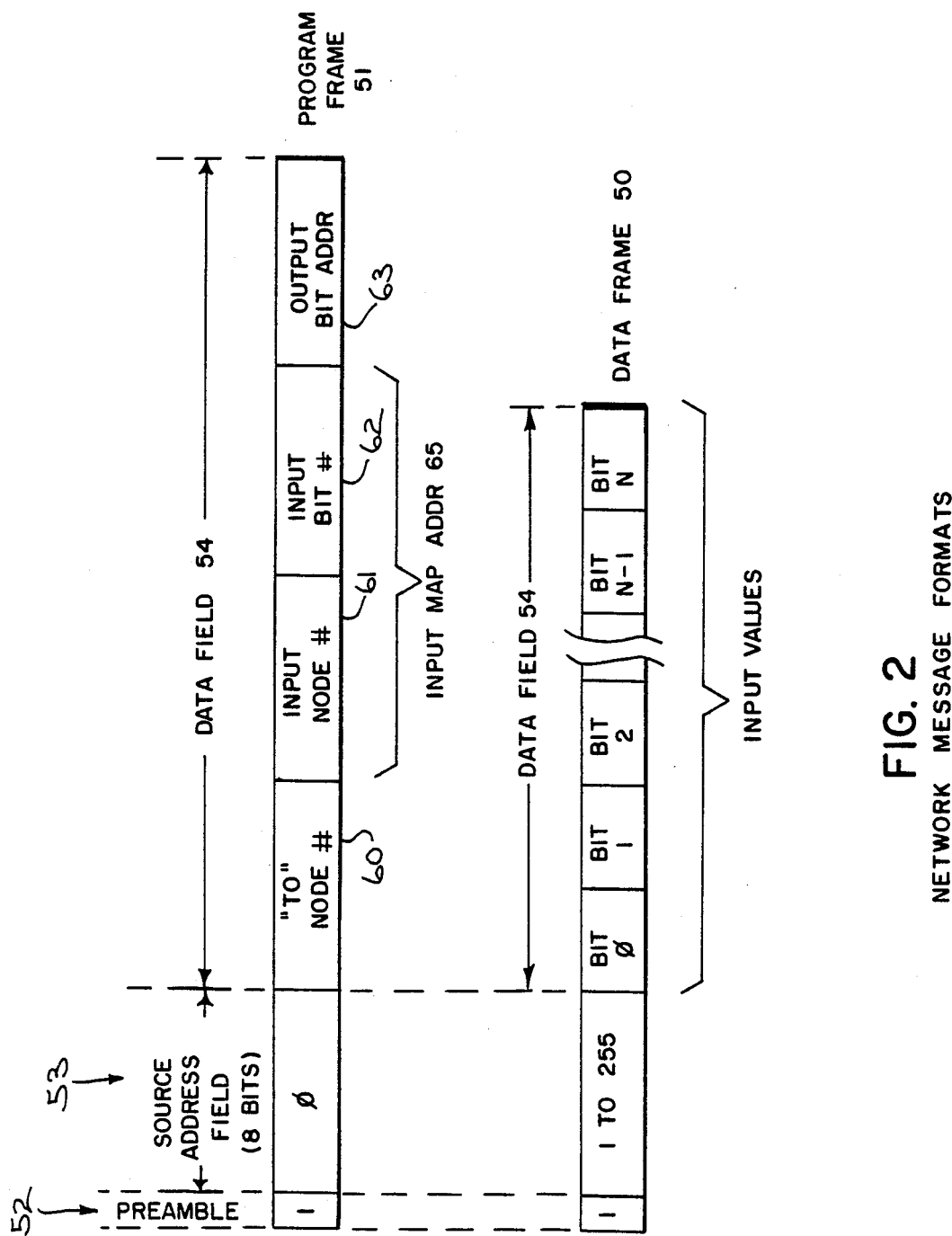
FIG. 2 is schematic diagram of the message formats on the network of FIG. 1.

Referring to FIG. 2, the common formats for all messages on the bus 20 are the data frame format 50 and the program frame format 51. Of these, the data frame 50 is used to broadcast input values, and the program frame 51 is used to send programming information. As the programming information is only sent to change mapping assignments, programming frames account for a very small fraction of the total message traffic on the bus 20. The vast majority of message traffic consists of data frames 51 being broadcast as each node 10 and 11 takes its turn in the round robin sampling of inputs.

Both the data frame 50 and the program frame 51 consist of a preamble field 52, a source address field 53, and a data field 54. The preamble field is a single bit, the value of which is always "1". The preamble bit 52 is the first bit in both the data frame 50 and program frame 51 and is used to allow the receiving nodes to synchronize to the incoming data stream.

The next eight bits in both the data frame format 50 and program frame format 51 are the source address field 53. The source address field 53 is used to identify the source node of the frame 50 or 51. Each node on the network is assigned a unique node number, or address, which is inserted into the source address field 53 when a frame 50 or 51 is prepared for broadcast.

In order to distinguish a program frame 50 from a data frame 51, a unique, fixed node address is assigned as designating a program frame 51. In this embodiment, the fixed address used to designate a program frame 50 is "zero". Therefore, a source address field 53 of zero indicates that the message is a program frame 51 which originated from a programming port 24. If the source address field 53 is not zero, e.g. 1–255, then the message is a data frame 50 and the source address field 53 indicates the node #, or address, of the node which broadcast it. It should be apparent to one skilled in the art that a fixed address other than zero may be used to designate a program frame 51.

The data field 54 for a data frame 50 consists of a string of bits numbered O–N which represent the input values to be broadcast. While there is no fundamental limit to the size of the number N, a practical limit of 255 has been adopted in the embodiments described below for simplicity and to limit the amount of time needed to complete a round robin sampling cycle. Each of the bits, Bit O to Bit N, is ordered in data field 54 in ascending sequential order so that the bit number of any particular bit can be ascertained at the receiving station by counting the number of bits from the start of the data field 54. The resulting data frame 50 is extremely efficient in that it excludes unnecessary overhead information which would otherwise lengthen the data frame 50 and increase the round robin sampling time.

The data field 54 for a program frame 51 consists of four subfields: a "to" node # subfield 60, an input node # subfield 61, an input bit # subfield 62, and an output bit address subfield 63. The "to" node # subfield 60 specifies the destination, or target node, for the program frame 51. Only the node whose address is specified in the "to" node # subfield 60 will respond to the program frame 51; nonaddressed nodes will ignore it.

A program frame 51 is used to communicate programming information to the node specified in the "to" node # subfield 60. If the "to" node # subfield 60 specifies a Type I node 10, then the program frame 51 will program, or map, an output bit 18 at that node 10. Since a Type II node 11 already places all received input values into the shared memory 30, the program frame 51 is not used for mapping by Type II nodes. Instead, the program frame 51 is written into the shared memory 30 at a dedicated location just like any other incoming data. Then, the host controller 31 can read the program frame 51 from the shared memory 30, and decode and implement the programming information contained therein.

The output bit address subfield 63 identifies the specific output bit at the "to" node 60 which is being programmed, or mapped into. The input node # subfield 61 and the input bit # subfield 62 together specify a complete input map address 65, e.g. the address of the node (input node #61) which contains the desired input bit and the address of that bit within the node (input bit #62). The input map address 65 indicates which input bit is being assigned, or mapped, by the program frame 51. For Type I nodes, the node 10 to which the program frame 51 is addressed responds by saving the input map address 65 as the new connection for the output 18 specified by the output bit address 63.

Referring to FIGS. 3A and 3B, in order to provide an orderly control over the periodic broadcast of messages on the bus 20, a time slot allocation scheme is incorporated as a part of this invention. The particular method of time slot allocation used is described below, and is referred to herein as Dynamic Time Division Multiple Access (DTDMA).

In a DTDMA network, time is divided up into slots, and each time slot is assigned a sequential slot number starting from zero. Each node is also assigned a unique address starting from one and going to N, where N is the number of nodes in the network. The unique address of each node corresponds to one of the time slots. Nodes are then enabled to transmit during the time slot that is equal to their node address, insuring that only one node is transmitting at a time. One unique, fixed slot number is reserved for programaming messages, slot #0 in this embodiment, and so no node is assigned to time slot #0.

Slot numbers progress sequentially in time starting from slot #0 until the highest numbered node, node N, address is reached. Each node in the network knows the value of that number "N". After the slot number corresponding to the highest numbered node, node N, is reached, the slot number is reset to zero and the cycle repeats. For example, the time slot allocation and contents for the four node network of FIG. 1 are illustrated in FIGS. 3A and 3B.

Time slot #0 is reserved for program frames 51. The program frame 51 may be sent out by whichever node receives a program frame 51 over the programming port 24. If a program frame 51 is received, the program frame 51 is accepted and buffered until slot #0 occurs. During slot #0, if a program frame 51 has been received, it is broadcast onto the bus 20 and the buffer in the programming port 24 is cleared.

During each time slot other than zero, the node whose address is equal to the slot # assumes control of the bus 20 and broadcasts a data frame 50 containing the input values for that node. After the program frame 51 in slot #0, node 1 is the next to transmit during slot #1, followed by node 2 during slot #2, and so on. Eventually, the highest addressed node, node 4 in this example, transmits during slot #4. The cycle then repeats by going back to slot #0.

In order to operate the DTDMA protocol, each node on the network must have an internal timekeeping function in order to know the current slot number. The timekeeping function must further be synchronized among all of the nodes on the network so that they all agree on the current slot number.

Figure 4:
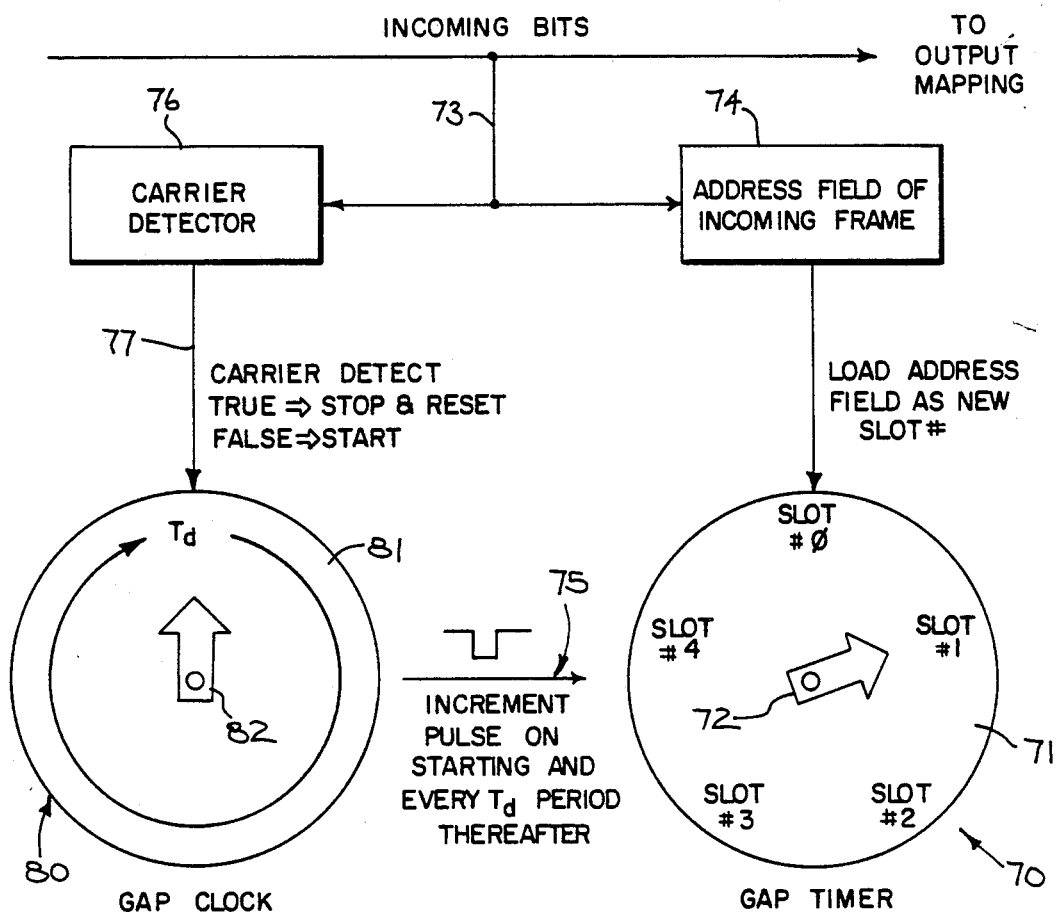
FIG. 4 is a block diagram of the internal timekeeping function of the nodes of the network of FIG. 1.

Referring to FIG. 4, internal timekeeping at each node of this invention is kept by a Gap Timer 70. The Gap Timer 70 is conceptualized in FIG. 4 as a clock face 71 numbered with each possible slot number, and a hand, or gap timer pointer, 72 pointing to the current slot #.

The Gap Timer 70 can be updated in two ways. The first way is by loading the source address field 53 of an incoming message as the new slot number. Since each node transmits during the slot # equal to it's own node address, the source address field 53 not only identifies the source node, but also the current slot #.

Incoming bits 73 of an incoming frame 50 or 51 are applied to a register 74. When the source address field 53 of the incoming message is complete, and if it was received without error, the register 74 is latched. Once loaded into the register 74, the source address field 53 is loaded into the Gap Timer 70, forcing the gap timer pointer 72 to point to the slot number corresponding to the source address 53 just received. All nodes on the network monitor all broadcasts, and when a broadcast is heard, all of the nodes set their gap timer pointers 72 to the source address 53 contained in the message, and synchronization is achieved.

The other way in which the Gap Timer 70 can be changed is by receiving an increment pulse on a $\overline{\text{GAP CLOCK}}$ signal 75 produced by a Gap Clock Generator 80. The Gap Clock Generator 80 is also conceptualized in FIG. 4 as a clock face 81 numbered with a single parameter, $T_d$ and a sweeping hand 82. $T_d$ is a time period equal to twice the longest one-way propagation delay of a message on the network. $T_d$ is so selected to insure that propagation delays on the network do not effect network timing, as will be explained in detail below.

The function of the Gap Clock Generator 80 is as follows. When the previously transmitting node finishes, the network becomes silent, e.g. there is not even a carrier present on the bus 20. This signifiess the end of the previous slot. A Carrier Detector circuit 76 monitors the incoming bits 73 and generates a CARRIER DETECT signal 77 to indicate the presence of the carrier. When the CARRIER DETECT signal 77 goes false, signaling the end of the previous slot, the Gap Clock Generator 80 starts running and immediately generates an increment pulse on the $\overline{\text{GAP CLOCK}}$ signal 75 to the Gap Timer 70.

The reason for the immediate increment pulse is that since the previous slot has just ended, it must be time for the next slot to begin. All of the nodes in the network will perform this operation as soon as the stream of incoming bits ceases, which may vary by a small amount due to propagation delays on the network. When the Gap Timers 70 in all of the nodes have been incremented, exactly one of the nodes will normally then find that the new slot number is now equal to its own node address, and that node will then start transmitting. This signifies the start of another slot.

Within a small amount of time, again governed by propagation delays on the network, the other nodes will hear the broadcast from the node which has started transmitting. This causes the CARRIER DETECT signal 77 to become true, which in turn stops and resets the Gap Clock Generator 80. The above described cycle repeats at the end of each transmission.

Referring to FIG. 5A, the node internal timekeeping just described is represented in timing diagram form. At time 100, an incoming message is just beginning with a preamble bit "P" being received on the incoming bit line 73. In response to the activity on the incoming bit line 73, the CARRIER DETECT signal 77 becomes tru, which forces the Gap Clock Generator 80 to be reset and stopped for the remainder of this message, keeping the $\overline{\text{GAP CLOCK}}$ signal 75 high.

At this time 100, the gap timer pointer 72 will normally be pointing to the current slot number, slot #2 in this example, because of being incremented after the previous slot. At time 101, the source address field 53 is complete and, presuming it was received without error, is loaded from register 74 into the Gap Timer 70, forcing the gap timer pointer 72 to point to slot #2. This operation is represented in FIG. 5A by arrow 105.

From times 101 to 102, the data field 54 of the incoming message is received and processed by the output mapping as will be described below. At time 102, the incoming message ends with the end of the data field 54, which causes the CARRIER DETECT signal 77 to become false. When the CARRIER DETECT signal 77 goes false at time 102, the Gap Clock Generator 80 generates an immediate pulse on the $\overline{\text{GAP CLOCK}}$ signal 75 and begins running. The Gap Timer 70 is a positive edge triggered device and so the rising edge 106 of the pulse on the $\overline{\text{GAP CLOCK}}$ signal 75 causes the gap timer pointer 72 to increment to point to the next sequential slot number, slot #3 in this case.

The gap timer pointers 72 of all the other nodes in the network are also incremented in response to the end of the message of slot #2. When node #3 detects that its gap timer pointer 72 is now pointing to slot #3, it begins transmitting at time 103. In response to the beginning of the slot #3 message at 103, the CARRIER DETECT signal 77 becomes true and the Gap Clock Generator 80 is again stopped and reset, keeping the $\overline{\text{GAP CLOCK}}$ signal 75 reset.

Referring to FIGS. 3C, 4 and 5B, the above described progression of slot timing is the normal case. However, it is possible that one or more nodes may fail to respond during their assigned slot number. This may occur, for example, if a node malfunctions, or is off-line. In that case, the slot corresponding to the nonresponding node is eliminated to save time.

For example, still referring to FIGS. 3C, 4 and 5B, the CARRIER DETECT signal 77 goes false following slot #2 at time 110, causing an immediate pulse on $\overline{\text{GAP CLOCK}}$ signal 75. The rising edge 111 of the pulse on $\overline{\text{GAP CLOCK}}$ signal 75 causes the gap timer pointer 72 to increment to slot #3, and the hand 82 of the Gap Clock Generator 80 begins to sweep.

At this time, the gap timer pointers 72 in all of the nodes are incremented to slot #3. For this example, however, the node corresponding to slot #3 is assumed to be incapacitated and therefore does not begin to transmit. Since no transmission is heard, the CARRIER DETECT signal 77 remains false and the hand 82 of the Gap Clock Generator 80 continues to sweep towards the time value $T_d$.

At time 112, the time period $T_d$ elapses without hearing any transmission. It is then presumed that the node corresponding to this slot number e.g. node #3, has failed to respond. This presumption is valid because of the fact that $T_d$ is chosen to be twice the maximum one-way propagation delay on the network.

Within a time period less than or equal to a single maximum one-way propagation delay, all nodes on the network have detected the cessation of the previous transmission. If any node then finds the slot number equal to its own address it will start transmitting and that transmission will be heard before the expiration of a second time period less than or equal to the maximum one-way propagation delay. Thus, the total worst case time period needed to insure a response is twice the maximum one-way propagation delay, or $T_d$.

If the hand 82 of the Gap Clock Generator 80 sweeps a full period around to $T_d$, then another pulse 113 is generated on the $\overline{\text{GAP CLOCK}}$ signal 75. In response to the pulse 113, the gap timer pointer 72 is incremented to the next sequential slot number, slot #4 in this example. If any node finds the new slot number equal to its own address, e.g. if node #4 exists, then it will begin transmitting and the normal progression of slot numbers described above will be resumed. If, however, no node responds during a second consecutive slot number, then the hand 82 of the Gap Clock Generator 80 continues to sweep and the gap timer pointer 72 is incremented every $T_d$ time period until a node does begin transmitting. A DTDMA network of this invention can therefore tolerate multiple node failures while at the same time improving network performance by eliminating the slot period if a node should fail.

Referring to FIG. 3D, the DTDMA protocol also allows dynamic adjustment of slot periods for data transmission. Each node may, in principle, transmit for as long as it wishes, within arbitrary limits established to limit the maximum round robin sampling time. This feature is useful, for example, when some large nodes have many more inputs to broadcast than other smaller nodes.

The length of any slot is determined by the transmission time of the node corresponding to that particular slot. In other words, a slot ends when the transmission ends. In the example of FIG. 3D, slots numbers 1, 3 and 4 are longer than slot numbers 0 and 2, resulting in a longer round robin sampling period, but accommodating more inputs being broadcast on the network by nodes 1, 3 and 4.

DESCRIPTION OF THE PREFERRED EMBODIMENT

Figure 6:
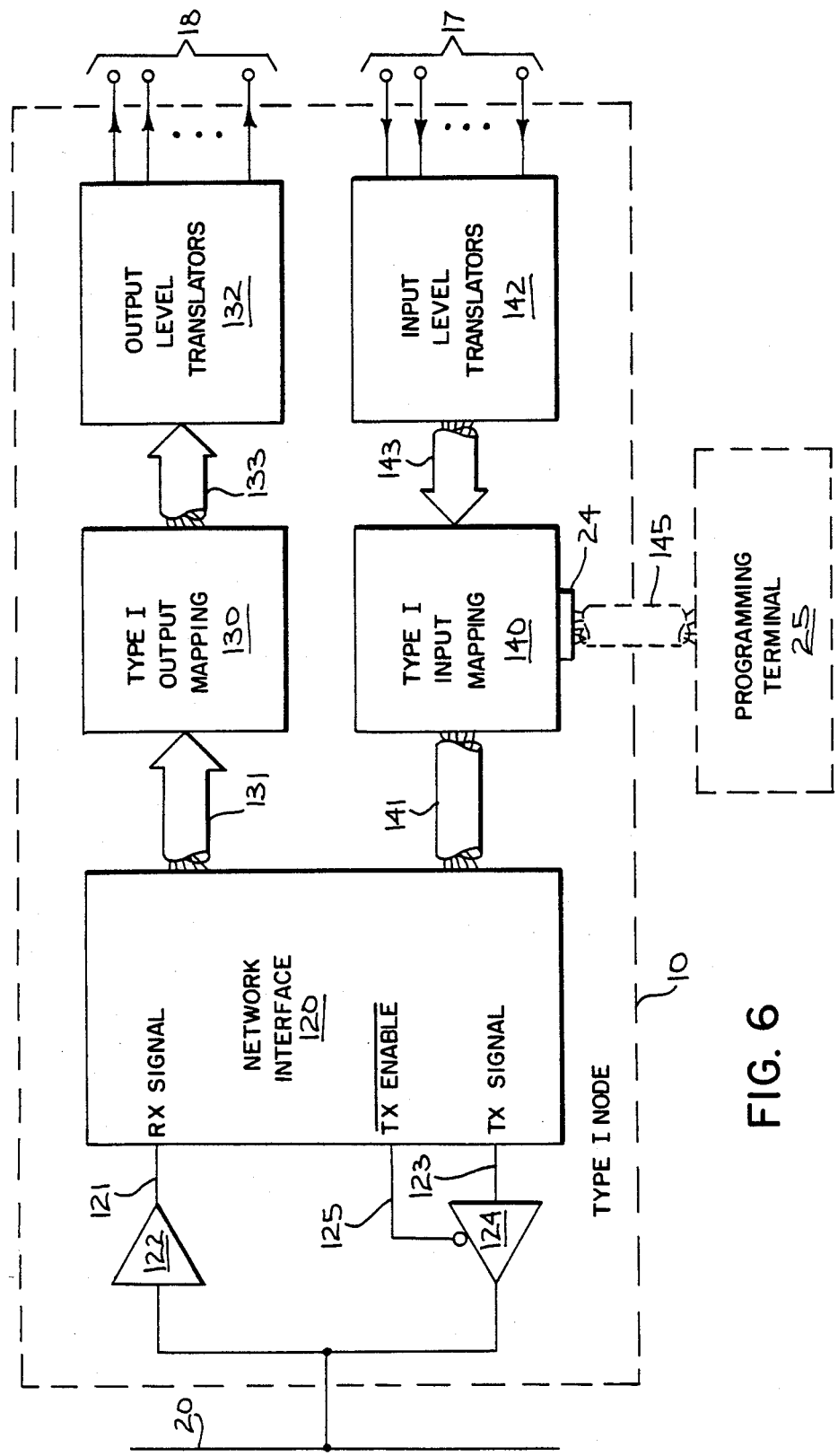
FIG. 6 is a block diagram of a Type I node which forms a part of the network of FIG. 1.

Referring to FIG. 6, a first embodiment of the invention is a Type I node 10. The network interface 120 is the heart of the node 10 and implements all of the protocol and timekeeping functions described above in the general description of the invention. The network interface 120, as it is an important part of this invention, is common to both the Type I nodes 10 being described in this embodiment and the Type II nodes 11 which are described in a second embodiment below. The network interface 120 connects to the bus 20 through a receiver 122 and a transmitter 124. The receiver produces an RX SIGNAL 121 into the network interface 120, while the transmitter 124 is driven by a TX SIGNAL 123 and a $\overline{\text{TX ENABLE}}$ line 125 from the network interface 120.

Although the protocol implemented by the network interface 120 is common to all nodes, there is considerable flexibility in assigning, or "mapping" input and output bits into the network interface 120. The way in which input and output mapping is performed is a distinguishing characteristic between node types.

The Type I node 10 of this embodiment implements Type I Output Mapping 130. The Type I Output Mapping circuit 130 connects to the network interface 120 via a bus 131 and to a set of output level translators 132 on another bus 133. The output level translators 132 provide the proper drive signals for the output lines 18.

The Type I Output Mapping circuit 130 monitors the raw bit value information being presented by the network interface 120 over the bus 131. To process this raw bit value information, the Type I Output Mapping circuit 130 is programmed with the addresses of input bits which are to be mapped to the output lines 18 in this node. When a bit value corresponding to one of those programmed addresses is presented on the bus 131, the Output Mapping circuit 130 latches the bit value and applies it through bus 133 and the output level translators 132 to one or more of the outputs 18.

Similarly, a Type I Input Mapping circuit 140 provides input bit values to the network interface 120 over a bus 141. The input bit values originate from inputs 17 and are applied to input level translators 142 to convert them to logic levels. The logic level signals from the input level translators 142 are then applied to the Type I Input Mapping circuit 140 via a bus 143. When the network interface 120 determines that the current slot number is equal to its own node address, then the input bit values are sampled and broadcast onto the bus 20.

The Type I Input Mapping circuit 140 also has a programming port 24 for connection to an optional programming terminal 25. If a programming terminal 25 is connected, then programming information can be placed in the Type I Input Mapping circuit 140 via a bus 145. If programming information is present in the Type I Input Mapping circuit 140, the network interface 120 will accept that programming information when the current slot number is equal to the slot number reserved for program frames (slot # zero in this embodiment) and broadcast a program frame 51.

Figure 7:
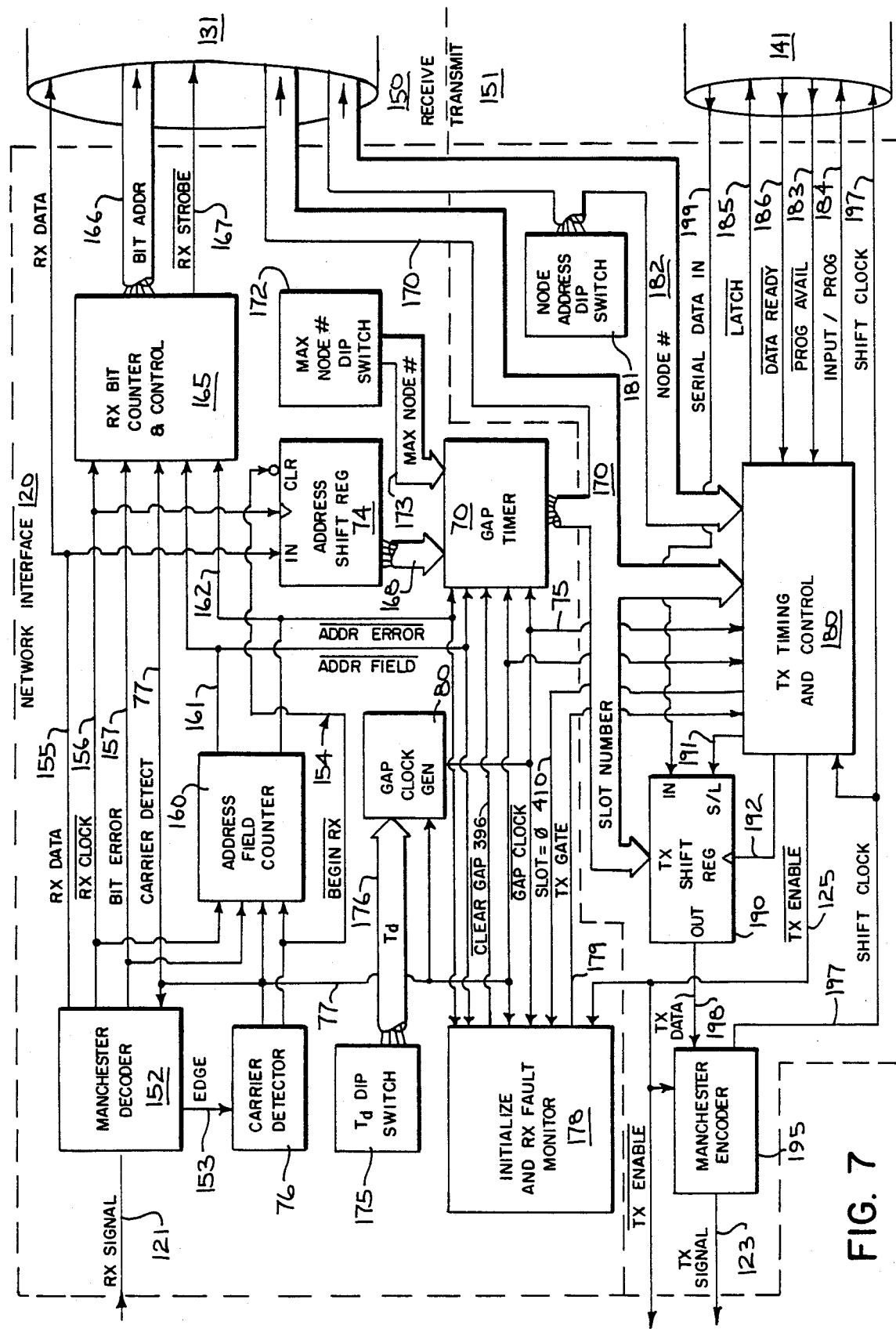
FIG. 7 is a block diagram of the Network Interface circuit of the Type I node of FIG. 6.

Referring to FIG. 7, the network interface 120 can generally be divided into a receive section 150 and a transmit section 151. The receive section 150 includes a Manchester Decoder 152 which receives the RX SIGNAL 121. The Manchester Decoder 152 produces an EDGE signal 153 which becomes true whenever an active transition occurs in the RX SIGNAL 121.

The EDGE signal 153 is applied to a Carrier Detector circuit 76 which produces a CARRIER DETECT signal 77 and a $\overline{\text{BEGIN RX}}$ signal 154. The CARRIER DETECT signal 77 remains true as long as a carrier is present in the RX SIGNAL 121 as detected by periodic activation of the EDGE signal 153. The $\overline{\text{BEGIN RX}}$ signal 154 produces a pulse at the start of an incoming message as detected by the CARRIER DETECT signal 77 transitioning from false to true.

The Manchester Decoder 152 also produces the signals RX DATA 155, $\overline{\text{RX CLOCK}}$ 156 and BIT ERROR 157. The RX DATA and $\overline{\text{RX CLOCK}}$ signals 155 and 156, respectively, are derived from the manchester encoded RX SIGNAL 121. The BIT ERROR signal 157 is generated by a unique circuit described in detail below which determines the validity of each bit received.

The ability to detect bit errors is particularly important in this invention. If a bit error is detected on a received data bit, then that data bit is discarded. If a bit error is detected during reception of the source address field 53, then the source of the message is uncertain and therefore the Gap Timer 70 is not updated and the entire message is discarded.

An Address Field Counter circuit 160 produces the signals "$\overline{\text{ADDR FIELD}}$" 161 and "$\overline{\text{ADDR ERROR}}$" 162. The $\overline{\text{ADDR FIELD}}$ signal 161 is true during the first nine bits of an incoming message, e.g. the preamble bit and eight address field bits, to indicate that the source address field 53 is being received. If the BIT ERROR signal 157 indicates a bit error during any time when the $\overline{\text{ADDR FIELD}}$ signal 161 is true, then the $\overline{\text{ADDR ERROR}}$ signal 162 is made true and remains true for the remainder of the message in which the bit error occurred. This inhibits loading of the Gap Timer 70 and the output of any data bits, in essence, discarding the message.

An RX Bit Counter and Control circuit 165 produces a BIT ADDRESS signal 166 and an $\overline{\text{RX STROBE}}$ signal 167. The BIT ADDRESS signal 166 is a parallel bus which represents a count of the number of $\overline{\text{RX}}$ $\overline{\text{CLOCK}}$ pulses 156 that have occurred after the source address field 53 ended. The $\overline{\text{RX STROBE}}$ signal 167 is normally pulsed for each occurrence of the $\overline{\text{RX}}$ $\overline{\text{CLOCK}}$ signal 156 after the $\overline{\text{ADDR FIELD}}$ signal 161 has gone false indicating the end of the source address field 53. The exceptions are that if the BIT ERROR signal 157 indicates a bit error during reception of a data bit, then the $\overline{\text{RX STROBE}}$ signal 167 is suppressed for that bit. And if the $\overline{\text{ADDR ERROR}}$ signal 162 is true, then the $\overline{\text{RX STROBE}}$ signal 167 is suppressed for all data bits in the message in which the address error occurred.

The address shift register 74 is used to shift in serially the bits of the source address field 53 and present the source address field 53 in parallel over a bus 168 to the Gap Timer 70. The Gap Timer 70 then loads the source address field 53 from the bus 168 when the $\overline{\text{ADDR FIELD}}$ signal 161 goes false, signaling the end of the source address field 5. If, however, the $\overline{\text{ADDR ERROR}}$ signal 162 is true, then an error has occurred in receiving the source address field 53 and loading of the source address field 53 is inhibited.

The Gap Timer 70 functions as described above to maintain the current slot number, which is presented on a SLOT NUMBER bus 170. The SLOT NUMBER bus 170 connects to the transmit section 151 and to the Output Mapping circuit 130 over bus 131.

A "MAX NODE #" dip switch 172 is used to generate the parameter "MAX NODE #" 173, which is equal to the highest node addrss on the network. The MAX NODE #173 is supplied to the Gap Timer 70 so that the Gap Timer 70 will know when to reset the SLOT NUMBER 170 to zero.

The $\overline{\text{GAP CLOCK}}$ signal 75 is produced by Gap Clock Generator 80 to increment the Gap Timer 70 at the end of each slot and every $T_d$ time period thereafter until another broadcast is begun. The value of $T_d$ is dependent upon the propagation delays in a particular network. A $T_d$ dip switch 175 is used to set the value of $T_d$ to be used by each node in the network, e.g. all nodes have their $T_d$ dip switches 175 set to the same value. The $T_d$ dip switch 175 is connected to the Gap Clock Generator 80 by a parallel bus 176.

Figure 8:
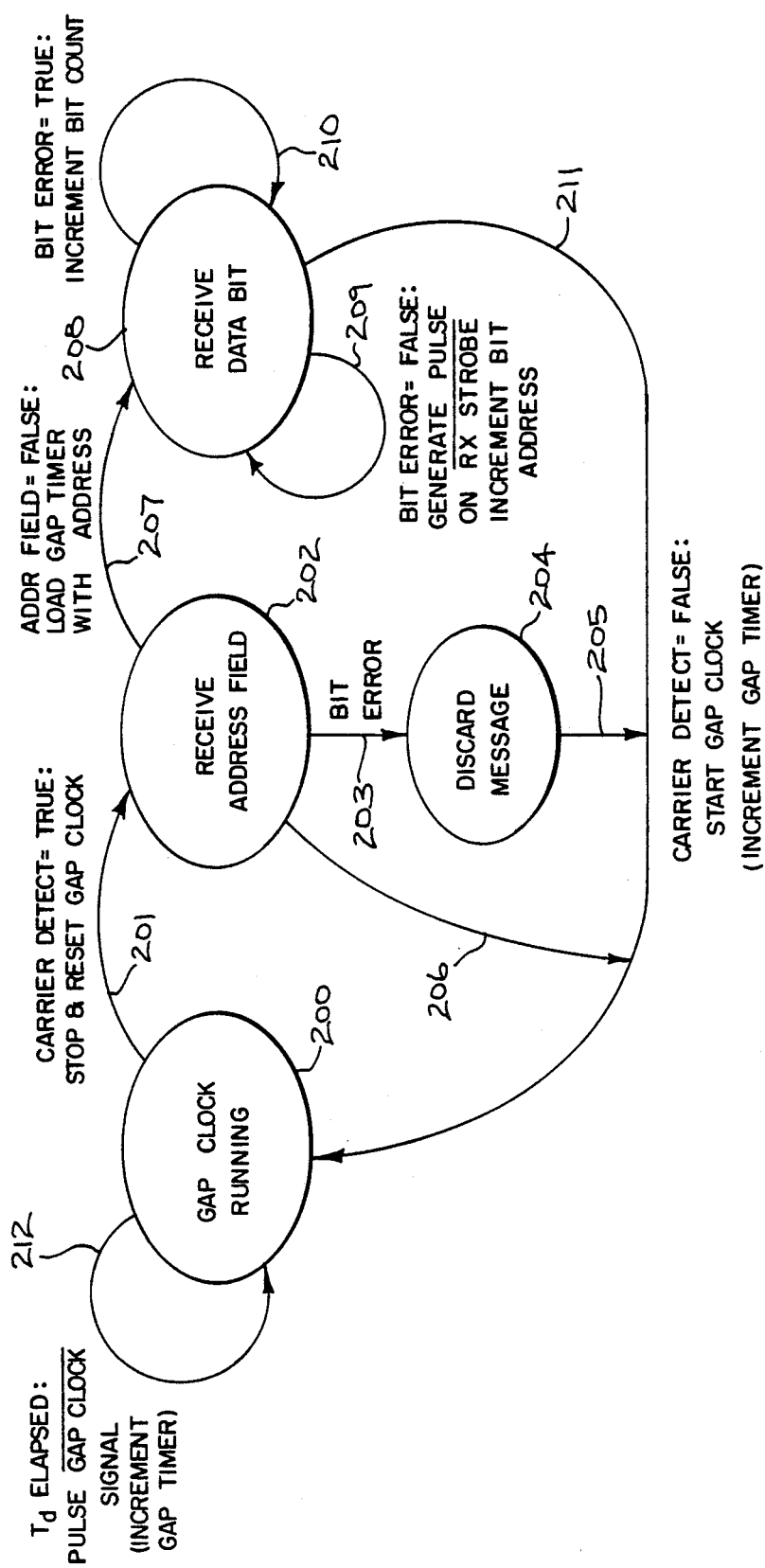
FIG. 8 is a state diagram for the receive section of the Network Interface circuit of FIG. 7.

Referring to FIG. 8, the operation of the receive section 150 is shown in the form of a state diagram. When there is no activity on the bus 20 as indicated by the CARRIER DETECT signal 77 being false, the receive section 150 is in the "gap clock running" state 200. When the CARRIER DETECT signal 77 becomes true, transition 201 is made to the "receive address field" state 202, and the Gap Clock Generator 80 is stopped and reset.

In the "receive address field" state 202, the bits of the source address field 53 of the incoming message are being received. If a bit error should occur while in the "receive address field" state 202, transition 203 is made to the "discard message" state 204. The "discard message" state 204 is maintained until the message is complete, as indicated by the CARRIER DETECT signal 77 going false, at which time transition 205 is taken back to the "gap clock running" state 200.

Another possible error in the "receive address field" state 202 is that the CARRIER DETECT signal 77 goes false prematurely in the middle of the source address field 53, which may be caused, for example, by a failure at the sending node. In that case, transition 206 is taken back to the "gap clock running" state 200.

Normally, the source address field 53 is received without error in "receive address field" state 202. When the source address field 53 is complete, as indicated by the $\overline{\text{ADDR FIELD}}$ signal 161 going false, transition 207 is taken to the "receive data bit" state 208.

In the "receive data bit" state 208, each time a data bit is received, the BIT ERROR signal 157 is examined. If the BIT ERROR signal 157 is false, as is normally the case, transition 209 is taken back to receive another data bit in "receive data bit" state 208. The actions taken in transition 209 are to generate a pulse on the $\overline{\text{RX STROBE}}$ signal 167 in order to latch the bit just received into the Output Mapping circuit 130, and to increment the BIT ADDRESS 166.

If, on the other hand, the BIT ERROR signal 157 is true, then transition 210 is taken back to "receive data bit" state 208. In transition 210, the only action taken is to increment the BIT ADDRESS 166; an $\overline{\text{RX STROBE}}$ pulse 167 is not generated thereby discarding the erroneous bit.

Data bits continue to be received one after another in "receive data bit" state 208 until the incoming message is complete as indicated by the CARRIER DETECT signal 77 becoming false. When it does, transition 211 is taken back to the "gap clock running" state 200.

Whenever the "gap clock running" state 200 is entered, be it either by path 205, 206 or 211, the actions taken are to increment the Gap Timer 70 and to start the Gap Clock Generataor 80. As described above, starting the Gap Clock Generator 80 produces a pulse on the $\overline{\text{GAP CLOCK}}$ signal 75 which in turn causes the Gap Timer 70 to increment the slot #.

Back in the "gap clock running" state 200, the Gap Clock Generator 80 continues to run, waiting for the next node to begin transmitting. If the Gap Clock Generator 80 reaches an elapsed time of $T_d$ before the CARRIER DETECT signal 77 becomes true, then transition 212 is taken back to the "gap clock running" state 200. In transition 212, the actions taken are to produce another pulse on the $\overline{\text{GAP CLOCK}}$ signal 75 thereby again incrementing the Gap Timer 70. The Gap Clock Generator 80 then continues to run in the "gap clock running" state 200 to count another $T_d$ period.

Referring again to FIG. 7, the transmit section 151 operates independently from the receive section 150 described above, except that the SLOT NUMBER 170 maintained by the Gap Timer 70 in the receive section 150 is supplied to the transmit section 151 as a source of timing information. Also, an Initialize and RX Fault Monitor circuit 178 monitors various signals in both the receive and transmit sections 150 and 151, respectively. The Initialize and RX Fault Monitor circuit 178 operates as follows.

A TX GATE signal 179 is generated by the Initialize and RX Fault Monitor circuit 178 to indicate when transmissions are permitted. Before transmissions can be allowed, it is necessary to insure that the Gap Timer 70 in the receive section 150 is synchronized to the other nodes on the network. Further, if a fault is detected in the receive section 150, then the node cannot remain in synchronization and transmissions are disabled to prevent interference with other network nodes.

When the network interface 120 is first powered up or manually reset, as described in detail below, the TX GATE signal 179 is made false (e.g. low) and an initialization period begins. During the initialization period, the Initialize and RX Fault Monitor circuit 178 monitors the receive section 150 to determine if a valid source address is heard on the network. When the first such source address field 53 is received without error, the initialization period ends, and the TX GATE signal 179 is activated.

If no other nodes are operating on the network, then no transmissions will be heard and the initialization period remains in effect. In that case, the Initialize and RX Fault Monitor circuit 178 waits for one complete revolution of the Gap Timer 70 back to a slot number of zero, and then enables the TX GATE signal 179. The SLOT NUMBER 170 will then be incremented until it is equal to the NODE #182, and the node will then begin transmitting.

However, more than one node may be initializing at the same time on a network in which no nodes have started transmitting. Under those conditions, it is possible that even after waiting for one revolution of the Gap Timer 70, more than one node transmit at the same time, causing errors in each other's transmissions. The Initialize and RX Fault Monitor circuit 178 checks for this coincidence, and if it occurs, activates a $\overline{\text{CLEAR GAP}}$ signal 396 to clear the Gap Timer 70 to zero. All of the interfering nodes thus have their Gap Timers 70 set to zero at the same time, and so will not interfere again because the node with the lowest NODE #182 will begin first.

The initialization period is complete whenever a valid source address field 53 is received. The TX GATE signal 179 then remains true thereby allowing transmissions. The Initialize and RX Fault Monitor circuit 178 continues to monitor the receive sesction 150 to insure that a node's own transmissions are being heard. If not, then the receiver is faulty and the node cannot remain in synchronization with other nodes on the network, i.e. cannot determine the current slot number. In that case, the TX GATE signal 179 is latched false to prevent interference with other nodes on the network.

The transmit section 151 includes a TX Timing and Control circuit 180 for controlling transmit functions. The TX Timing and Control circuit 180 receives the SLOT NUMBER 170 from the Gap Timer 70. A dip switch 181 is used to set the node address, or "identity" of the node, and that node address, or NODE #182, is connected to the TX Timing and Control circuit 180.

The TX Timing and Control circuit 180 monitors the SLOT NUMBER 170 and continually compares it to both the NODE #182 and to zero. When the SLOT NUMBER 170 is equal to NODE #182, a transmit cycle is imitated to broadcast a data frame 50. When the SLOT NUMBER 170 is equal to zero, the program available ($\overline{\text{PROG AVAIL}}$) input 183 is tested to see if programming information is ready. If it is, then a transmit cycle is initiated to broadcast a program frame 51.

Whenever a transmit cycle is initiated, an INPUT/PROG signal 184 connected to bus 141 is set to designate the type of transmit cycle, data or program. The INPUT/PROG signal 184 is first set to the appropriate state; high for transmitting a data frame 50 (INPUT) and low for transmitting a program frame 51 (PROG). Then, a pulse is generated on $\overline{\text{LATCH}}$ signal 185 which causes either the current input values 17 or the programming information to be latched, depending on the state of the INPUT/PROG signal 184. After the appropriate data has been latched, the Input Mapping circuit 140 responds by setting the $\overline{\text{DATA READY}}$ signal 186 true.

After the $\overline{\text{LATCH}}$ signal 185 has been generated, TX shift register 190 is loaded with the value of the SLOT NUMBER 170 by setting SHIFT/LOAD (S/L) command line 191 to "load" and generating a pulse on line 192 to the TX shift register 190 clock input. Then the TX Timing and Control circuit 180 sets $\overline{\text{TX ENABLE}}$ signal 125 true. Manchester Encoder 195 responds to the $\overline{\text{TX ENABLE}}$ signal 125 by beginning transmission of the preamble bit 52 on TX SIGNAL 123. The preamble bit 52 is preset to "1" in a one bit buffer in the Manchester Encoder 195.

The Manchester Encoder 195 then begins to generate pulses on SHIFT CLOCK signal 197 to shift subsequent bits into the Manchester Encoder 195 over TX DATA line 198. Shifting of TX shift register 190 is performed by setting the SHIFT/LOAD (S/L) line 191 to "shift" and then passing the SHIFT CLOCK pulses 197 through to the clock input of TX shift register 190 on line 192. The SHIFT CLOCK 197 is also applied to bus 141, and causes the contents of the data previously latched to be shifted over "SERIAL DATA IN" line 199 to the serial input of the TX shift register 190.

Shifting continues, and the bits are transmitted serially, until the $\overline{\text{DATA READY}}$ signal 186 is made false by the Input Mapping circuit 140. After that, the TX Timing and Control circuit 180 counts exactly ten more shift clocks 197 to allow the end of the last bit of the current transmission to be shifted through the eight bit TX shift register 190 and through the one bit buffer in the Manchester Encoder 195. After the ten shift clocks, the TX Timing and Control circuit 180 sets the $\overline{\text{TX ENABLE}}$ signal 125 false to terminate the transmit cycle.

Figure 9:
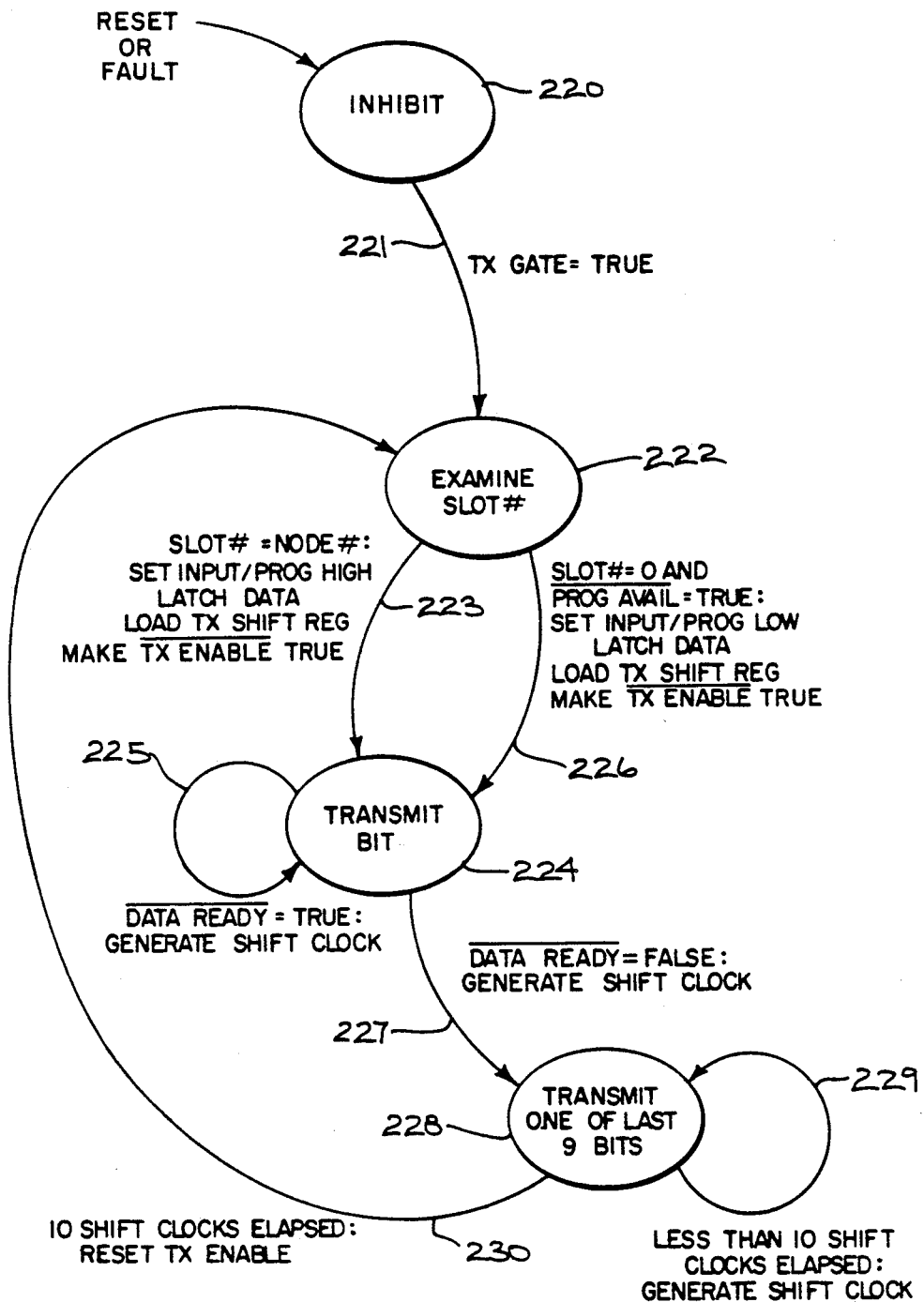
FIG. 9 is a state diagram for the transmit section of the Network Interface circuit of FIG. 7.

Referring to FIG. 9, the operation of the transmit section 151 is shown in the form of a state diagram. After a reset or when power is first applied, the transmit section 151 comes up in an "inhibit" state 220 where it remains until the TX GATE signal 179 is made true by the Initialize and RX Fault Monitor circuit 178. When the TX GATE signal 179 becomes true, transition 221 is made to the "examine slot #" state 222.

If at any time the TX GATE signal 179 becomes false because of a fault detected by the Initialize and RX Fault Monitor circuit 178, the "inhibit" state 220 is re-entered, and the TX GATE signal 179 is latched false. The transition back to the "inhibit" state 220 can occur from any other state although explicit transitions are not shown in FIG. 9 for simplicity.

Once in the "examine slot #" state 222, the transmit section 151 continually compares the SLOT NUMBER 170 to the NODE #182 and to zero. If a match is found between the SLOT NUMBER 170 and the NODE #182, then transition 223 is taken to the "transmit bit" state 224. The outputs generated in making transition 2232 to initiate a transmit cycle are: the INPUT/PROG signal 184 is set high to indicate that data, as opposed to programming information, is to be transmitted; the $\overline{\text{LATCH}}$ signal 185 is strobed to latch the current values of the input data; the TX shift register 190 is loaded with the current slot number 170; and the $\overline{\text{TX ENABLE}}$ signal 125 is made true.

The "transmit bit" state 224 may also be entered via transition 226 under the conditions that the SLOT NUMBER 170 is equal to zero and there is programming information available as indicated by the $\overline{\text{PROG AVAIL}}$ signal 183 being true. In transition 226, the same outputs are generated as in transition 223, except that the INPUT/PROG signal 184 is set low to indicate that programming information is to be latched by the $\overline{\text{LATCH}}$ signal 185.

Once in the "transmit bit" state 224, the Manchester Encoder 195 transmits a bit. When transmission of the bit is complete, $\overline{\text{DATA READY}}$ signal 186 is tested. If $\overline{\text{DATA READY}}$ signal 186 is true, then transition 225 is taken back to the "transmit bit" state 224 to transmit another bit, and a pulse on SHIFT CLOCK signal 197 is generated to shift the next bit into the Manchester Encoder 195. Transmission of bits in the "transmit bit" state 224 continues as long as $\overline{\text{DATA READY}}$ signal 186 remains true.

When $\overline{\text{DATA READY}}$ signal 186 is made false, transition 227 is taken to the "transmit one of last 9 bits" state 228. During transition 227, a SHIT CLOCK 197 is generated to advance to the next bit. In the "transmit one of last 9 bits" state 228, when transmission of a bit is completed and less than 10 SHIFT CLOCKS 197 have elapsed, exit 229 is taken back to the "transmit one of last 9 bits" state 228 and another SHIFT CLOCK 197 is generated. When the last bit has been transmitted, as indicated by 10 SHIFT CLOCKS 197 having elapsed, transition 230 is taken back to the "examine slot #" state 222, thereby completing the transmit cycle.

Figure 10:
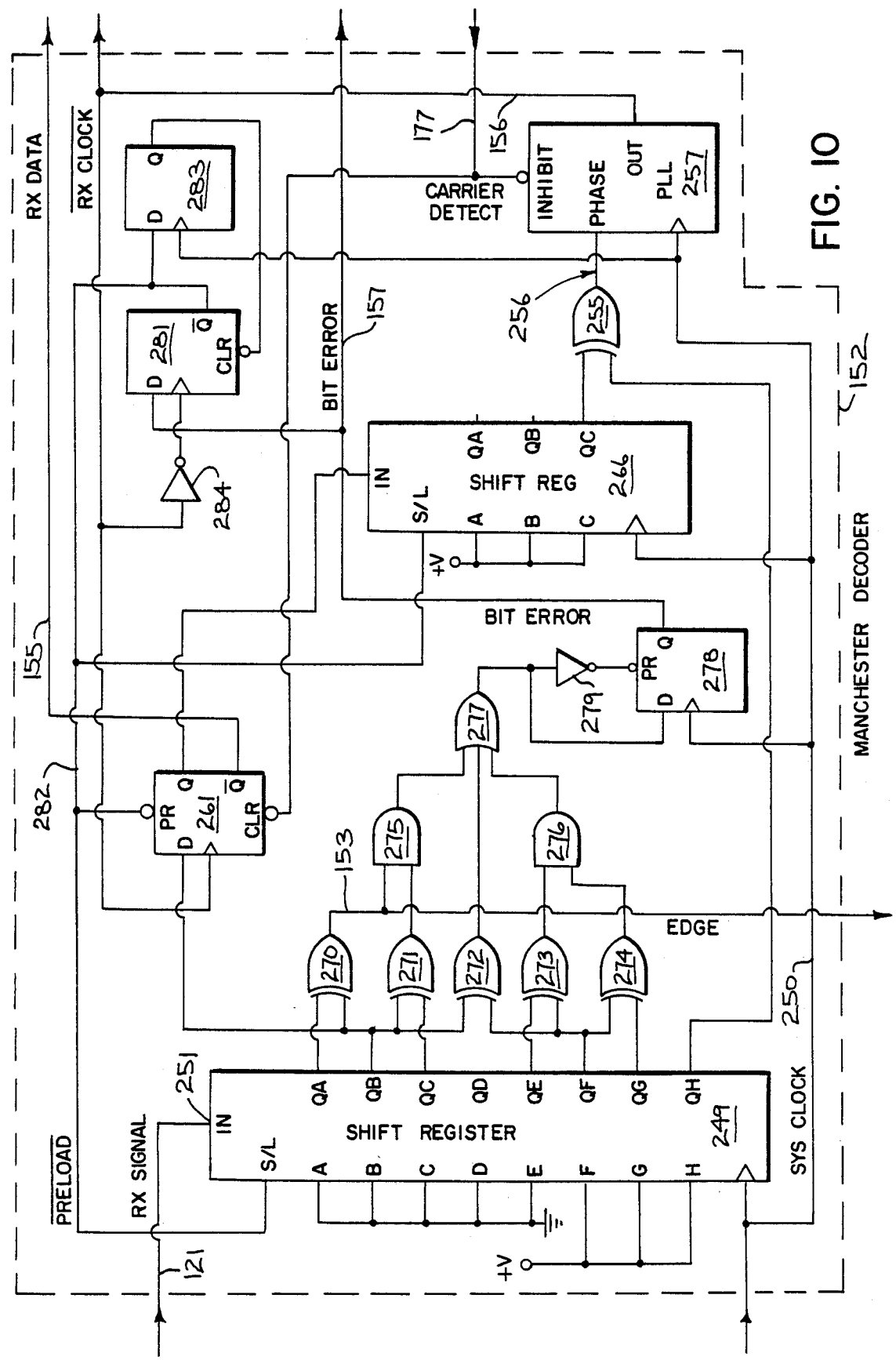
FIG. 10 is a circuit diagram for the Manchester Decoder circuit of the network interface of FIG. 7.

Referring to FIG. 10, the Manchester Decoder 152 includes a shift register 249 which shifts in the RX SIGNAL 121 at a rate determined by a SYSTEM CLOCK 250. The shift register 249 has eight stages and the frequency of the system clock 250 is set to be eight times the desired bit rate. Each bit is therefore divided into eight segments in time by shift register 249, represented by the outputs QA through QH. Output QA therefore represents the most recent value of the RX SIGNAL 121, while each of the outputs QB-QH represent successively older values of RX SIGNAL 121. The frequency of the SYSTEM CLOCK 250 in this embodiment is 8 megahertz, which corresponds to a bit rate of 1 megahertz.

Although other types of coding may be used equally well with this invention, the embodiments described herein utilize standard manchester coding. A valid manchester "0" comprises a high to low transition in the middle of a bit period, while a valid manchester "1" comprises a low to high transition. As is well known in the art, a receive clock can be derived from a manchester encoded waveform by synchronizing, or "phase locking" to this guaranteed mid-bit transition.

The RX SIGNAL 121 is shifted through shift register 249 until it finally appears on output QH. The output from QH propagates through EXCLUSIVE-OR gate 255 to produce a RECOVERED CLOCK signal 256. The RECOVERED CLOCK signal 256 connects to the phase input of Phase Locked Loop (PLL) 257. The output of PLL 257 is a reliable clock signal, $\overline{\text{RX CLOCK}}$ 156, which is free from any potential spurious transitions on the RECOVERED CLOCK 256.

$\overline{\text{RX CLOCK}}$ 156 then connects to the clock input of D type flip-flop 261. The data input of flip-flop 261 is connected to output QB of shift register 249. When the mid-bit transition of one input bit period appears at output QH of shift register 249, a rising edge is produced on the $\overline{\text{RX CLOCK}}$ signal 156. At that time, output QB of shift register 249 is six cycles of the SYSTEM CLOCK 250 later in time than output QH and contains the sampled value of the next bit. This value of QB is latched into flip-flop 261. The inverted output of flip-flop 261 is then the RX DATA signal 155, since a high in the beginning of a bit period represents a manchester "0" and a low represents a manchester "1".

The noninverted output of flip-flop 261 connects to the serial input of shift register 266, which is used to change the phase of the RECOVERED CLOCK signal 256 through EXCLUSIVE-OR gate 255 exactly four cycles of the SYSTEM CLOCK 250 (e.g. one-half bit period) after a manchester "0" is received in flip-flop 261. This produces the RECOVERED CLOCK signal 256 on the output of EXCLUSIVE-OR gate 255.

EXCLUSIVE-OR gate 270 is connected to shift register 249 outputs QA and QB. When the RX SIGNAL 121 undergoes a change in state, either 1 to 0 or 0 to 1, shift register 249 outputs QA and QB will reflect the change in state as it is shifted through and the output of EXCLUSIVE-OR gate 270 will go high. The output of EXCLUSIVE-OR gate 252 therefore becomes true for one cycle of the SYSTEM CLOCK 250 whenever the RX SIGNAL 121 changes state, and this is the EDGE signal 153.

Figure 11:
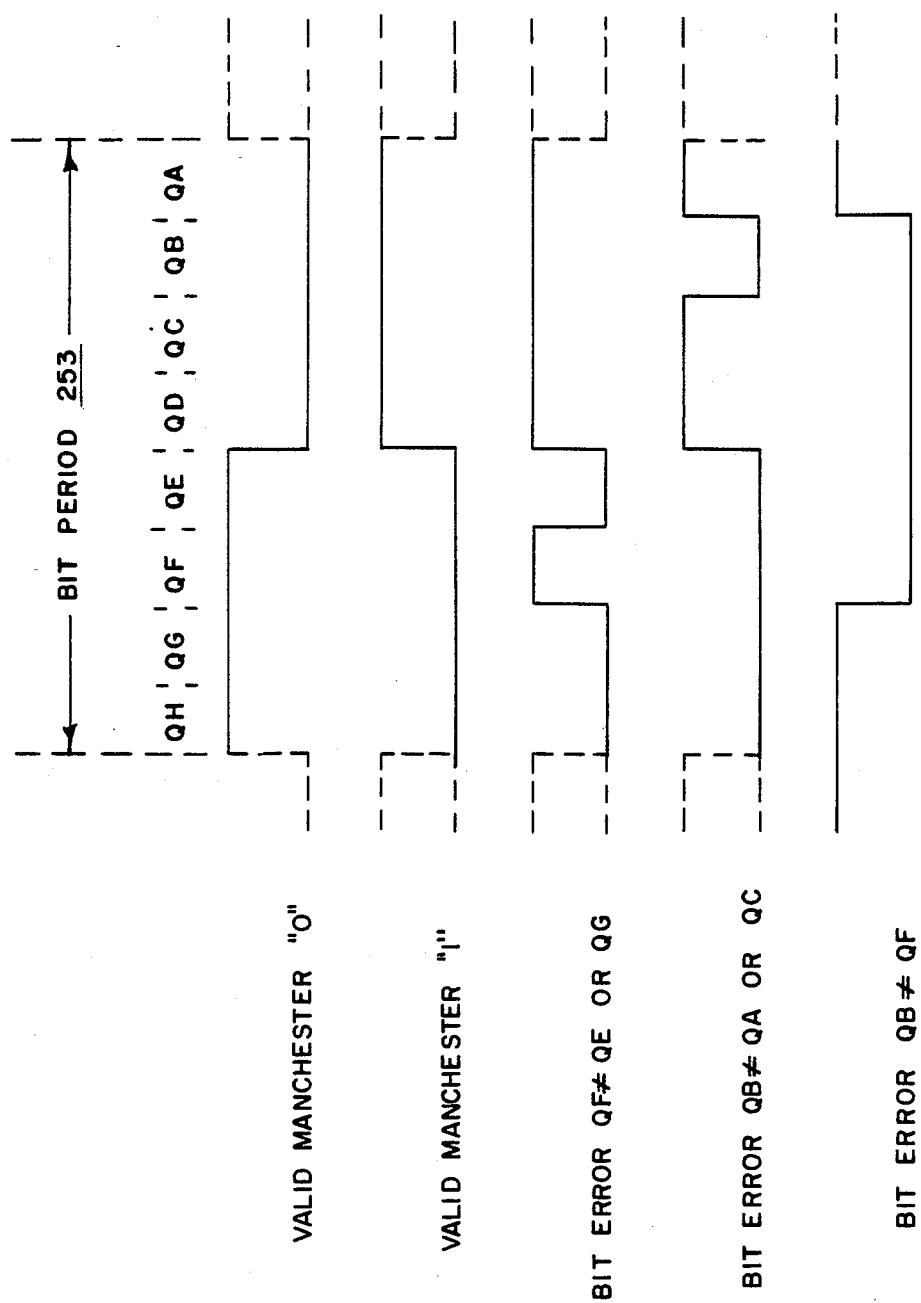
FIG. 11 is a timing diagram for the Manchester Decoder circuit of FIG. 10.

Referring to FIGS. 10 and 11, an important aspect of this invention is the ability to detect single bit errors in the incoming bit stream as they occur. This feature is important because of the need for high speed real-time processing of the input bits and the necessity for a high degree of data reliability.

In this embodiment, bit errors are detected by monitoring outputs QA-QC and QE-QF of shift register 249 with gates 270-277. The output of AND gate 275 is high whenever QB is not equal to either QA or QC. This is an error condition because it represents either a high-low-high or a low-high-low transition in the last half of a bit period, neither of which is permitted. Similarly, the output of AND gate 276 is high whenever QF is not equal to either QE or QG, which represents an illegal transition in the first half of a bit period.

EXCLUSIVE-OR gate 272 is high whenever QB is not equal to QF. This condition can occur while valid signals are being shifted through shift register 249, but it is an error when the bit period 253 is properly framed within the outputs QA-QH as shown in FIG. 11. The latter case is an error usually indicative of a timing error or a loss of synchronization. This error check mechanism takes advantage of the inherent parity check redundancy of the manchester code.

The outputs of gates 275, 272, and 276 are each connected to an input of OR gate 277. The output of OR gate 277 will therefore be high whenever any of these above described error conditions exist. The output of OR gate 277 is connected to the "D" input of flip-flop 278 and to the preset input of flip-flop 278 through inverter 279. If any of the above error conditions are detected, flip-flop 278 is set immediately and remains set for as long as the condition persists. The output of flip-flop 278 is then the BIT ERROR signal 157.

The BIT ERROR signal 157 is valid only when the bit period 253 is properly framed within the outputs QA-QH, which occurs during the falling edge of $\overline{\text{RX CLOCK}}$ 156. For this reason, the BIT ERROR signal 157 is sampled by other circuits described below during that time only.

Referring again to FIG. 10, flip-flop 281 is used to generate a $\overline{\text{PRELOAD}}$ signal 282 to reset the circuits of the Manchester Decoder 152 back to an initial state following an error condition. The initial state imposed by the $\overline{\text{PRELOAD}}$ signal 282 is one which represents a valid manchester bit. The "D" input of flip-flop 281 is connected to the bit error signal 157 and the clock input is connected to inverter 284 which is in turn fed from the $\overline{\text{RX CLOCK}}$ signal 156. If the BIT ERROR signal 157 is high during the falling edge of the $\overline{\text{RX CLOCK}}$ 156, then flip flop 281 is set, making the $\overline{\text{PRELOAD}}$ signal true (low).

The $\overline{\text{PRELOAD}}$ signal 282 connects to a Shift/Latch (S/L) input on both shift registers 249 and 266. When the $\overline{\text{PRELOAD}}$ signal is activated, the shift registers 249 and 266, and the flip-flop 261 are loaded with the values corresponding to a valid manchester "0". The $\overline{\text{PRELOAD}}$ signal 282 also connects to the "D" input of flip-flop 283, which on the next occurrence of the SYSTEM CLOCK 250 after flip-flop 281 had been set, causes flip-flop 281 to reset. The $\overline{\text{PRELOAD}}$ signal 282 therefore remains low for a single cycle of the SYSTEM CLOCK 250.

Figure 12:
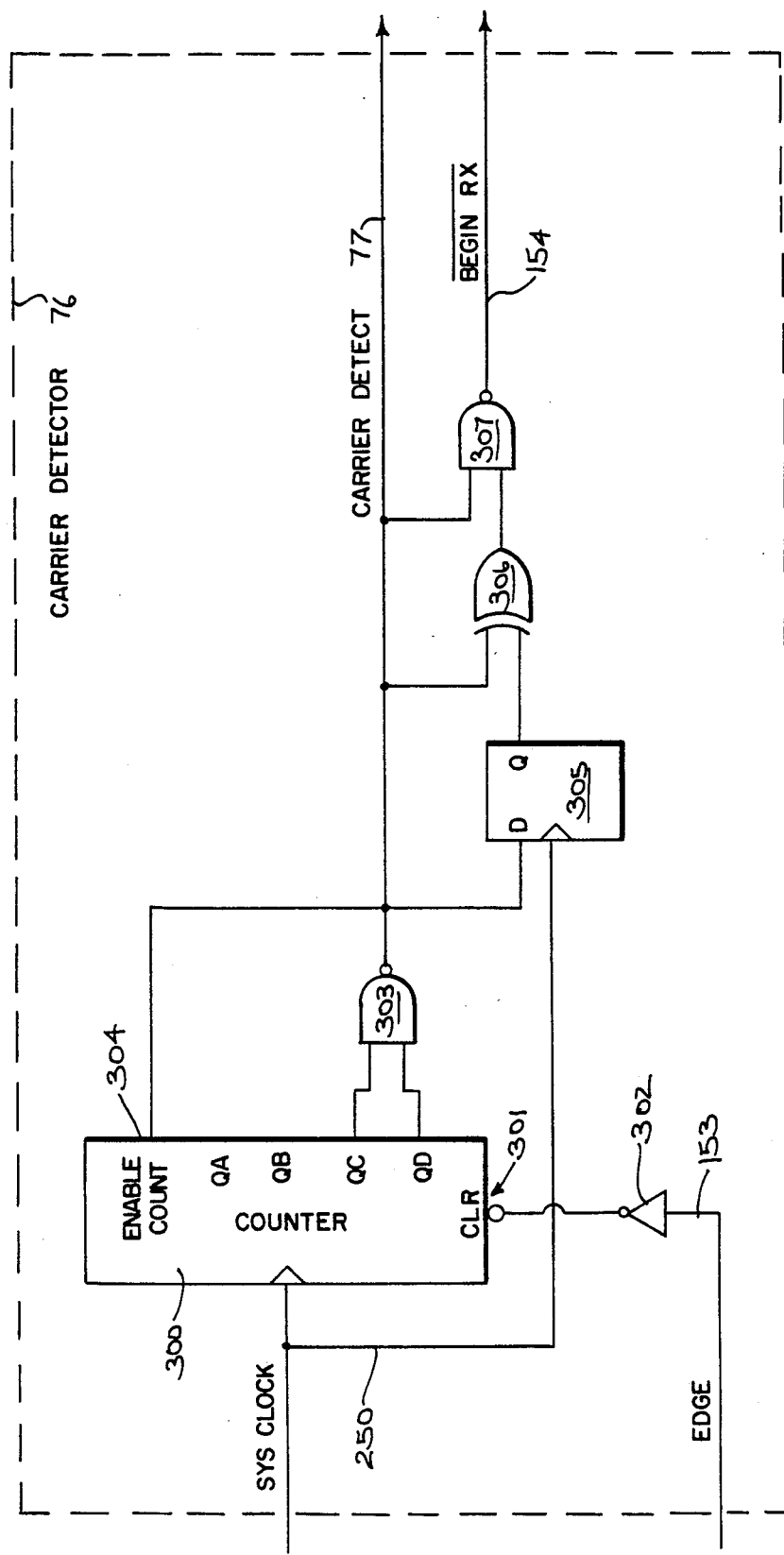
FIG. 12 is a circuit diagram for the Carrier Detector circuit of the network interface of FIG. 7.

Referring to FIG. 12, the Carrier Detector circuit 76 functions to set the CARRIER DETECT signal 77 true as soon as a pulse is received on the EDGE signal 153, and to reset the CARRIER DETECT signal 77 after a delay of 12 cycles of the SYSTEM CLOCK 250 after pulses are no longer being received on the EDGE signal 153. A counter 300 has its clock input connected to the SYSTEM CLOCK 250 and a clear input 301 connected to the EDGE signal 153 through an inverter 302. Each pulse on the EDGE signal 153 therefore clears the counter 300 to zero.

Outputs QC and QD of the counter 300 are connected to the inputs of NAND gate 303. The output of NAND gate 303 is the CARRIER DETECT signal 77. As long as the EDGE signal 153 keeps the counter 300 reset, counter 300 outputs QC and QD are low and the CARRIER DETECT signal 77 is forced high. If pulses stop on the EDGE signal 153, the counter 300 begins counting cycles of the SYSTEM CLOCK 250. If 12 SYSTEM CLOCKS 250 are received without a pulse on the EDGE signal 153, then output QC and AD of counter 300 will both be high, and the CARRIER DETECT signal 77 will be forced low.

The CARRIER DETECT signal 77 connects to an enable count input 304 on the counter 300. When the CARRIER DETECT signal 77 is forced low, further counting of the counter 300 is inhibited, locking the CARRIER DETECT signal 77 low until the first pulse on the EDGE signal 153 of the next transmission once again clears the counter 300.

Flip-flop 305, EXCLUSIVE-OR gate 306, and NAND gate 307 function to produce a single, negative going pulse on the output of NAND gate 307 with a duration of one period of the SYSTEM CLOCK 250 whenever the CARRIER DETECT signal 77 transitions from low to high, signaling that the CARRIER DETECT signal 77 has just become true. That pulse on the output of NAND gate 307 is the $\overline{\text{BEGIN RX}}$ signal 154 and serves to reset other circuits in the receive section 150 in preparation for the receipt of a new message.

Figure 13:
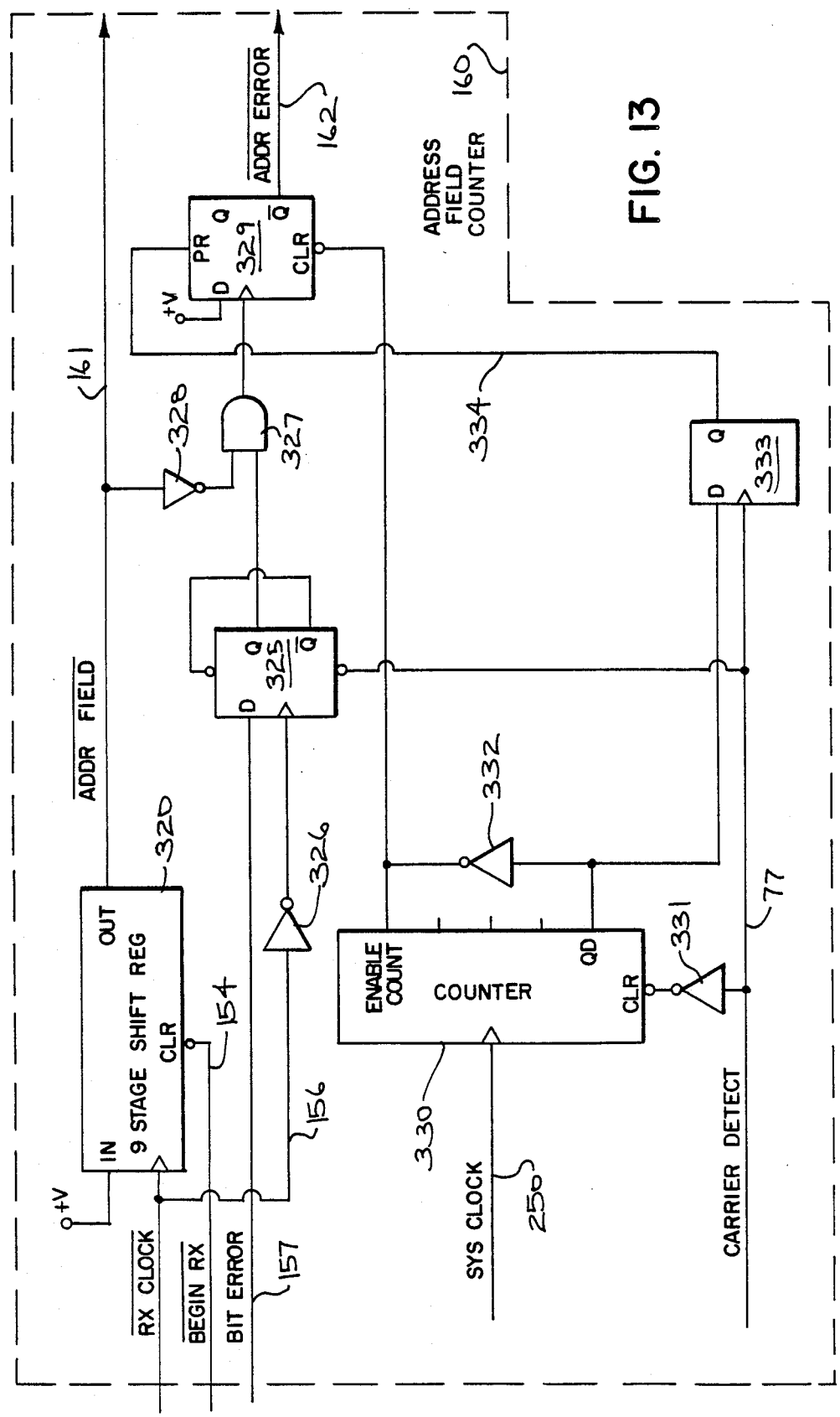
FIG. 13 is a circuit diagram for the Address Field Counter circuit of the network interface of FIG. 7.

Referring to FIG. 13, the $\overline{\text{ADDR FIELD}}$ signal 161 is produced by a nine stage shift register 320 in the Address Field Counter circuit 160. The shift register 320 has a clock input connected to the $\overline{\text{RX CLOCK}}$ signal 156 and a clear input connected to the $\overline{\text{BEGIN RX}}$ signal 154. The low going pulse on $\overline{\text{BEGIN RX}}$ signal 154 at the start of an incoming message clears register 320 to zero, thereby making the $\overline{\text{ADDR FIELD}}$ signal 161 low to signify that a source address field 53 is being received. The serial input of the shift register 320 is connected to +V (high) and so after nine cycles of $\overline{\text{RX CLOCK}}$ 156, the $\overline{\text{ADDR FIELD}}$ signal 161 is forced high, signalling the end of the source address field 53.

Flip-flop 325 has a "D" input connected to the BIT ERROR signal 157 and a clock input connected through an inverter 326 to the $\overline{\text{RX CLOCK}}$ signal 156. Therefore, on each falling edge of the $\overline{\text{RX CLOCK}}$ signal 156, the state of the BIT ERROR signal 157 is latched into flip-flop 325. The inverted output of flip-flop 325 is fed back to the preset input so that once set by a bit error, flip-flop 325 is locked in a set condition until being cleared at the end of the message by the CARRIER DETECT signal 77 going low.

The output Q of flip-flop 325 connects to one input of AND gate 327. The other input of AND gate 372 is connected through inverter 328 to the $\overline{\text{ADDR FIELD}}$ signal 161. If a bit error occurs while the $\overline{\text{ADDR FIELD}}$ signal 161 is true (e.g. low), then a rising edge on the output of AND gate 327 clocks flip-flop 329, causing it to set, since the "D" input of flip-flop 329 is connected to +V. The inverted output of flip-flop 329 is therefore the $\overline{\text{ADDR ERROR}}$ signal 162. Once set, flip-flop 329 will remain set and the $\overline{\text{ADDR ERROR}}$ signal 162 will remain low for the duration of the received message, as indicated by the CARRIER DETECT signal 77.

A counter 330 is used to insure that there is a minimum spacing between messages of at least eight cycles of the SYSTEM CLOCK 250. If a second message begins before eight cycles of the SYSTEM CLOCK 250 have elapsed, that second message is ignored. While a first message is being received, the CARRIER DETECT signal 77 is high, forcing a low on the clear input of counter 330 through an inverter 331. Output QD of counter 330 is thereby also held low, and connects through inverter 332 to place a high on the clear input of flip-flop 329, allowing it to be set on an error as described above.

When the first message ends, the CARRIER DETECT signal 77 goes low and the counter 330 begins to count. Output QD of counter 330 is connected to the "D" input of a flip-flop 333 and is clocked in by the rising edge of the CARRIER DETECT signal 77. Flip-flop 333 will therefore be clocked low if a second message starts before eight cycles of the SYSTEM CLOCK 250 have elapsed.

The output Q 334 of flip-flop 333 connects to the preset input of flip-flop 329. If flip-flop 333 is clocked low due to a premature second message, flip-flop 329 is set by the low on its preset input, thus forcing the $\overline{\text{ADDR ERROR}}$ signal 162 low (TRUE) for the duration of the new message.

If, on the other hand, eight cycles of the SYSTEM CLOCK 250 expire before the next rising edge of the CARRIER DETECT signal 77, then output QD of counter 330 will be high when clocked into flip-flop 333. The output Q 334 of flip-flop 333 in this case will place a high on the preset input of flip-flop 329, enabling the detection of an error condition as described above. The high on output QD of counter 330 also causes a low on the output of inverter 332, disabling counter 330 and clearing flip-flop 329 in preparation for the new message.

Figure 14:
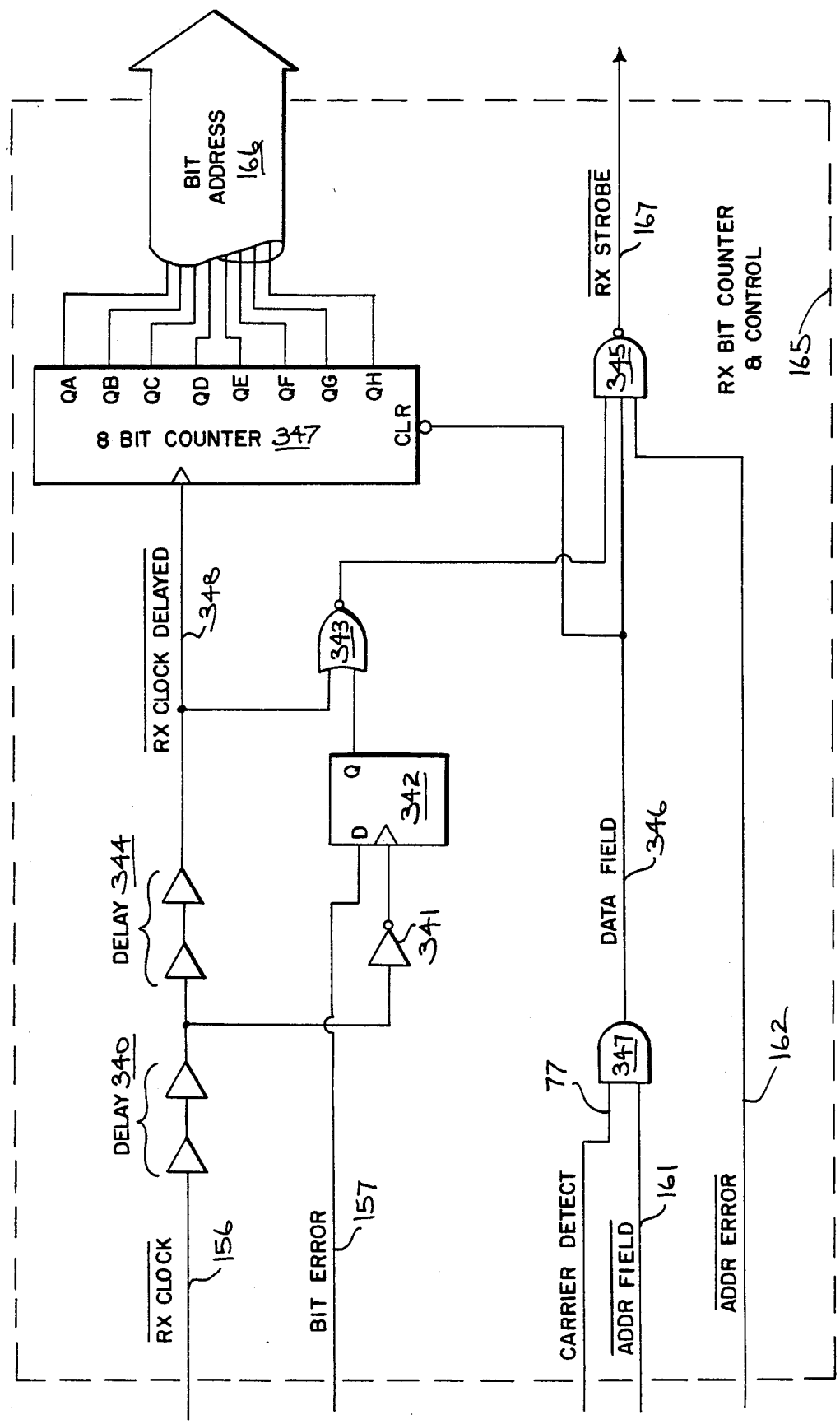
FIG. 14 is a circuit diagram for the RX Bit Counter and Control circuit of the network interface of FIG. 7.

Referring to FIG. 14, the $\overline{\text{RX CLOCK}}$ signal 156 connects through a pair of gates 340, interposed for delay, and an inverter 341 to the clock input of a flip-flop 342. The "D" input of flip-flop 342 is connected to the BIT ERROR signal 157. Therefore, on the falling edge of the $\overline{\text{RX CLOCK}}$ signal 156, the state of the BIT ERROR signal 157 is clocked into flip-flop 342. The delay 340 of approximately two gate delays is used to insure that the BIT ERROR signal 157 is stable when clocked into flip-flop 342. The output Q of flip-flop 342 will then be high if a bit error was detected on the bit currently being received.

The output Q of flip-flop 342 connects to one input of a NOR gate 343. The other input of NOR gate 343 connects to an $\overline{\text{RX CLOCK DELAYED}}$ signal 348 through a second pair of gates 344, also interposed for delay and in series with the first pair of gates 340. The second delay 344, also of approximately two gate delays, is used to insure that the condition of flip-flop 342 is stable by the time the $\overline{\text{RX CLOCK DELAYED}}$ signal 348 is applied to NOR gate 343. The output of NOR gate 343 is therefore equal to the $\overline{\text{RX CLOCK}}$ signal 156 gated by the bit error output Q of flip-flop 342 and delayed in time.

The output of NOR gate 343 connects to one input of NAND gate 345. The other inputs of NAND gate 345 are the $\overline{\text{ADDR ERROR}}$ signal 162 and a DATA FIELD signal 346. The DATA FIELD signal 346 is derived by AND gate 347, with inputs connected to the CARRIER DETECT and $\overline{\text{ADDR FIELD}}$ signals 77 and 161, respectively. The DATA FIELD signal 346 is therefore high for all bits of an incoming message after the source address field 53 has been received.

The output of NAND gate 345 is the $\overline{\text{RX STROBE}}$ signal 167. If the source address field 53 has been received without error, then the $\overline{\text{ADDR ERROR}}$ signal 162 and the DATA FIELD signal 346 will both be high and NAND gate 345 will then respond to the output of NOR gate 343. If a data bit is received with a bit error, the high on output Q of flip-flop 342 forces a low on the output of NOR gate 343, which in turn holds the $\overline{\text{RX STROBE}}$ signal 167 on the output of NAND gate 345 high; no pulse is produced for the erroneous bit on the $\overline{\text{RX STROBE}}$ signal 167.

If, on the other hand, a bit is received without a bit error, then output Q of flip-flop 342 is low and the $\overline{\text{RX CLOCK}}$ signal 156 propagates through NOR gate 343 and NAND gate 345 producing a pulse on RX STROBE signal 167. The pulse on $\overline{\text{RX STROBE}}$ signal 167 causes the received bit on the RX DATA signal 155 to be latched by the Output Mapping circuit 130.

If a bit error occurred during reception of the source address field 53, then the $\overline{\text{ADDR ERROR}}$ signal 162 will remain low (e.g. true) for the entire duration of the DATA FIELD signal 346 and no pulses will be produced on the $\overline{\text{RX STROBE}}$ signal 167.

The BIT ADDRESS 166 for the received bit is maintained by a counter 347. The counter 347 is clocked by the rising edge of the $\overline{\text{RX CLOCK DELAYED}}$ signal 348 and has enough stages to count the maximum number of bits to be received in any one transmission. In this embodiment, eight stages are used to accommodate 256 bits. The outputs QA-QH of counter 347 are connected as the BIT ADDRESS signal 166. The counter 347 has a clear input connected to the DATA FIELD signal 346, and is cleared to zero before the data field begins. The counter 347 then counts each pulse on the $\overline{\text{RX CLOCK}}$ signal 156. In the case of a bit error, the counter 347 is still incremented to keep an accurate count of the addresses of the incoming bits, but the $\overline{\text{RX STROBE}}$ signal 167 is suppressed.

Figure 15:
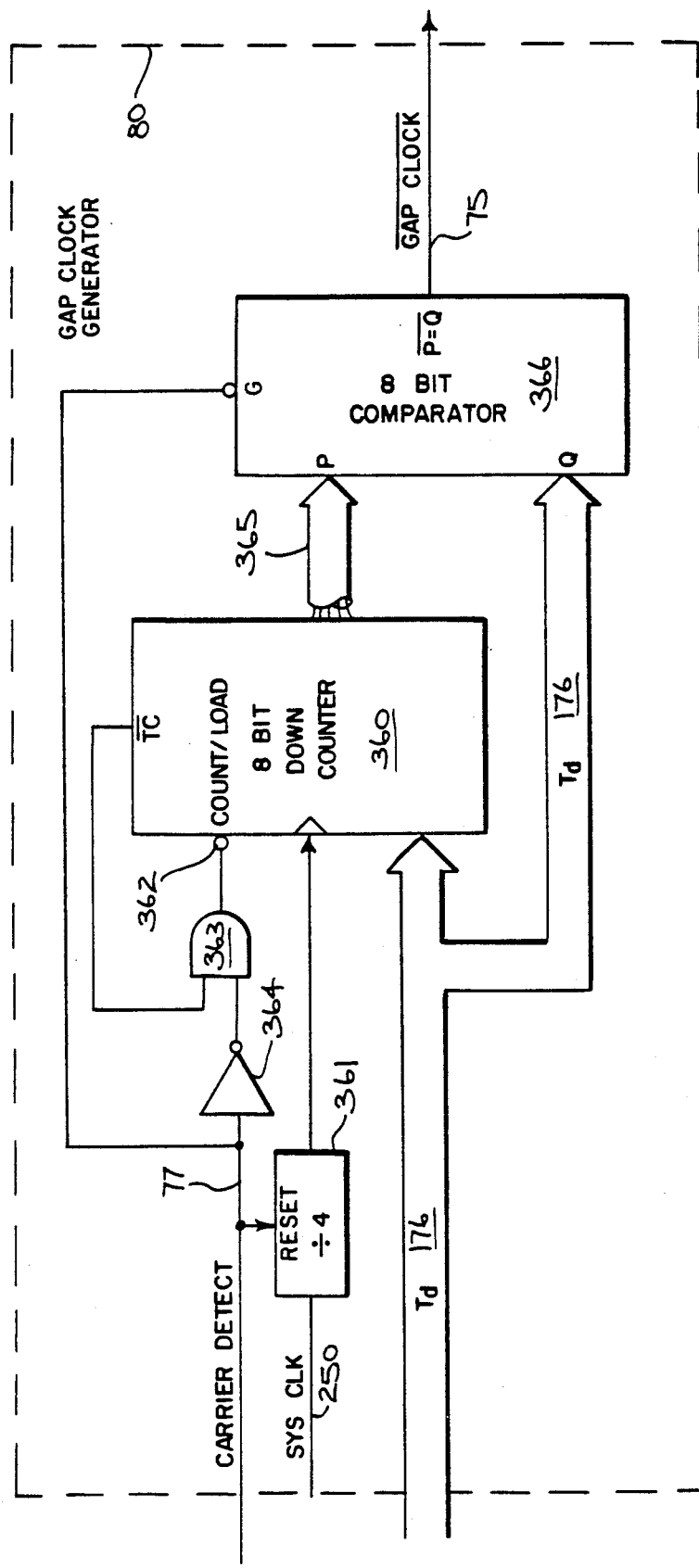
FIG. 15 is a circuit diagram for the Gap Clock Generator circuit of the network interface of FIG. 7.

Referring to FIG. 15, the operation of the Gap Clock Generator 80 is as follows. The value of $T_d$ 176 from the $T_d$ dip switch 175 is connected as the parallel input into a counter 360. The clock input of the counter 360 is connected to the SYSTEM CLOCK signal 250 through a "divide by four" counter 361. The counter 361 has a reset input connected to the CARRIER DETECT signal 77 so that counting begins from a full cycle.

Because of the divide by four counter 361, each increment of $T_d$ 176 represents four cycles of the SYSTEM CLOCK 250, or 0.5 microseconds. There are eight dip switches in $T_d$ dip switch 175, yielding a maximum setting of 255, corresponding to 127.5 microseconds. Usually, the value of $T_d$ 176 is on the order of a few microseconds, with larger delays only occurring in systems which use repeaters or for very long distance systems.

A Count/Load input 362 on the counter 360 determines whether the counter 360 is to be loaded with $T_d$ 176 in parallel, or is to count down towards zero. The Count/Load input 362 is connected to the output of AND gate 363. One input of AND gate 363 is connected to the CARRIER DETECT signal 77 through inverter 364. When the CARRIER DETECT signal 77 is high (e.g. true), for example when receiving an incoming message, the output of inverter 364 is low, forcing the output of AND gate 363 low, thereby instructing the counter 360 to "Load".

The output 365 of counter 360 while the CARRIER DETECT signal 77 is high is therefore always equal to the value of $T_d$ 176 being loaded, and is applied in parallel to an input "P" of an eight bit comparator 366. The other input, "Q", of comparator 366 is connected to the value of $T_d$ 176 itself, and so initially both inputs of comparator 366 are equal. However, the CARRIER DETECT signal 77 is connected to a gate input "G" of comparator 366, forcing the "P=Q" output of comparator 366 high.

When the incoming message ends, the CARRIER DETECT signal 77 goes low (e.g. false) and the output of comparator 366 is enabled. At that moment, since the "P" and "Q" inputs are initially equal, the "P=Q" output of comparator 366 goes low. This "P=Q" output of comparator 366 is the $\overline{\text{GAP CLOCK}}$ signal 75.

The CARRIER DETECT signal 77 going low also causes the output of inverter 364 into AND gate 363 to become high. The other input of AND gate 363 is connected to the "Terminal Count", or "TC" output of the counter 360. The TC output is low only when the count contained in the counter 360 is equal to zero. When the CARRIER DETECT signal 77 first goes low, the TC output is high since $T_d$ 176 has just been loaded. At this time, then, the output of AND gate 363 is high, instructing the counter 360 to begin counting down. In other words, the gap clock is running.

When the counter 360 counts down the first increment, the output 365 is no longer equal to $T_d$ 176 and the $\overline{\text{GAP CLOCK}}$ signal 75 is once again made high. The $\overline{\text{GAP CLOCK}}$ signal 75 therefore remains low only for the duration of a single cycle of the SYSTEM CLOCK 250.

This negative going pulse on the $\overline{\text{GAP CLOCK}}$ signal 75 occurs in response to the end of an incoming message and causes the Gap Timer 70 to increment to the next slot #. The $\overline{\text{GAP CLOCK}}$ signal 75 remains high while the counter 360 continues to count down. If another message begins before the counter 360 has counted down to zero, as indicated by the CARRIER DETECT signal 77 becoming true, then the counter 360 is again loaded with $T_d$ 176, in effect resetting the gap clock. The $\overline{\text{GAP CLOCK}}$ signal 75 still remains high due to the high on the CARRIER DETECT signal 77 being applied to the gate input G of comparator 366.

If on the other hand, the count in the counter 360 reaches zero before another message is detected, the "TC" output of counter 360 goes low, forcing a low on the output of AND gate 363. With the Count/Load input 362 low, the counter 360 loads the value of $T_d$ 176 on the next clock input of the counter 360. When $T_d$ 176 is loaded into counter 360, the comparator 366 will once again find equivalence, and the $\overline{\text{GAP CLOCK}}$ signal 75 becomes low. When the counter 360 again begins counting down, the $\overline{\text{GAP CLOCK}}$ signal 75 again goes high. This second negative going pulse on the $\overline{\text{GAP CLOCK}}$ signal 75 causes the Gap Timer 70 to again increment the slot #.

This process is repeated each time the counter 360 counts down to zero without detecting an incoming message. As soon as a message is detected, the Gapa Clock Generator 80 resets as described above.

Figure 16:
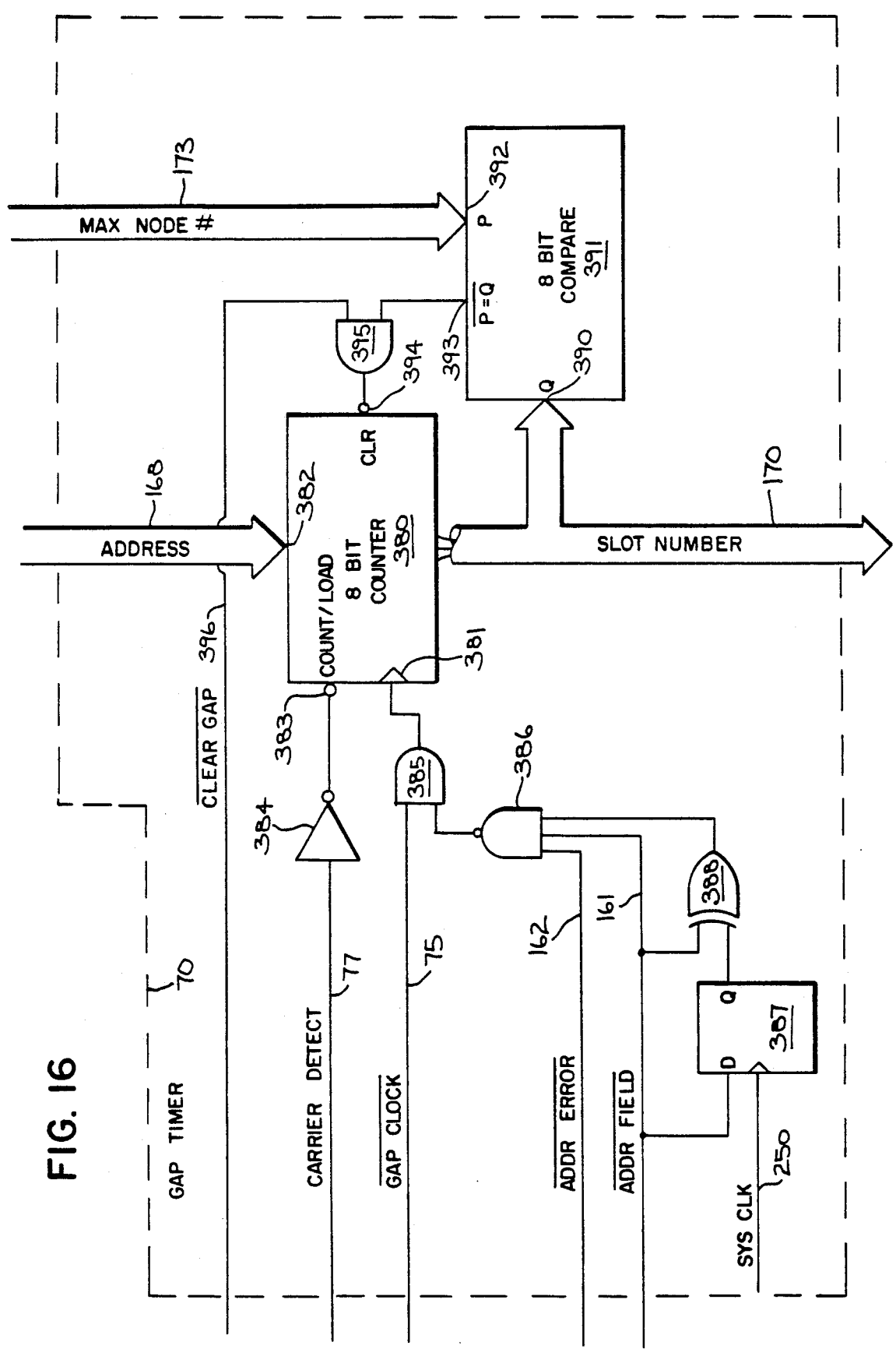
FIG. 16 is a circuit diagram for the Gap Timer circuit of the network interface of FIG. 7.

Referring to FIG. 16, the Gap Timer 70 maintains the current slot number in an 8 bit counter 380. The parallel output of counter 380 is the SLOT NUMBER signal 170. The counter 380 has a clock input 381 which can cause the counter 380 to either count up or load in parallel from a parallel input 382. A Count/Load input 383 on counter 380 selects which of these two operations are to be performed, and is connected to the CARRIER DETECT signal 77 through an inverter 384.

The parallel input 382 is connected to the parallel address output 168 of the address shift register 74. When a message is being received, the CARRIER DETECT signal 77 is high, placing a low on the LOAD input 383 and instructing the counter 380 to load from the parallel input 382 on the next rising edge of the clock input 381.

The clock input 381 is connected to the output of AND gate 385, which allows the counter 380 to be clocked from two different sources. The source which produces the pulse to clock in the parallel address 168 is the output of NAND gate 386. If the $\overline{\text{ADDR ERROR}}$ signal 162 is low, signifying that the source address field 53 was received without error, the NAND gate 386 produces a pulse, through the action of flip-flop 387 and EXCLUSIVE-OR gate 388, when the $\overline{\text{ADDR FIELD}}$ signal 161 transitions from true to false (e.g. low to high), signifying that the last bit of the source address field 53 has just been received. When this occurs, the address just received is on the bus 168 and is clocked into the counter 380 as the new SLOT NUMBER 170.

If the $\overline{\text{ADDR ERROR}}$ signal 162 is low, signifying an error in the received source address field 53, the output of NAND gate 386 is forced high. In that case, the pulse from NAND gate 386, and therefore the loading of the address 168, is inhibited.

While the CARRIER DETECT signal 77 is low (e.g. between messages), counter 380 is in the "count up" mode. The other input of AND gate 385 is connected to the $\overline{\text{GAP CLOCK}}$ signal 75. While the CARRIER DETECT signal 77 is low, each negative going pulse on the $\overline{\text{GAP CLOCK}}$ signal 75 causes the counter 380 to increment until the MAX NODE #173 is reached.

To detect when the MAX NODE #173 is reached the SLOT NUMBER signal 170 connects to the "Q" input 390 of an eight bit comparator 391. The "P" input 392 of comparator 391 is connected to the MAX NODE # parallel output 173 from the maximum node # dip switch 172. When the SLOT NUMBER 170 is equal to the MAX NODE #173, the inverted "P=Q" output 393 of comparator 391 becomes low. This output 393 is applied to one input of AND gate 395. The output of AND gate 395 is connected to a "clear" input 394 of the counter 380. When the MAX NODE #173 is equal to the SLOT NUMBER 170, the "P=Q" output 393 is low forcing a low on the output of AND gate 395 and therefore the clear input of counter 380. In this condition, the counter 380 is reset to zero on the next rising edge of the clock input 381.

The other input of AND gate 395 is connected to the $\overline{\text{CLEAR GAP}}$ signal 396. The $\overline{\text{CLEAR GAP}}$ signal 396 is produced by the Initialize and RX Fault Monitor circuit 178 and is used to reset the counter 380 to zero under certain initialization conditions which are described below.

Figure 17:
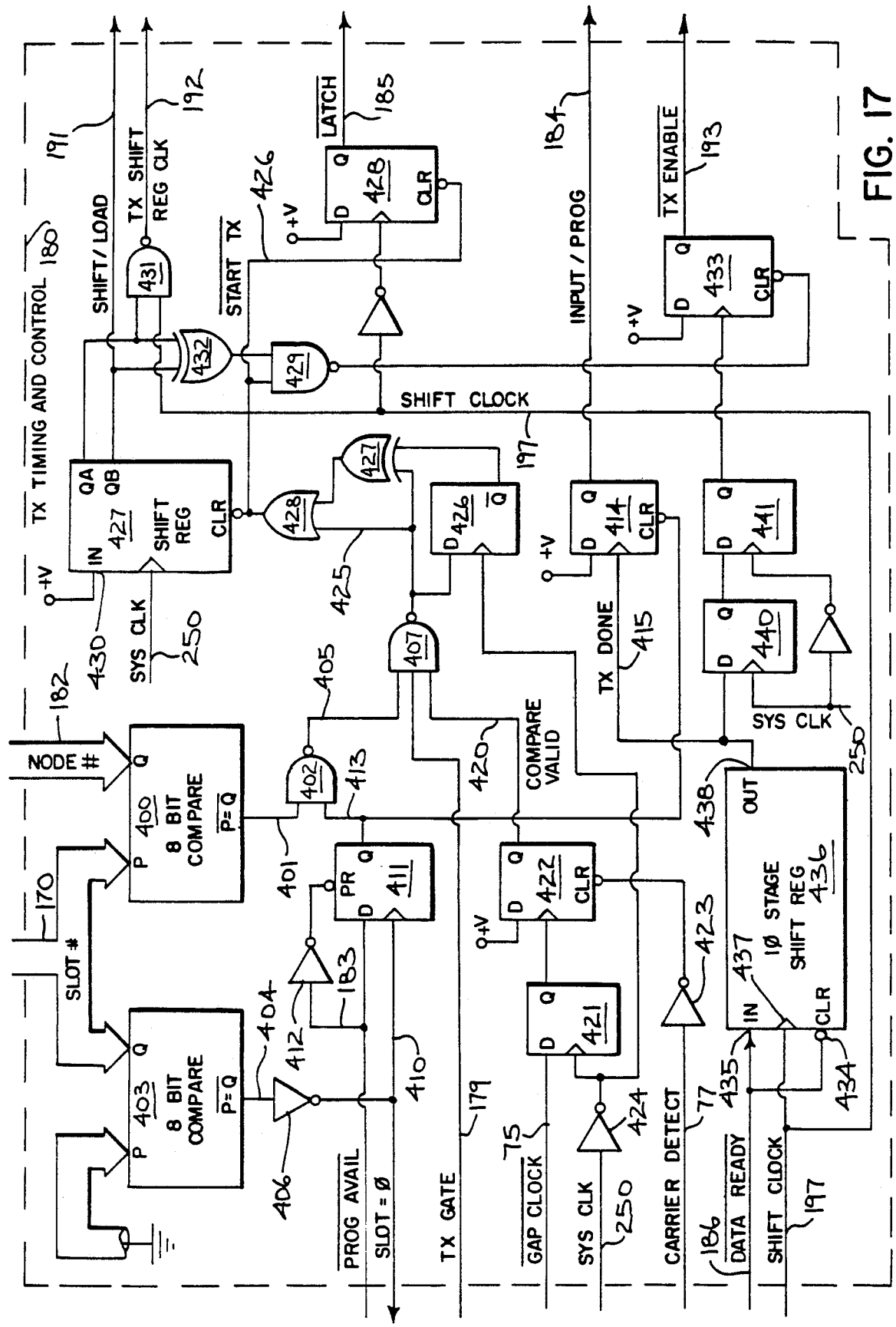
FIG. 17 is a circuit diagram for the TX Timing and Control circuit of the network interface of FIG. 7.

Referring to FIG. 17, the TX Timing and Control circuit 180 monitors the SLOT NUMBER 170 to determine when to start a transmit cycle. One eight bit comparator 400 compares the SLOT NUMBER 170 to the NODE #182, which is the node's own address set by the node address dip switch 181. The output 401 of comparator 400 connects to one input of NAND gate 402. If the SLOT NUMBER 170 is equal to the NODE #182, output 401 will be low, forcing a high on the output of NAND gate 402.

Another eight bit comparator 403 is used to compare the SLOT NUMBER 170 with "zero", i.e. the "P" inputs of comparator 403 are all connected to ground. If the SLOT NUMBER 170 is equal to zero, the output 404 of comparator 403 will be low. Output 404 is connected to an inverter 406 to generate a "SLOT=0" signal 410. The SLOT=0 signal 410 is connected as an input to the Initialize and RX Fault Monitor circuit 178 and also to the clock input of a flip-flop 411. The "D" input of flip-flop 411 is connected to the $\overline{\text{PROG AVAIL}}$ signal 183.

The $\overline{\text{PROG AVAIL}}$ signal 183 also connects through an inverter 412 to the preset input of flip-flop 411. If programming information is available from the Input Mapping circuit 140, the $\overline{\text{PROG AVAIL}}$ signal 183 is low. If the $\overline{\text{PROG AVAIL}}$ signal 183 is low when flip-flop 411 is clocked, flip-flop 411 is reset. The output Q 413 of flip-flop 411 is therefore low to signal the start of a transmit cycle for a program frame 51.

Output Q 413 of flip-flop 411 connects to a clear input of a flip-flop 414. The output of flip-flop 414 is the INPUT/PROG signal 184, and is set low when output 413 of flip-flop 411 is low. The low on INPUT/PROG signal 184 indicates to the Input Mapping circuit 140 that program data is to be transmitted in this transmit cycle. Once set low, the INPUT/PROG signal 184 remains low until the transmit cycle is over, when a rising edge on a TX DONE signal 415 clocks a high into flip-flop 414.

Output 413 of flip-flop 411 also connects to the other input of NAND gate 402. Output 405 of NAND gate 402 is therefore high when either a program frame 51 or a data frame 50 is to be transmitted. Before starting a transmit cycle, however, other conditions have to be satisfied by NAND gate 407.

Output 405 of NAND gate 402 connects to one input of NAND gate 407. Another input of NAND gate 407 is connected to the TX GATE signal 179, which will be high if transmissions are allowed by the Initialize and RX Fault Monitor circuit 178. The third input to NAND gate 407 is a COMPARE VALID signal 420. The COMPARE VALID signal 420 is generated by flip-flops 421 and 422 and is used to insure that the comparisons in comparators 400 and 403 are sampled at the proper time. The operation of flip-flops 421 and 422 is as follows.

When a message is being received, the CARRIER DETECT signal 77 is high, which when applied through inverter 423 holds flip-flop 422 cleared. When the message ends, the CARRIER DETECT signal 77 goes low and flip-flop 422 is enabled. As described above, a pulse will be produced on the $\overline{\text{GAP CLOCK}}$ signal 75, incrementing the SLOT NUMBER 170, as soon as the CARRIER DETECT signal 77 goes low.

The $\overline{\text{GAP CLOCK}}$ signal 75 is connected to the "D" input of flip-flop 421. The clock input of flip-flop 421 is clocked by the SYSTEM CLOCK 250 through inverter 424 so that the $\overline{\text{GAP CLOCK}}$ signal 75 is sampled on the falling edge of the SYSTEM CLOCK 250. Flip-flop 421 therefore delays the pulse on the $\overline{\text{GAP CLOCK}}$ signal 75 for one half period of the SYSTEM CLOCK 250 to allow the new value for the SLOT NUMBER 170 to be used by comparators 400 and 403. After the delay, the rising edge on the output Q of flip-flop 421 clocks a high into flip-flop 422, setting the COMPARE VALID signal 420 high.

When the three conditions on NAND gate 407 are all high, the output 425 of NAND gate 407 goes low to initiate a transmit cycle. Output 425 is applied to flip-flop 426, EXCLUSIVE-OR gate 427 and OR gate 428. When the output 425 makes the transition from high to low, the inverted output of flip-flop 426 remains low for one cycle of the SYSTEM CLOCK 250, resulting in a low output on EXCLUSIVE-OR gate 427 and OR gate 428. On the following clock cycle, flip-flop 426 will reset and the outputs of gates 427 and 428 will again be high. The output of OR gate 428 is therefore a low going pulse with a duration of one cycle of the SYSTEM CLOCK 250, which is the $\overline{\text{START TX}}$ signal 426 and is used to initiate a transmit cycle.

The $\overline{\text{START TX}}$ signal 426 is applied to the clear input of shift register 427, the clear input of flip-flop 428, and one input of NAND gate 429. Flip-flop 428 produces the $\overline{\text{LATCH}}$ signal 185. When flip-flop 428 is cleared by the $\overline{\text{START TX}}$ signal 426, the $\overline{\text{LATCH}}$ signal 185 is forced low. Flip-flop 428 remains reset until the first $\overline{\text{SHIFT CLOCK}}$ 197 is received from the Manchester Encoder 195, clocking flip-flop 428 high.

Shift Register 427 is also cleared by the $\overline{\text{START TX}}$ pulse 426. When shift register 427 is cleared, outputs QA and QB of shift register 427 become low. The low on output QA of shift register 427 forces a low on the output of AND gate 431, which is the TX SHIFT REGISTER CLOCK signal 192. At the same time, output QB of shift register 427 is also cleared to low, and that output is connected as the SHIFT/LOAD signal 191 to the TX shift register 190.

Shift Register 427 is clocked by the SYSTEM CLOCK 250. The serial input 430 of shift register 427 is connected to a constant high, which shifts through outputs QA and QB of shift register 427. When the first rising edge of the SYSTEM CLOCK 250 is received after clearing shift register 427, the high on serial input 430 is shifted into output QA, which causes a rising edge on the TX SHIFT REGISTER CLOCK signal 192. Since the SHIFT/LOAD signal 191 is still low, this causes the value of the SLOT NUMBER 170 to be loaded into the TX shift register 190.

Outputs QA and QB of shift register 427 are also applied to the inputs of EXCLUSIVE-OR gate 432. At this time, with QA high and QB low, the output of EXCLUSIVE-OR gate 432 is high. The high on the output of EXCLUSIVE-OR gate 432 is applied to one input of NAND gate 429. The other input of NAND gate 429 at this point is also high from the $\overline{\text{START TX}}$ signal 426. The output of NAND gate 429 is therefore low, and is applied to the clear input of flip-flop 433. The output Q of flip-flop 433 is the $\overline{\text{TX ENABLE}}$ signal 125 and becomes true (e.g. low) when flip-flop 433 is cleared.

When a second rising edge of the SYSTEM CLOCK 250 is applied to shift register 427, both outputs QA and QB become high and will remain high for the duration of the transmit cycle. The SHIFT/LOAD signal 191 on output QB is therefore restored high to instruct the TX shift register 190 to "shift". And with output QA high, AND gate 431 responds only to the SHIFT CLOCK signal 197, effectively connecting it to the clock input line 192 for the TX shift register.

Having been initialized as just described, the transmit cycle continues until the $\overline{\text{DATA READY}}$ signal 186 from the Input Mapping circuit 140 becomes false (high). After that, exactly nine more bits need to be transmitted, the eight bits contained in the TX shift register 190 and the one bit buffer in the Manchester Encoder 195.

The $\overline{\text{DATA READY}}$ signal 186 is connected to the clear input 434 and the serial input 435 of a ten stage shift register 436. The clock input 437 for the shift register 436 is connected to the SHIFT CLOCK signal 197. The shift register 436 is initially cleared by the low on the $\overline{\text{DATA READY}}$ signal 186 while transmitting. When the $\overline{\text{DATA READY}}$ signal 186 becomes false (high), shift register 436 is enabled and begins shifting in a high from the serial input 435 for each occurrence of a rising edge on the SHIFT CLOCK signal 197.

Ten cycles of the SHIFT CLOCK 197 are needed to shift the nine bits described above through the Manchester Encoder 195. After ten cycles of the SHIFT CLOCK signal 197, the output 438 of shift register 436 becomes high, and represents a TX DONE signal 415. The TX DONE signal 415, in addition to clocking flip-flop 414 as described above, is latched through flip-flops 440 and 441 in master slave fashion to allow the last transition of the TX SIGNAL 123 to be completed before disabling the transmitter 124. The output Q of flip-flop 442 then clocks flip-flop 433 high, making the $\overline{\text{TX ENABLE}}$ signal 125 false (e.g. high) thereby terminating the transmit cycle.

Figure 18:
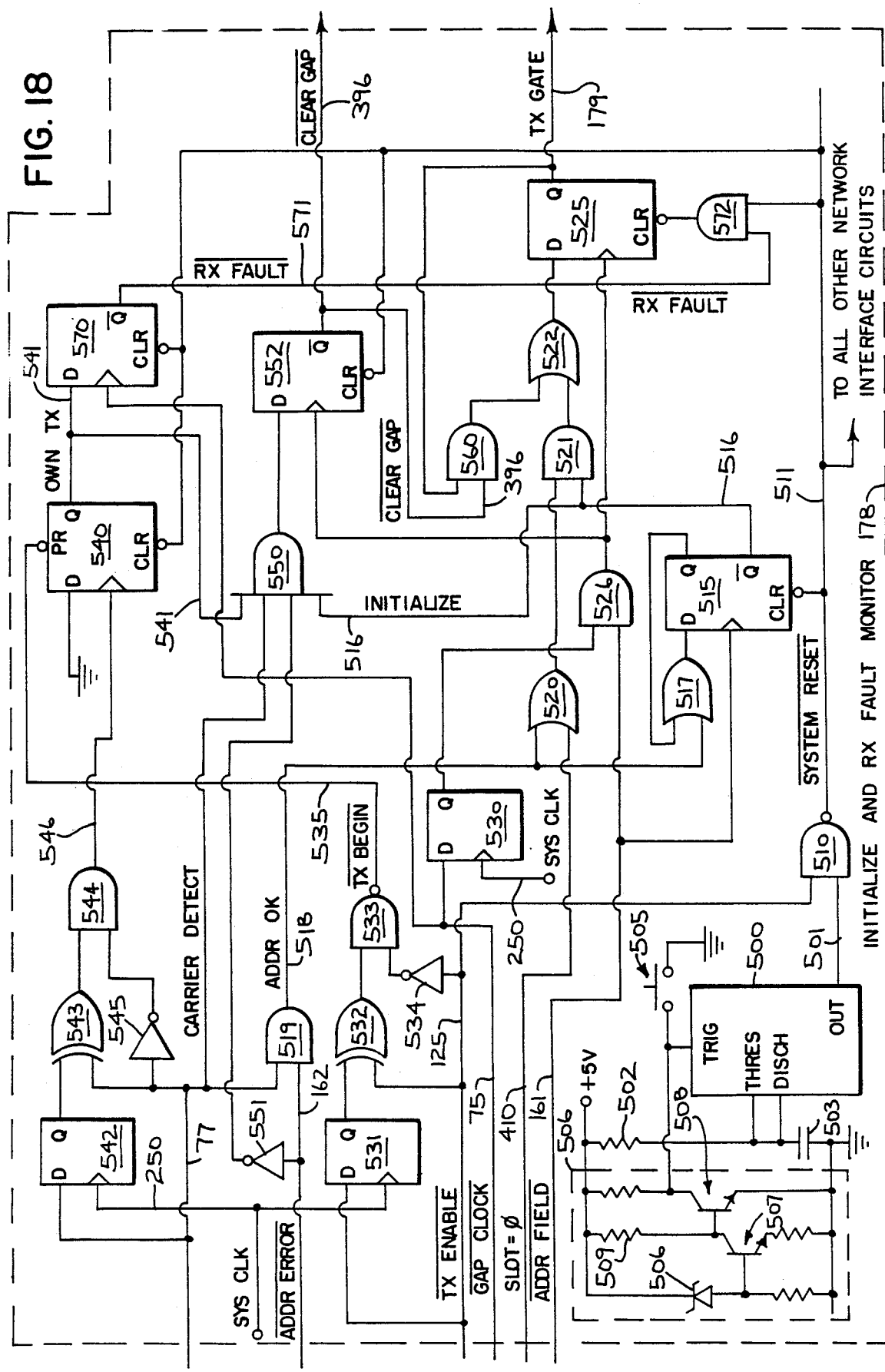
FIG. 18 is a circuit diagram for the Initialize and RX Fault Monitor circuit of the network interface of FIG. 7.

Referring to FIG. 18, when power is first applied to the network interface 120, the Initialize and RX Fault Monitor circuit 178 generates a pulse on a $\overline{\text{SYSTEM RESET}}$ signal 511 and then begins an initialization period. The $\overline{\text{SYSTEM RESET}}$ signal 511 is connected as a master reset to all other circuits in the network interface 120, although explicit connections are not shown for simplicity.

To generate the $\overline{\text{SYSTEM RESET}}$ signal 511, the Initialize and RX Fault Monitor circuit 178 includes a timer 500 for generating a reset pulse on output line 501. The pulse duration is determined by timing resistor 502 and timing capacity 503. The trigger input (TRIG) of timer 500 is connected to a manual reset switch 505 and a voltage monitoring circuit 506.

The voltage monitoring circuit 506 is connected to the +5 volt power supply. Zener diode 506 has a 4.3 volt threshold, and so if the power supply voltage is proper, transistor 507 is held on and transistor 508 is held off. If the power supply voltage drops below approximately 4.75 volts, transistor 507 is cut off and transistor 508 is turned on by resistor 509, causing timer 500 to trigger. The timer 500 is therefore triggered during power up and whenever the power supply drops below 4.75 volts, and of course when manually reset by switch 505.

NAND gate 510 is used to block the reset pulse on the output 501 of timer 500 from being applied to the $\overline{\text{SYSTEM RESET}}$ signal 511 whenever the node is transmitting. In such cases, the transmission is very short and is allowed to complete to prevent spurious signals from being introduced into the network. The output 501 of timer 500 is connect to one input of NAND gate.510. The other input of NAND gate 510 is connected to the $\overline{\text{TX ENABLE}}$ signal 125. The output of NAND gate 510 is the $\overline{\text{SYSTEM RESET}}$ signal 511, and is held high whenever the $\overline{\text{TX ENABLE}}$ signal 125 is true (e.g. low) indicating that a transmission is in progress. The duration of the pulse on the reset pulse on the output 501 of timer 500 is approximately 1 millisecond, which is much longer than a transmission. So if a transmission is in progress, only a portion of the reset pulse on the output 501 of timer 500 is blocked.

Flip-flop 515 is cleared by the $\overline{\text{SYSTEM RESET}}$ signal 511 to start the initialization period. The inverted output of flip-flop 515 is an INITIALIZE signal 516. The initialization period is ended by setting flip-flop 515 when a valid source address is received as follows. The clock input of flip-flop 515 is connected to the $\overline{\text{ADDR FIELD}}$ signal 161. An ADDR OK signal 518 is produced by AND gate 519 and is high whenever the CARRIER DETECT signal 77 is true (e.g. high) and the $\overline{\text{ADDR ERROR}}$ signal 162 is false (e.g. high).

At the end of reception of a source address field 53, the $\overline{\text{ADDR FIELD}}$ signal 161 goes high, clocking flip-flop 515. If at that time, the ADDR OK signal 518 is high, then it is coupled through OR gate 517 to the D input of flip-flop 515, causing it to set. Once flip-flop 515 sets, the initialization period is over. The noninverted output Q of flip-flop 515 is applied to the other input of OR gate 517, locking flip-flop 515 in the set condition until once again cleared by a pulse on the $\overline{\text{SYSTEM RESET}}$ signal 511.

In addition to setting flip-flop 515, the reception of a valid source address field 53 during the initialization period also sets the TX GATE signal 179, which is the output of flip-flop 525. The $\overline{\text{ADDR FIELD}}$ signal 161 is coupled through AND gate 526 to the clock input of flip-flop 525. The ADDR OK signal 518 is coupled through OR gate 520 to one input of AND gate 521. The other input of AND gate 521 is connected to the INITIALIZE signal 516.

During the initialization period, the INITIALIZE signal 516 is high. If the ADDR OK signal 518 is high, the output of AND gate 521 will be high. The high on the output of AND gate 521 is coupled through OR gate 522 to the D input of flip-flop 525, causing it to set when clocked by the rising edge of the $\overline{\text{ADDR FIELD}}$ signal 161. The TX GATE signal 179 is thereby set true (e.g. high) at the same time that the initialization period ends. The TX GATE signal 179 is fed back through AND gate 560 and OR gate 522 to the D input of flip-flop 525, thereby holding flip-flop 525 set, unless reset by error conditions which are described below.

The above described initialization sequence is applicable to a node joining a network in which other nodes on the network are already actively broadcasting. However, it is possible that a node may be the first to come up on a network. In that case, a valid source address field 53 cannot be received because no other nodes are transmitting. To detect this situation, the Initialize and RX Fault Monitor circuit 178 waits for one complete cycle of the Gap Timer 70. If no transmissions are heard by the, the TX GATE signal 179 is enabled.

To determine when one complete cycle of the Gap Timer 70 has been completed, the SLOT=0 signal 410 is used. The SLOT NUMBER 170 is initially set to zero by the pulse on the $\overline{\text{SYSTEM RESET}}$ signal 511, and so the SLOT=0 signal 410 is initially true (e.g. high). As the SLOT NUMBER 170 is incremented by the $\overline{\text{GAP CLOCK}}$ signal 75, the SLOT=0 signal 410 will go false (e.g.low). When the SLOT=0 signal 410 becomes high a second time, the Gap Timer 70 has completed a cycle.

The SLOT=0 signal 410 is coupled through OR gate 520, AND gate 521, and OR gate 522 to the D input of flip-flop 525. The $\overline{\text{GAP CLOCK}}$ signal 75 is delayed by one cycle of the SYSTEM CLOCK 250 by flip-flop 530. The output of flip-flop 530 is coupled through AND gate 526 to the clock input of flip-flop 525. This delay in the $\overline{\text{GAP CLOCK}}$ signal 75 ensures that the SLOT=0 signal 410 is stable and further prevents flip-flop 525 from being set by the SLOT=0 signal 410 until the second time that the SLOT=0 signal 410 becomes high. When the SLOT=0 signal 410 does become high a second time, it is clocked into flip-flop 525 by the $\overline{\text{GAP CLOCK}}$ signal 75 delayed through flip-flop 530, and the TX GATE signal 179 is made true (e.g. high).

In the above described initialization on a dead network, it is possible that more than one node are initializing at the same time. In that case, it is further possible that two or more nodes may begin transmitting simultaneously and interfere with each other's transmission. This is possible because none of the nodes have heard a valid source address yet and so synchronization has not been achieved. The Initialize and RX Fault Monitor circuit 178 tests for such a coincidence by ensuring that the source address field 53 from the first transmission is received without error.

If an error is detected in reception of the source address field 53 on a transmission during the initialization period, then it is assumed that a collision has occurred. In order to preclude further collisions, the Initialize and RX Fault Monitor circuit 178 generates a $\overline{\text{CLEAR GAP}}$ signal 396, which causes the Gap Timer 70 to clear the SLOT NUMBER 170 to zero. This action will take place in all of the nodes that were interfering, i.e. that detected errors on their own transmissions. Therefore, the interfering nodes all have their Gap Timers 70 starting from zero at the same time, as soon as the last of the interfering broadcasts ends. Then, all of the interfering nodes start this initialization algorithm over from the beginning (i.e. waiting one complete cycle of the gap clock, and then enabling the TX GATE signal 179). The lowest numbered node will then transmit first, and synchronization will be achieved. The above described error condition is detected as follows.

To detect the beginning of a node's own transmission, the $\overline{\text{TX ENABLE}}$ signal 125 is applied to the D input of flip-flop 531. Flip-flop 531 is clocked by the SYSTEM CLOCK signal 250. EXCLUSIVE-OR gate 532, NAND gate 533, and inverter 534 are connected to produce a $\overline{\text{TX BEGIN}}$ signal 535 on the output of NAND gate 533. Each time the tx enable signal transitions from false to true (e.g. high to low), the $\overline{\text{TX BEGIN}}$ signal 535 produces a negative going pulse with a duration of one cycle of the SYSTEM CLOCK 250. The $\overline{\text{TX BEGIN}}$ signal 535 is connected to the preset input of flip-flop 540. The output Q of flip-flop 540 is then an "OWN TX" signal 541, which is high whenever a node's own transmission is in progress.

Flip-flop 542, EXCLUSIVE-OR gate 543, AND gate 544 and inverter 545 are connected to produce an RX END signal 546 on the output of AND gate 544. The RX END signal 546 produces a positive going pulse with a duration of one cycle of the SYSTEM CLOCK 250 each time the CARRIER DETECT signal 77 makes a transition from true to false (e.g. high to low), signifying the end of a message. The RX END signal 546 is connected to the clock input of flip-flop 540. The D input of flip-flop 540 is fixed low, so that flip-flop 540, and therefore the OWN TX signal 541, is reset when clocked by the RX END signal 546 at the end of each message.

AND gate 550 is used to detect the collision of a node's own transmission during the initialization period with the transmission of another node. The inputs of AND gate 550 are connected to the OWN TX signal 541, the CARRIER DETECT signal 77, the $\overline{\text{ADDR ERROR}}$ signal 162 through inverter 551, and the INITIALIZE signal 516. When all of these inputs are high, then an error has occurred in the reception of the node's own source address field 53 and the output of AND gate 550 is high. The output of AND gate 550 is connect to the D input of a flip-flop 552.

Flip-flop 552 is clocked by the output of AND gate 526. When the ADDR FIELD signal 161 goes false (e.g. high) at the end of the source address field 53, the rising edge propagates through AND gate 526 to clock flip-flop 552. If the above described error condition is present at that time, flip-flop 552 will set.

The inverted output $\overline{Q}$ of flip-flop 552 is the $\overline{\text{CLEAR GAP}}$ signal 396, and will become true (e.g. low) when flip-flop 552 is set. The $\overline{\text{CLEAR GAP}}$ signal 396 is applied to the Gap Timer 70 to clear the SLOT NUMBER 170 to zero as described above. The $\overline{\text{CLEAR GAP}}$ signal 396 is also applied to one input of AND gate 560, and if low, forces a low on the output of AND gate 560. With the output of AND gate 560 low, flip-flop 525 will no longer be held set by the feedback of the TX GATE signal 179 through AND gate 560. The low on the $\overline{\text{CLEAR GAP}}$ signal 396 therefore causes flip-flop 525 to reset when next clocked, and the TX GATE signal will be made false (e.g. low).

When the last of the interfering messages ends, the above described process is repeated. The node with the lowest node address of those nodes that were interfering will begin transmitting first. If further collisions should occur, for example, due to more nodes attempting to join the network which did not hear previous collisions, the above process repeats until a valid source address field 53 is broadcast.

The Initialize and RX Fault Monitor circuit 178 also monitors for another fault condition in which a node does not even detect the carrier of its own transmission. Such a condition is called a receiver fault condition and represents a serious fault within the node. To detect a receiver fault, the OWN TX signal 541 is connected to the D input of flip-flop 570. The clock input of flip-flop 570 is connected to the $\overline{\text{GAP CLOCK}}$ signal 75. Normally, the $\overline{\text{GAP CLOCK}}$ signal 75 should rmain high while a nodes own TX message is being received. However, if a node does not hear its own transmission, then a pulse will be produced on the $\overline{\text{GAP CLOCK}}$ signal 75 as if a node were missing.

If a pulse occurs on the $\overline{\text{GAP CLOCK}}$ signal 75 while the OWN TX signal 541 is high, then a receiver fault has occurred and flip-flop 570 will set. The inverted output $\overline{Q}$ of flip-flop 570 is then an $\overline{\text{RX FAULT}}$ signal 571. The $\overline{\text{RX FAULT}}$ signal 571 is connected to one input of AND gate 572. The output of AND gate 572 is connected to the clear input of flip-flop 525. If the $\overline{\text{RX FAULT}}$ signal 571 becomes true (e.g. low), flip-flop 525 is cleared and TX GATE signal 179 is made false.

Figure 19:
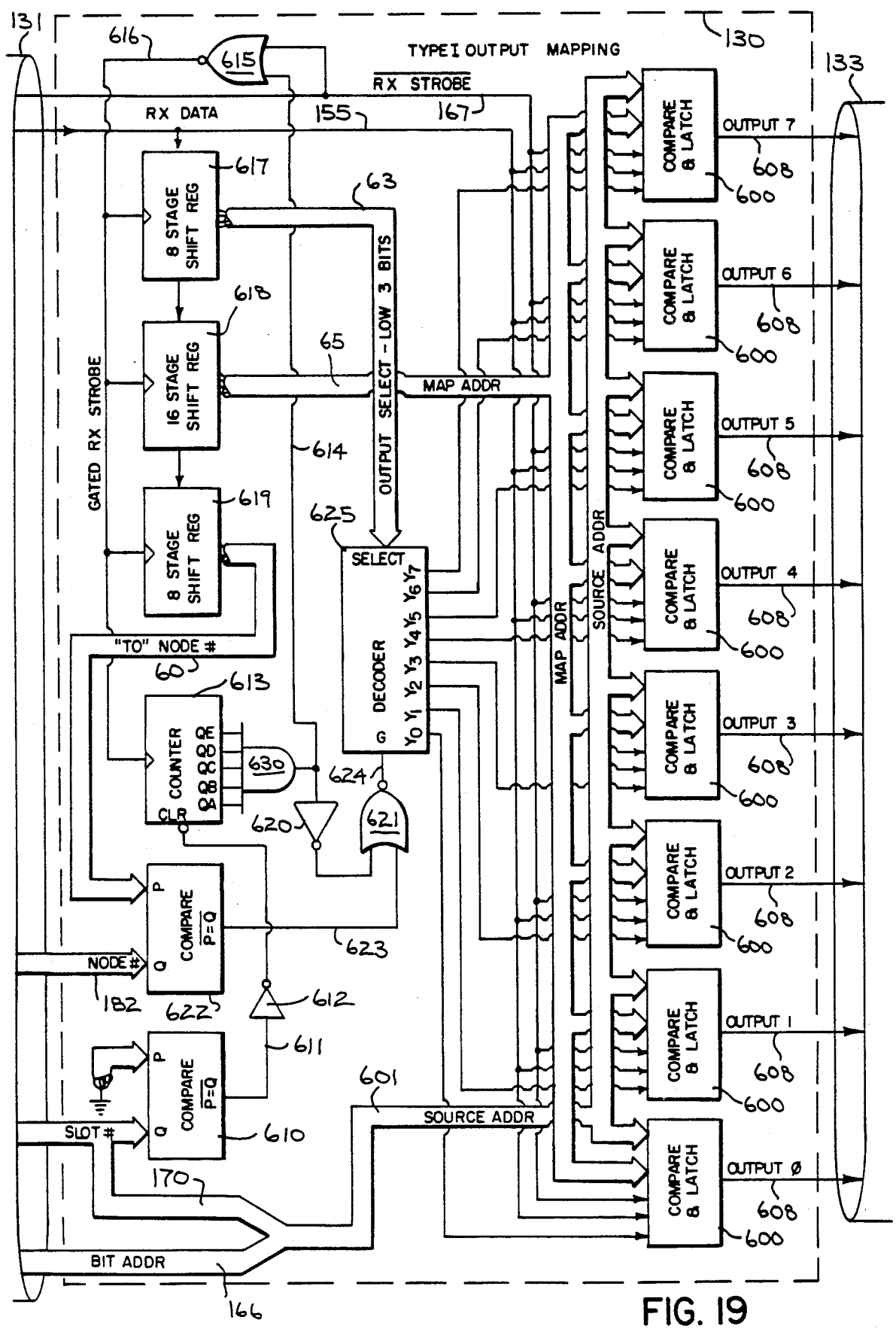
FIG. 19 is a block diagram of the Output Mapping circuit of the Type I node of FIG. 6.
Figure 20:
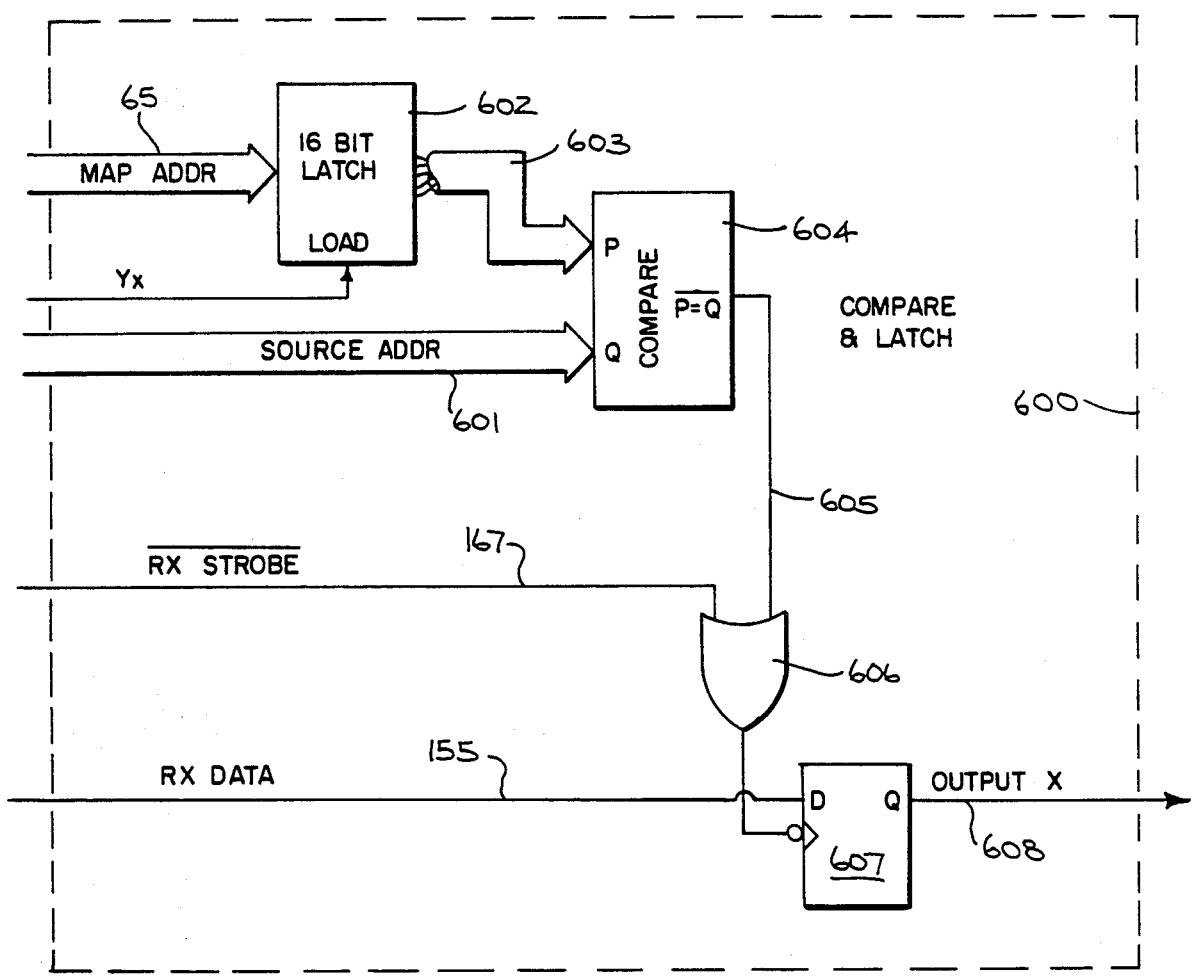
FIG. 20 is a circuit diagram of the Compare and Latch circuit of the Output Mapping circuit of FIG. 19.

Referring to FIGS. 19 and 20, the Type I Output Mapping circuit 130 includes eight parallel compare and latch circuits 600. Each compare and latch circuit 600 is connected to a SOURCE ADDR bus 601 which is a combination of the SLOT NUMBER bus 170 and the BIT ADDR bus 166. The SOURCE ADDR bus 601 is therefore 16 bits wide and specifies the complete source bit address for the bit being received.

The value of the bit being received is indicated by RX DATA signal 155. The $\overline{\text{RX STORE}}$ signal 167 is also connected to each compare and latch circuit 600 to indicate when the data should be latched.

Inside the compare and latch circuits 600 (FIG. 20), a 16 bit latch 602 contains one particular source address which designates the input bit which is to be mapped to this particular output bit 608. This particular source address is called the "map address". The map address on the output of latch 602 is applied through bus 603 to one input of a 16 bit comparator 604. The other input of comparator 604 is connected to the SOURCE ADDR bus 601.

If the comparison of comparator 604 indicates a match, then the input bit being received on the RX DATA signal 155 is the bit which is mapped to this output bit. In that case, the "P=Q" output 605 of comparator 604 becomes low. This output 605 is applied to one input of OR gate 606, the output of which is connected to the clock input of latch 607. The RX DATA signal 155 is connected to the D input of latch 607, and the $\overline{\text{RX STROBE}}$ signal 167 is connected to the other input of OR gate 606.

If the SOURCE ADDR 601 matches the map address contained in latch 602, then output 605 of comparator 604 will be low and the falling edge of $\overline{\text{RX STROBE}}$ signal 167 will latch the value of RX DATA signal 155 into the latch 607. The output of latch 607 is then the output signal 608 for the compare and latch circuit 600. If the bit source bus 601 does not match the map address contained in latch 602, then the output 605 of comparator 604 remains high and the $\overline{\text{RX STROBE}}$ signal 167 is blocked by OR gate 606.

The Type I Output Mapping circuit 130 thereby maps the value of the input bit at the address specified by the map address contained in latch 602 to the output 608. In this embodiment of the Type I Output Mapping circuit 130, the map address in the latch 602 may be changed, or "programmed" to effectively "connect" an input bit from any arbitrary source address to the output 608. This is accomplished by receiving a program frame 51 in the Type I Output Mapping circuit 130.

To detect an incoming program frame 51, the SLOT NUMBER 170 is applied to one input of an eight bit comparator 610. The other input of comparator 610 is connected to "0", i.e. all inputs grounded. If a program frame 51 is being received, the SLOT NUMBER 170 is equal to zero and the "P=Q" output 611 of comparator 610 is forced low.

Output 611 is connected through inverter 612 to the clear input of a counter 613. The counter 613 is used to count the 32 bits in the data field 54 of the program frame 51. A count of 31 on counter 613 indicates that all 32 bits of the data field 54 have been received, since the counter 613 starts from zero. Outputs QA through QE of counter 613 are applied to the inputs of AND gate 630. When a count of 31 has been reached the output 614 of AND gate 630 will go high.

Output 614 is connected to one input of NOR gate 615. The other input of NOR gate 615 is $\overline{\text{RX STROBE}}$ signal 167. When counter 613 is cleared, the low on output 614 allows $\overline{\text{RX STROBE}}$ signal 167 to be passed through to the output of NOR gate 615 to form a GATED RX STROBE signal 616.

The GATED RX STROBE signal 616 is connected to the clock inputs of three series connected shift register stages 617–619 and the clock input of counter 613. Each pulse on the $\overline{\text{RX STROBE}}$ signal 167 produces a pulse on GATED RX STROBE signal 616 causing the counter 613 increment and the RX DATA signal 155 to be shifted into the first shift register stage 617. After the 32 bits in the data field 54 of the program frame 51 have been received, output 614 of AND gate 630 becomes high and forces the GATED RX STROBE signal 616 on the output of NOR gate 615 low, blocking further clocks from being applied to the shift registers 617–619 and counter 613.

At this point the "to" node # subfield 60 of the program frame 51 is contained in the eight stage shift register 619; the input map address 65 of the program frame 51 is contained in the sixteen stage shift register 618; and the output bit address subfield 63 of the program frame 51 is contained in the eight stage shift register 617.

After the 32 bits in the data field 54 of the program frame 51 have been received, the "to" node # subfield 60 is examined to determine if the program frame 51 is addressed to this node. The "to" node # subfield 60 on the output of shift register 619 is connected to one input of comparator 622. The other input of comparator 622 is connected to the NODE # bus 182, which is this node's own address. If the "to" node # subfield 60 is equal to the NODE #182, then the program frame 51 is addressed to this node and will be accepted.

In that case, the "P=Q" output 623 of comparator 622 will be true (e.g. low) and is applied to one input of NOR gate 621. The other input of NOR gate 621 is connected to the output of AND gate 630 through inverter 620. When output 614 of AND gate 630 is high signifying that all 32 bits in the data field 54 of the program frame 51 have been received, the output of inverter 620 is low and the output 624 of NOR gate 621 high. The output of NOR gate 621 is connected to the gate input G of a decoder 625. When the output 624 of NOR gate 621 is high, signifying that the program frame 51 is addressed to this node, the decoder 625 is enabled.

The select input of decoder 625 is connected to the low order three bits of the output bit address 63 contained in shift register 617. Only the low order three bits are used in this embodiment because there are only eight output stages to be mapped into. More output stages could be easily accommodated by using the higher order bits of the output bit address 63.

The decoder 625 is of the "three line to eight line" type and when gated, causes one of the outputs Y0 to Y7, selected by the output bit address 63 to go low. Each of the outputs Y0–Y7 is connected to one of the compare and latch circuits 600, causing the selected compare and latch circuit 600 to load the input map address 65 contained in shift register 618 into the latch 602. The new contents of latch 602 will from then on select the input at the new input map address 65 to be mapped to the associated output 608, and the reprogramming is complete.

Many variations of this Output Mapping scheme are suitable for a wide variety of applications. For example, the latch 602 may be implemented using circuits which are nonvolatile so that it is not necessary to initially program all of the latches 602 following a power loss.

As another example, a mapping scheme may be employed where the latch 602 is replaced with a set of dip switches (not shown). In the latter case, the dip switches provide a means for manually reprogramming the mapping assignment for each bit by setting the dip switches accordingly. This embodiment is very effective for applications in which mapping assignments are not expected to change frequently, as reprogramming can still be done simply and without the need for a programming terminal 25.

It should also be apparent to one skilled in the art that the number of output bits in the Output Mapping circuit 130 can be scaled up or down to accommodate a greater or fewer number of output bits 608.

Figure 21:
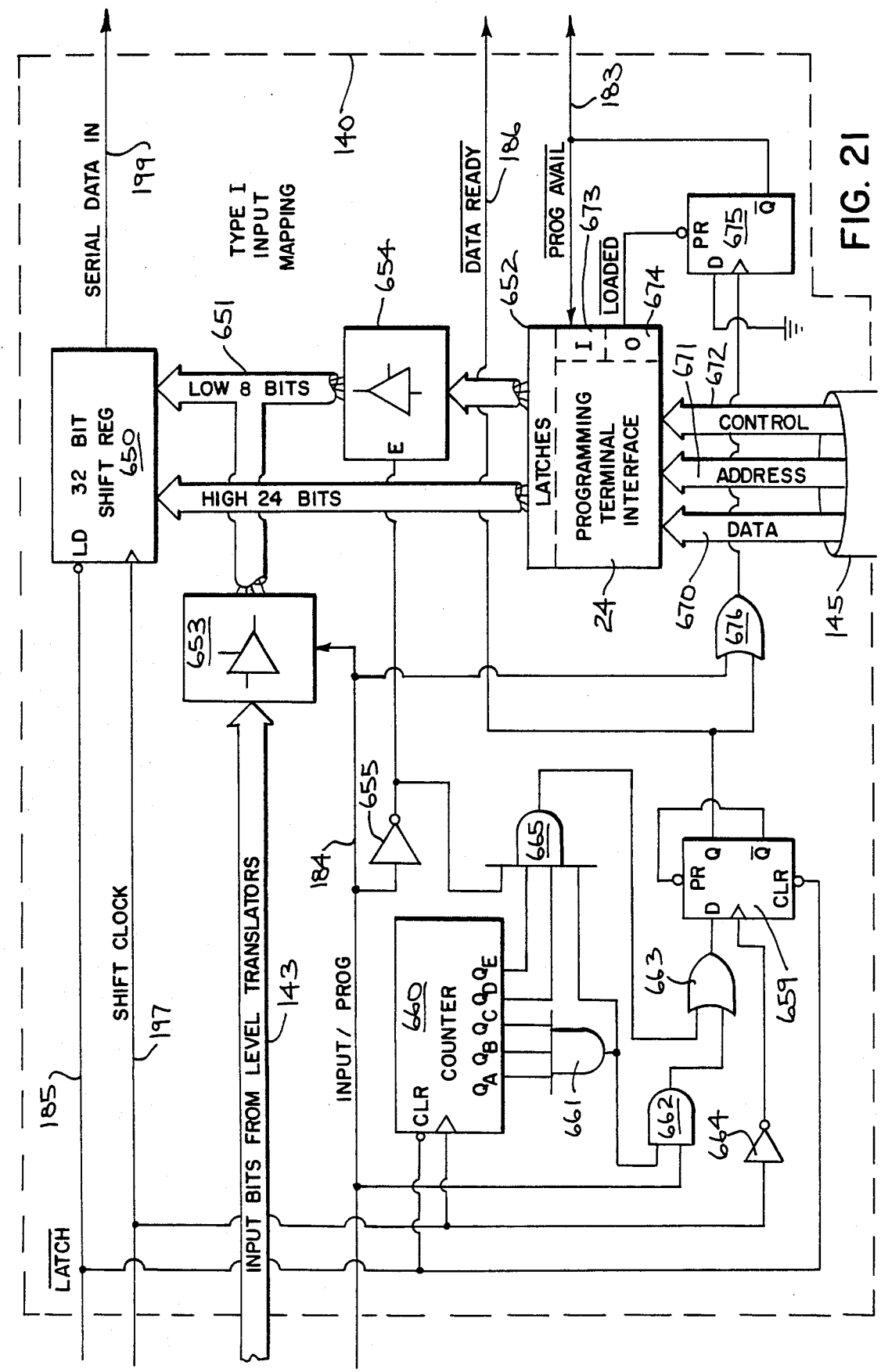
FIG. 21 is a block diagram of the Input Mapping circuit of the Type I node of FIG. 6.

Referring to FIG. 21, the Type I Input Mapping circuit 140 includes a 32 bit shift register 650 which can be loaded with the contents of either the input bits 143 from the level translators 142 or the programming information from the programming terminal interface 24. The type of data which is loaded is determined by the INPUT/PROG signal 184. If the INPUT/PROG signal 184 is high then a set of tri-state drivers 653 are enabled and apply the input bits 143 onto a bus 651.

The bus 651 is connected to the low order eight bits of a parallel input on shift register 650. Only the low order eight bits are used because this embodiment includes only eight input bits. A greater number of input bits could be easily accommodated by applying more bits to the bus 651.

If the INPUT/PROG signal 184 is low, then a second set of tri-state drivers 654 is enabled through inverter 655. In that case, programming information contained in a set of latches 652 in the programming terminal interface 24 is applied onto the bus 651. The high order 24 bits from the latches 652 are applied directly to the parallel input of shift register 650, as those high order bits are not used for input bits 143.

Once the INPUT/PROG signal 184 has been set by the TX Timing and Control circuit 180 to select the proper source for the shift register 650, a negative going pulse is produced on $\overline{\text{LATCH}}$ signal 185. The $\overline{\text{LATCH}}$ signal 185 is connected to a load input on shift register 650 to latch the data on the parallel input. The serial output of the shift register 650 is the SERIAL DATA IN signal 199. The SHIFT CLOCK signal 197 is connected to the clock input of shift register 650. Each time a rising edge occurs on the SHIFT CLOCK signal 197, shift register 650 is shifted one place, applying the next sequential bit to the SERIAL DATA IN signal 199.

The $\overline{\text{LATCH}}$ signal 185 is also applied to the clear input of a flip-flop 659. The negative going pulse on the $\overline{\text{LATCH}}$ signal 185 clears flip-flop 659. When this occurs, the output Q of flip-flop 659, which is the $\overline{\text{DATA READY}}$ signal 186, becomes low to signal that data is ready from the Type I Input Mapping circuit 140.

A counter 660 is then used to count the number of occurrences of the SHIFT CLOCK signal 197 needed to shift out the contents of the shift register 650. The exact count to be used depends upon the type of data (input bits 143 or programming information) that was latched. If input bits 143 were latched, then eight cycles of SHIFT CLOCK 197 are needed to shift the last bit through shift register 650. These eight cycles correspond to a count of seven on counter 660, since it is starting from zero. On the other hand, if programming information from the latches 652 was latched into the shift register 650, then 32 cycles of SHIFT CLOCK signal 197 are needed, corresponding to a count of 31 on the counter 660.

The counter 660 is cleared to zero by the negative going pulse on the $\overline{\text{LATCH}}$ signal 185, and increments for each rising edge on the SHIFT CLOCK signal 197. The outputs QA, QB and QC of counter 660 are the lower order three bits and are each connected to an input of AND gate 661. The output of AND gate 661 will therefore be high whenever these low order three bits are equal to "7".

The output of AND gate 661 is applied to one input of AND gate 662. The other input of AND gate 662 is connected to the INPUT/PROG signal 184. Therefore, if the INPUT/PROG signal 184 is high, signifying that input bits 143 had been loaded into the shift register 650, and the output of AND gate 661 is high, signifying that the count in counter 660 has reached "7", then the output of AND gate 662 is high and is applied through OR gate 663 to the D input of flip-flop 659. The clock input of flip-flop 659 is connected to the SHIFT CLOCK signal 197 through inverter 664, so that flip-flop 659 is clocked in between bit periods on the falling edge of SHIFT CLOCK signal 197.

When the output of OR gate 663 becomes high, the correct number of data bits have been shifted out of shift register 650. Then this high is clocked into flip-flop 659. The output of flip-flop 659 is the $\overline{\text{DATA READY}}$ signal 186, which upon transitioning from low to high, signifies that the contents of shift register 650 have been shifted out. At the same time, the inverted output $\overline{Q}$ of flip-flop 659 is applied to the preset input of flip-flop 659. Once flip-flop 659 is set, the inverted output $\overline{Q}$ becomes low forcing flip-flop 659 to remain set until once again cleared by a negative going pulse on $\overline{\text{LATCH}}$ signal 185.

AND gate 665 is used to detect a count of "31" in counter 660 when the INPUT/PROG signal 184 is low, signifying that 32 bits of programming information had been latched into shift register 650. In that case, the output of inverter 655 will be high and is applied to one input of AND gate 665. The other inputs of AND gate 665 are connected to the QD and QE outputs of counter 660, and the output of AND gate 661. These inputs will all be high when a count of 31 has been attained in the counter 660. Then the output of AND gate 665 will be high and is applied to the other input of OR gate 663 to set flip-flop 659 as before.

The programming terminal 25 is a microprocessor based system which employs typical data, address, and control buses 670–672. The buses 670–672 are connected to the programming terminal interface 24 and allow the latches 652 to be loaded with the desired programming information by successively gating words, usually 8 bits at a time, into the latches 652 in well known fashion.

The programming terminal interface 24 also includes a discrete input 673 and a discrete output 674 which are also connected to the buses 670–672 in well known fashion. Once the programming terminal 25 has deposited the desired programming information in the latches 652 the discrete output 674 is pulsed low temporarily to set a flip-flop 675. The inverted output $\overline{Q}$ of flip-flop 675 is the $\overline{\text{PROG AVAIL}}$ signal 183, which indicates to the TX Timing and Control circuit 180 that programming information is available from the Type I Input Mapping circuit 140.

The $\overline{\text{PROG AVAIL}}$ signal 183 is also connected to the discrete input 673 so that the programming terminal 25 can monitor the state of the $\overline{\text{PROG AVAIL}}$ signal 183. As described below, flip-flop 675 is reset upon completion of transmitting the programming information. By monitoring the $\overline{\text{PROG AVAIL}}$ signal 183 on the discrete input 673, the programming terminal 25 is able to ascertain when the programming information has been accepted and transmitted.

Flip-flop 675 is reset upon completion of shifting the programming information out of shift register 650 as follows. The INPUT/PROG signal 184 is connected to one input of OR gate 676. The other input of OR gate 676 is connected to the $\overline{\text{DATA READY}}$ signal 186. When the INPUT/PROG signal 184 is low signifying that programming information has been latched into shift register 650, and the $\overline{\text{DATA READY}}$ signal 186 makes a transition from low to high, then a rising edge on the output of OR gate 676 is applied to the clock input of flip-flop 675, clocking in a fixed low on the D input of flip-flop 675. The $\overline{\text{PROG AVAIL}}$ signal 183 is thereby restored to a high state signifying that programming information is no longer available, and the programming cycle is complete.

Figure 22:
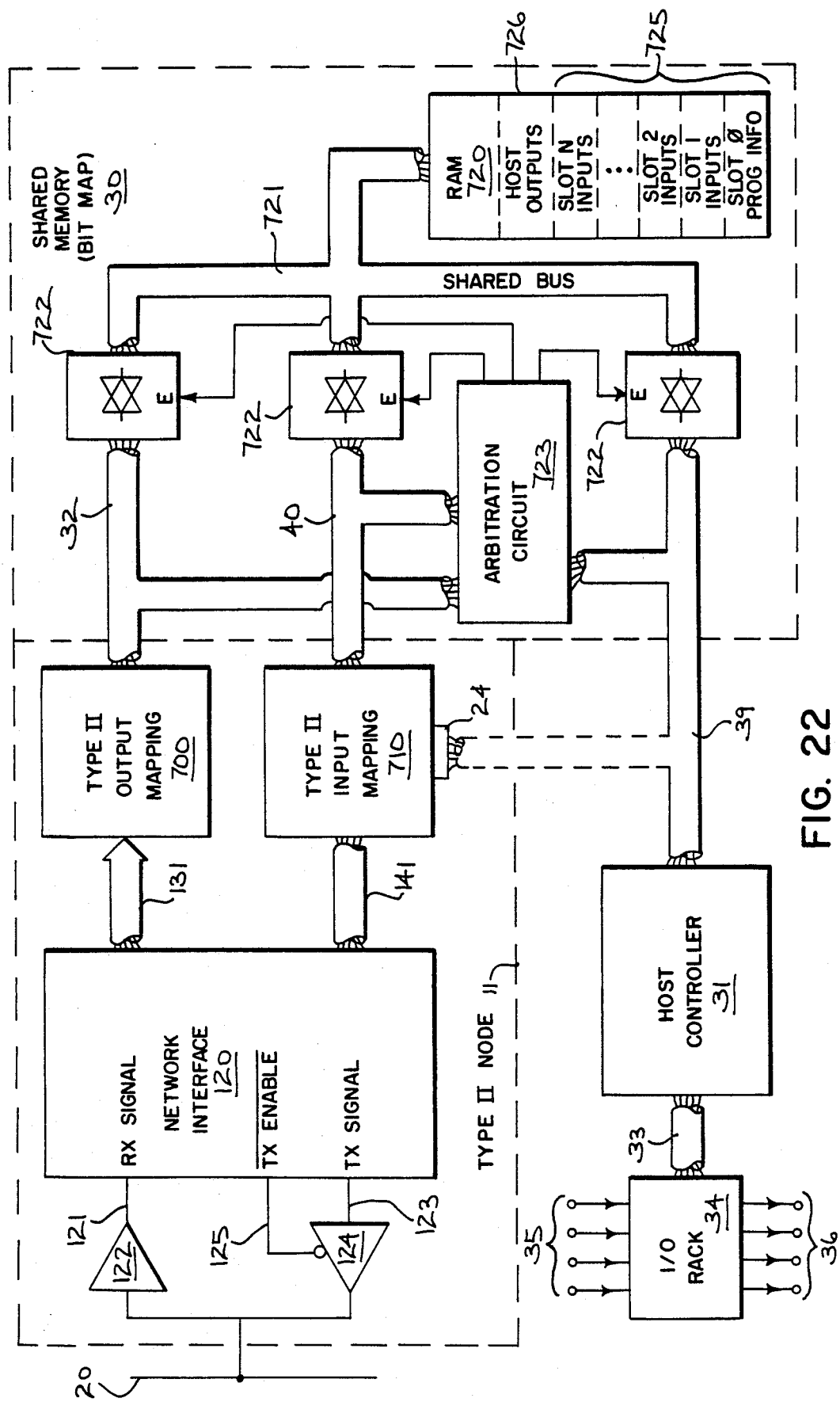
FIG. 22 is a block diagram of a Type II node which forms a part of the network of FIG. 1.

Referring to FIG. 22, a second embodiment of the invention is the Type II node 11. The Type II node 11 contains the same network interface 120 and connections to the bus 20 as the Type I node 10. However, the way in which the input and output bits are mapped is completely different, which illustrates the great amount of flexibility which is possible for mapping bits with this invention. The Type II node 11 includes a Type II Output Mapping circuit 700 and a Type II Input Mapping circuit 710 which connect to the network interface 120 using the same busses 131 and 141, respectively, as the Type I node 10.

The shared memory 30 contains a Random Access Memory (RAM) 720. The RAM 720 is connected to a shared bus 721 which contains the address, data, and control signals needed to read and write the RAM 720. The shared bus 721 may be connected to either bus 32 from the Type II Output Mapping circuit 700, bus 40 from the Type II Input Mapping circuit 710, or bus 39 from the host controller 31.

The connection between these buses 32, 40, and 39, and the shared bus 721 is made by enabling one of three bidirectional transceivers 722. Each of the transceivers 722 has an enable input which is driven by an Arbitration circuit 723. The Arbitration circuit 723 monitors all of the buses 32, 40, and 39 to determine which of them is requesting access to the RAM 720.

If only one of the buses 32, 40 and 39 is requesting access to the RAM 720, then the enable input for the transceiver 722 corresponding to the requesting bus is enabled. If more than one of the buses 32, 40, and 39 is requesting access to the RAM 720 at the same time, then the Arbitration circuit 723 enables the transceiver 722 corresponding to one of the requesting buses based on a priority scheme. Bus 40 from the Type II Input Mapping circuit 710 is given the highest priority, bus 32 from the Type II Output Mapping circuit 700 the second priority, and bus 39 from the host controller 31 the lowest priority. There is sufficient buffering in the mapping circuits 700 and 710 and the host controller 31 to insure that no data is lost while waiting for access to the RAM 720.

The host controller 31 may optionally be connected to allow programming messages to be sent by extending the bus 39 to the programming port 24 of the Type II Input Mapping circuit 710. In that case a separate programming terminal 25 is not required and the host controller 31 can program the Type I Output Mapping circuits 130 directly.

Still referring to FIG. 22, the Type II Output Mapping circuit 700 accepts input bits serially over the bus 131 from the network interface 120 and buffers them into an eight bit parallel byte. After receiving either a complete 8 bit byte or a partial byte at the end of a message, a request is made to the Arbitration circuit 723 for a memory cycle to write that byte into the RAM 720. When the memory cycle is granted, the Type II Output Mapping circuit 700 writes the byte just input into the RAM 720 at a location which corresponds to the NODE #182 of the node which transmitted the input.

The RAM 720 is therefore organized with dedicated areas 725 for storing the inputs from each node on the network. 32 bytes are reserved for each slot so that the maximum of 256 input bits from any one node can be accommodated.

If a program frame 51 is received during slot 0, then that information is stored in the area of the RAM 720 which corresponds to slot #0, the same as inputs from other nodes. The host controller 31 then periodically interrogates the dedicated areas 725 to obtain the most current values for the inputs from all other nodes on the network, and the programming information from slot #0.

When it is time for the Type II Input Mapping circuit 710 to transmit its input values, a request is made to the Arbitration circuit 723 for a memory cycle. When that memory request is granted, the Type II Input Mapping circuit 710 reads from the RAM 720 at an area dedicated to contain the most current host outputs 726.

Once loaded into the Type II Input Mapping circuit 710, the host outputs 762 are shifted serially over bus 141 for transmission by the network interface 120. The host output 726 are placed in the RAM 720 by the host controller 31 and may be obtained from inputs 35 connected to the host controller 31 or from internal processes within the host controller 31.

Figure 23:
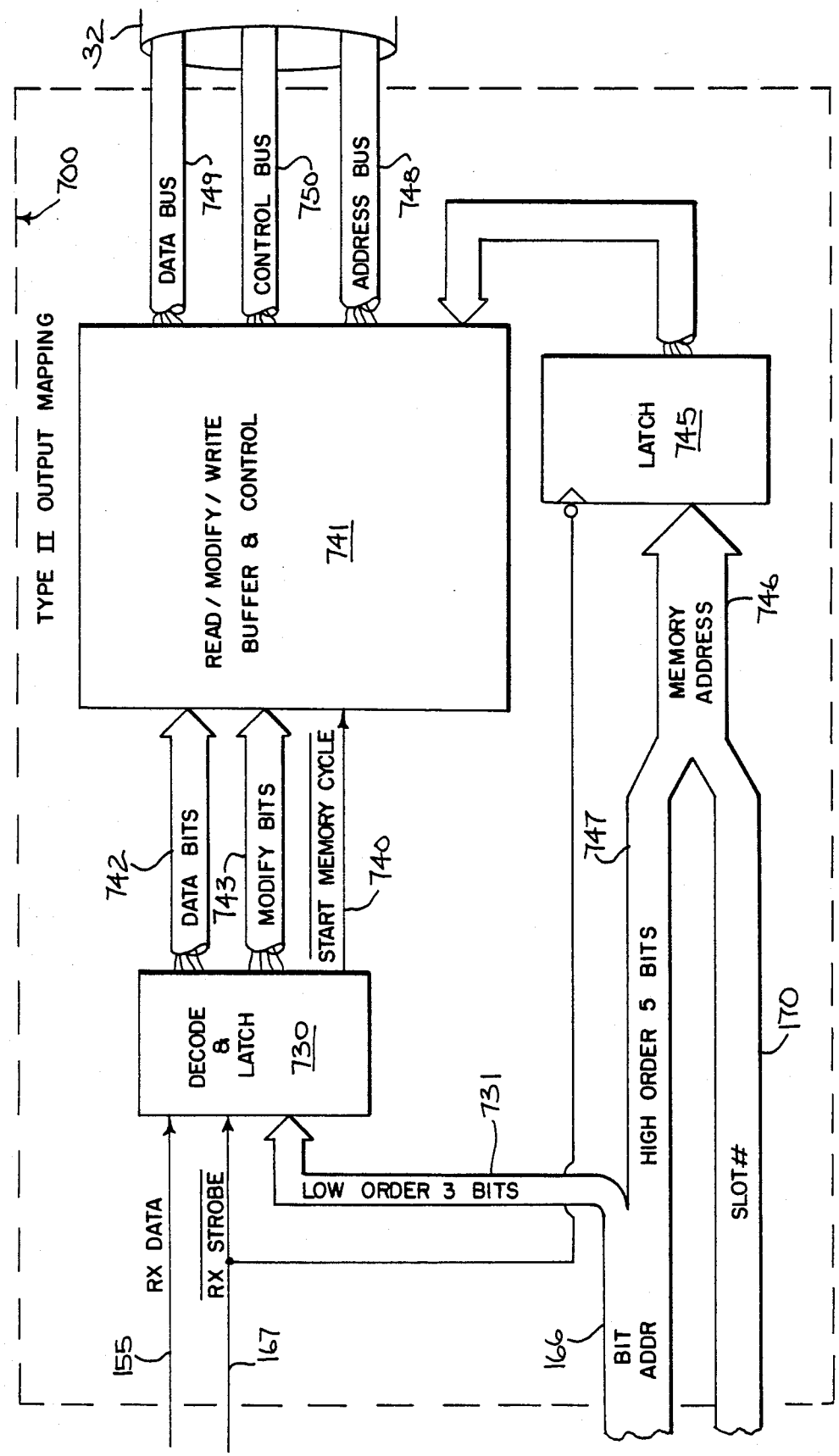
FIG. 23 is a block diagram of the Output Mapping circuit of the Type II node of FIG. 22.
Figure 24:
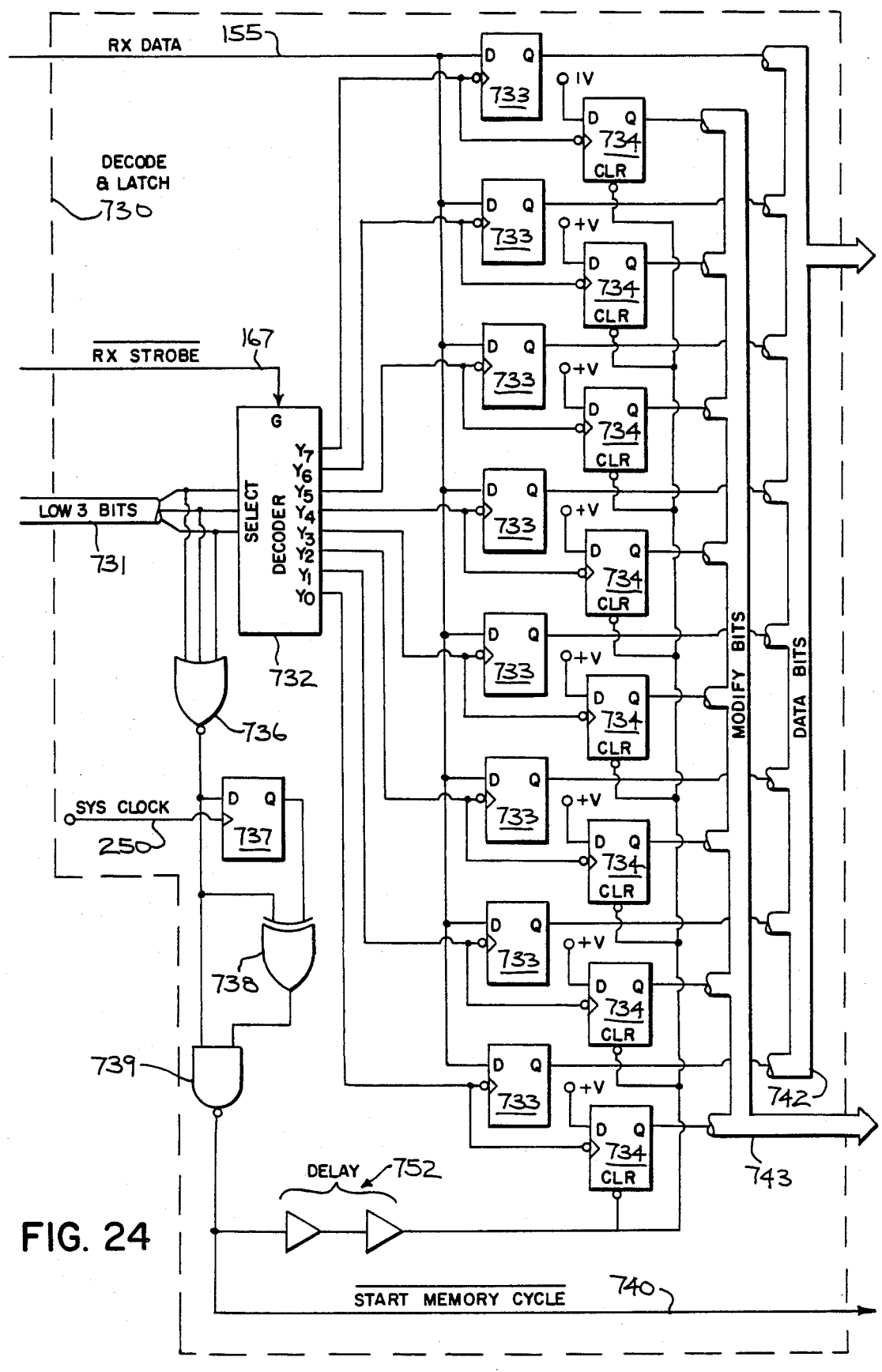
FIG. 24 is a circuit diagram of the Decode and Latch circuit of the Output Mapping circuit of FIG. 23.

Referring to FIGS. 23 and 24, the serial data on the RX DATA line 155 is converted to eight parallel bits by a Decode and Latch circuit 730. The Decode and Latch circuit 730 receives as an input the low order thre bits 731 of the BIT ADDR 166. These low order thre bits 731 indicate which of the eight bits to be buffered is currently being received.

Inside the Decode and Latch circuit 730 (FIG. 24) the low order three bits 731 are applied to the inputs of a three line to eight line decoder 732. The gate input of the decoder 732 is connected to the $\overline{\text{RX STROBE}}$ signal 167. The outputs Y0–Y7 of decoder 732 are each respectively connected to the clock input of a data flip-flop 733 and a "MODIFY" flip-flop 734. The RX DATA signal 155 is connected to the D input of each data flip-flop 733, while the D input of each "MODIFY" flip-flop 734 is connected to a constant high. In this manner, the data from the RX DATA signal 155 is latched into the data flip-flop 733 while the corresponding "MODIFY" flip-flop 734 is set high.

The purpose of these "MODIFY" flip-flops is to indicate which data bits have been received and therefore to be written into the RAM 720. This is necessary because not all eight bits may be written in each cycle. This can occur for two possible reasons. First, it is possible that a bit error may occur on one of the input bits. In that case, the low order three bits 731 will be incremented without receiving a pulse on the $\overline{\text{RX STROBE}}$ signal 167. Secondly, it is possible that the number of input bits received is not an exact multiple of eight, in which case the last byte to be received will only be a partial byte. The "MODIFY" flip-flops 734 are therefore used to indicate which of the corresponding data flip-flops 733 contain valid data and are to be written into the RAM 720.

The low order three bits 731 of the BIT ADDR 166 are also each connected to an input of NOR gate 736. The output of NOR gate 736 will therefore be high whenever the low order three bits 731 are all equal to zero. Flip-flop 737, EXCLUSIVE-OR gate 738, and NAND gate 739, are used to produce a single negative going pulse on the output of NAND gate with a duration equal to one cycle of the SYSTEM CLOCK 250 whenever the output of NOR gate 736 makes a transition from low to high, in other words when the low order three bits 731 become zero. This occurs between each eight bits of a stream of input bits, and at the end of an input message when the RX Bit Counter and Control circuit 165 is reset.

The output of NAND gate 739 is a $\overline{\text{START MEMORY CYCLE}}$ signal 740 and is connected to a Read/Modify/Write Buffer and Control circuit 741. The negative going pulse on the $\overline{\text{START MEMORY CYCLE}}$ signal 740 causes the Read/Modify/Write Buffer and Control circuit 741 to initiate a memory cycle. The $\overline{\text{START MEMORY CYCLE}}$ signal 740 is also connected through a pair of delay elements 752 to the clear input of each "MODIFY" flip-flop 734, thereby resetting them to zero before starting to input the next eight bits.

The output Q of each data flip-flop 733 is connected in parallel to a "DATA BITS" bus 742 and the output Q of each "MODIFY" flip-flop 734 is connected in parallel to a "MODIFY BITS" bus 743. On the falling edge of the $\overline{\text{START MEMORY CYCLE}}$ signal 740, the DATA BITS bus 742 and MODIFY BITS bus 743 are latched into the Read/Modify/Write Buffer and Control circuit 741 and a memory cycle is initiated.

To derive the address for the RAM 720 at which the byte just received is to be written, the $\overline{\text{RX STROBE}}$ signal 167 is connected as the clock input to a latch 745. Each time the $\overline{\text{RX STROBE}}$ signal 167 latches a data bit into the Decode and Latch circuit 730, latch 745 is also clocked and loads a memory address 746 which is composed of the high order five bits 747 of the BIT ADDR 166 and the SLOT NUMBER 170. The memory address 746 therefore specifies the address corresponding to a SLOT NUMBER 170 and contains a byte count comprised of the high order five bits 747 of the BIT ADDR 166 to accommodate receiving an arbitrary number of inputs during a single data frame 50, e.g. multiple bytes. On the falling edge of the $\overline{\text{START MEMORY CYCLE}}$ signal 740, the output of latch 745 is loaded by the Read/Modify/Write Buffer and Control circuit 741.

The Read/Modify/Write Buffer and Control circuit 741 then contains all the information necessary to update the RAM 720. The bus 32 comprises a data bus 749, a control bus 750, and an address bus 748. The Read/Modify/Write Buffer and Control circuit 741 uses these buses 748-750 to first request a read cycle from the Arbitration circuit 723.

When the read request is granted, the address loaded previously from latch 745 is applied to the address bus 748, and the eight bit byte at that location in the RAM 720 is input over data bus 749. The current contents of that byte are then loaded with the bits received from the DATA BITS bus 742 for each bit position in which the corresponding bit from the MODIFY BITS bus 743 is high. If any of the MODIFY BITS 743 are low, the corresponding bit in the current contents of RAM 720 just read is not changed.

The resulting modified byte is then written back to the RAM 720 by requesting a write cycle from the Arbitration circuit 723 and writing the modified byte back to the RAM 720 at the same address from which it was read. Since the Decode and Latch circuit 730 buffers eight serial bits, the Read/Modify/Write Buffer and Control circuit 741 has an amount of time equal to eight bit times to complete the read/modify/write cycle, which is more than sufficient.

Figure 25:
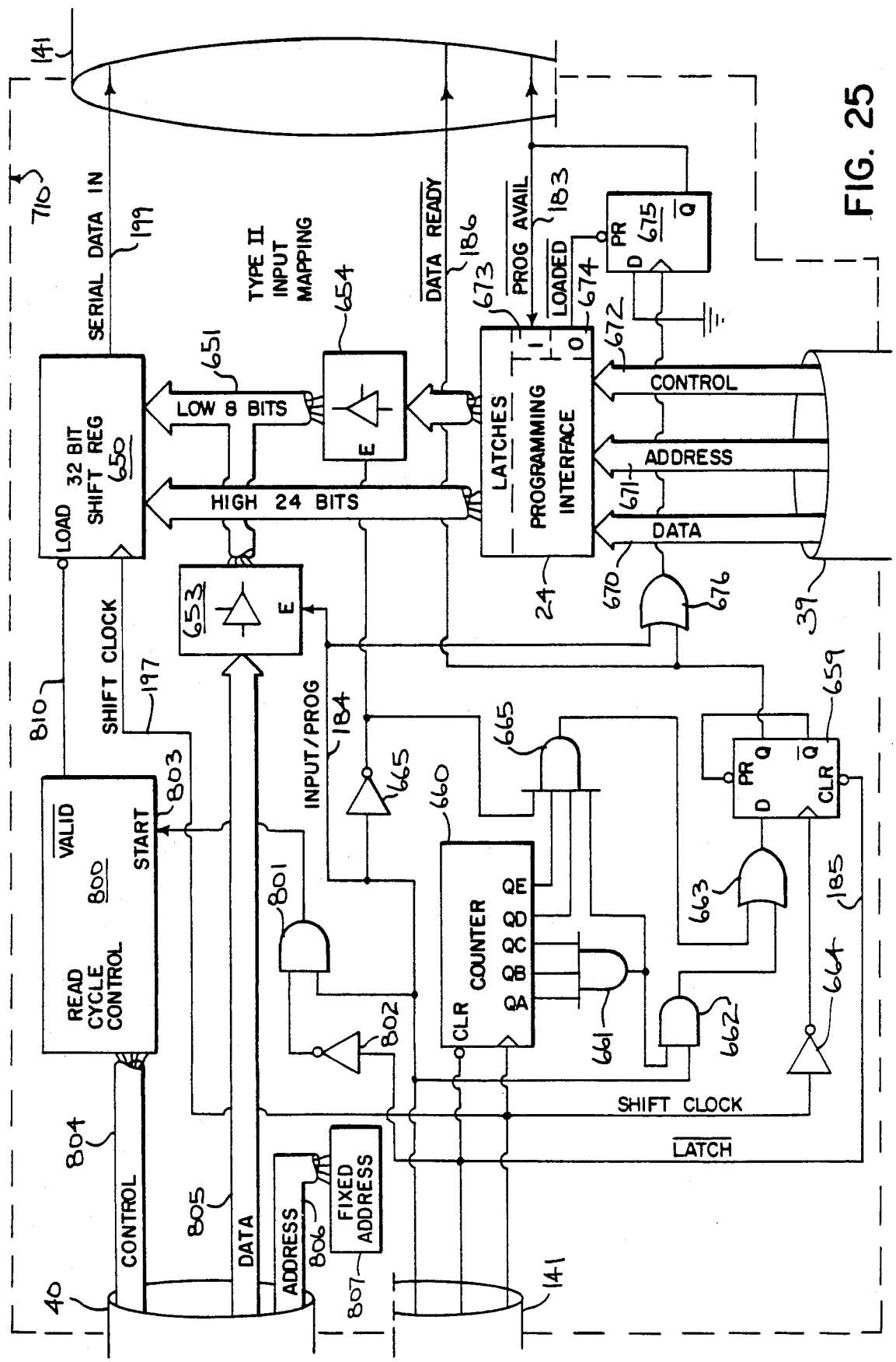
FIG. 25 is a block diagram of the Input Mapping circuit of the Type II node of FIG. 22.

Referring to FIG. 25, the Type II Input Mapping circuit 710 operates in substantially the same way as the Type I Input Mapping circuit 140 described above in relation to FIG. 21, with the exception that the source for the input bits loaded into shift register 650 is the RAM 720 instead of the level translators 142.

In the Type II Input Mapping circuit 710 a dedicated location 726 in the RAM 720 is reserved for the host outputs. Accordingly, the Type II Input Mapping circuit 710 contains a Read Cycle Control circuit 800 to read the required information at the start of a transmit cycle for a data frame 50. The start of a data frame transmission is detected as follows. The INPUT/PROG signal 184 is connected to one input of AND gate 801. The other input of AND gate 801 is connected to the LATCH signal 185 through inverter 802. The output of AND gate 801 is therefore high whenever input data is to be latched and is connected as a START signal 803 into the Read Cycle Control circuit 800.

On the rising edge of the START signal 803, the Read Cycle Control circuit 800 generates the necessary signals on control bus 804 to request a read cycle from the Arbitration circuit 823. When the read cycle is granted, the data from RAM 720 is connected via bus 805 to the tri-state drivers 653. Since the INPUT/PROG signal 184 must be high in order for the read cycle to take place, tri-state driver 653 is enabled and the data on bus 805 is coupled through to bus 651 and into shift register 650.

The address at which the read cycle from RAM 720 is to take place is a fixed address 807 supplied on bus 806. The fixed address 807 corresponds to the location of the host outputs 726 in the RAM 720, which is outside the area 725 dedicated to contain input values. Since in this embodiment the Type II node 11 is presumed to have at most one byte of output, only a single byte needs to be read at the fixed address 807. If more than one output byte is to be used per mode, then the RAM 720 can be conveniently allocated by reserving a number of bytes for the host outputs 726. The address bus 806 may then be connected to a counter (not shown) which would be loaded initially with the fixed address 807 and clocked to count up for each byte transmitted.

The Read Cycle Control circuit 800 monitors the control signals 804 to determine when the read cycle has been completed. There is a minimum delay in completing this read cycle since the bus 40, as stated above, is afforded the highest priority by Arbitration circuit 723 in order to get the transmit data into shift register 650 as quickly as possible. When the read cycle has been completed, the Read Cycle Control circuit 800 produces a negative going pulse on a VALID signal 810, which is connected to the load input of shift register 650. The data on bus 805 is thereby latched into shift register 650 and ready for transmission.

Type II Input Mapping circuit 710 thereafter operates identically to the Type I Input Mapping circuit 140, with the SHIFT CLOCK signal 197 shifting out the contents of shift register 650 over the SERIAL DATA IN line 199. The programming terminal interface 24 of the Type II Input Mapping circuit 710 also operates identically with that of the Type I Input Mapping circuit 140, except that the data, address, and control buses 670-672 are connected to the host controller bus 39 instead of a programming terminal bus 145.

Figure 26:
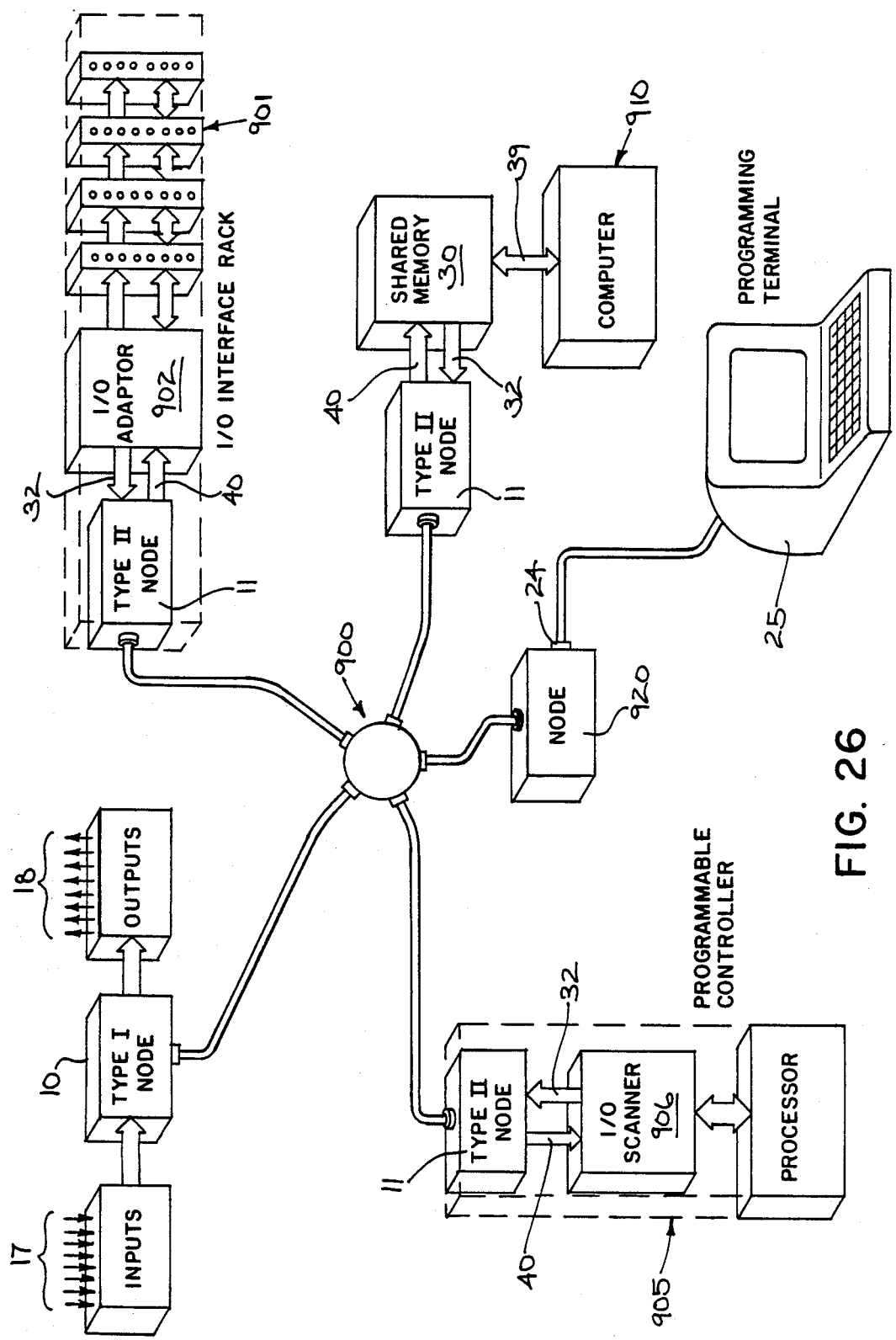
FIG. 26 is a block diagram of a second embodiment of the bit oriented network of this invention.

Referring to FIG. 26, in yet another embodiment of the invention, the bus 20 of FIG. 1 may be replaced within an active star network 900. The only requirement for the transmission medium between the nodes is that the medium must be a broadcast medium allowing all nodes to hear all transmissions.

The embodiment of FIG. 26 represents this invention as it may be applied, for example, in a typical industrial environment. A number of discrete inputs 17 and outputs 18 are serviced by a Type I node 10. A node 920 includes a programming port 24 connected to a programming terminal 25 for proramming the Type I node 10.

I/O interface rack 901 includes an I/O adapter 902 which functions as a host controller 31 for a Type II node 11. In this case, the shared memory 30 is contained within the I/O adaptor 902 and is connected to the Type II node 11 by the input and output buses 32 and 40, respectively.

A programmable controller 905 is included to control the industrial process. Instead of being connected to actual I/O devices, the programmable controller 905 includes an I/O scanner 906 which again contains a shared memory 30 that interfaces to a Type II node 11 over buses 32 and 40. The I/O scanner 906 then obtains I/O information over the network 900 through the Type II node 11 as if the I/O information were actually being scanned locally by the I/O scanner 906. Further, the actual physical location of the input and output points is of no concern to the I/O scanner 906, the information is simply maintained in the shared memory 30 automatically by the network of this invention, greatly simplifying the operation of the I/O scanner 906.

A general purpose computer 910 also connects to the network 900 through a shared memory 30 and a Type II node 11. The general purpose computer 910 may be used, for example, to obtain supervisory information from the programmable controller 905 by using input and output bits on the network 900 as flags, or even as serially coded messages. Because of the fast response time of a network of this invention, using data bits to communicate serial messages is eminently practical.

Finally, it should be apparent to one skilled in the art that many other types of nodes represented by node 920 may be used to communicate over a network of this invention.

For example, nodes may be constructed which contain only output mapping, e.g. no input mapping. Similarly, input only nodes are also practical. Even further, the mapping capability of this invention is so flexible that multiple types of mapping may be combined in a single node. A node may contain input mapping of one Type and output mapping of another Type, or even multiple Types of input or output mapping.

We claim:

1. A bit oriented communications network for transferring information between at least one input resource and at least one output resource, comprising:
   a plurality of nodes interconnected by a broadcast communications medium, said plurality of nodes including at least one sending node and one receiving node;
   input means in at least one sending node connected to at least one of the input resources for accepting one or more input data bits from the input resource and producing a corresponding data field which includes the input data bits, with each input data bit being placed in contiguous bit positions in the data field to form a sequence of input data bits in a predetermined order;
   transmission means in each sending node for broadcasting a message to all of the nodes on the communications medium, the message including the data field from the input means and a source address field which identifies the sending node;
   reception means in at least one receiving node for receiving the message broadcast by the sending node; and
   output means connected to at least one output resource bit in one of the output resources and connected to the reception means, the output means including a map address for each output resource bit which associates each respective output resource bit with one of said contiguous bit positions from one sending node, wherein the output means examines the source address field in the received message, and if the source node identified by the source address field is associated with one of the output resource bits, then the output means extracts the input data bit at the associated bit position from the data field in the received message and sets the state of said at least one output resource bit to correspond to the value of the associated input data bit.

2. The network of claim 1 in which the input resource comprises at least one physical input connected directly to the input means, and the input means includes level translator means for converting the value of the physical input into one of the input data bits for inclusion in the data field.

3. The network of claim 1 in which at least one input resource comprises an external system, each external system being connected to the input means of one of the nodes and each external system including a memory which is shared between the external system and the input means, whereby the input data bits are obtained by the input means from the shared memory.

4. The network of claims 1, 2, or 3 in which the output resource is at least one physical output bit.

5. The network of claim 4 in which the output resource includes multiple physical output bits.

6. The network of claim 4 which includes:
   a programming terminal which generates programming information including a new map address for at least one indicating a selected output means to which the new map address is directed;
   a programming port on one node for accepting the programming information from the programming terminal, the programming port being connected to the transmission means for transmitting a programming message which contains the programming information; and
   programming means in the selected output means for examining the programming information from the reception means to determine if the programming information is directed to the selected output means, and if it is then updating the map address for said at least one selected output resource bit with the new map address contained in the programming message.

7. The network of claims 1, 2, or 3 in which at least one output resource bit comprises a predetermined location in a memory shared between an external system and the output means.

8. The network of claim 1 in which synchronization between the nodes is achieved by having each transmission occur during a time slot which is allocated to each individual node, where the time slot for each node occurs in a round robin sequence with the time slots of all other nodes in the network, and in which reception means is included at each node for synchronizing the time slots between all nodes in the network, each reception means including:
   gap timer means for maintaining a current time slot value indicative of the currently active time slot, the gap timer means being updated each time a message is received to set the current time slot value to a value corresponding to the node which sent the message as identified by the source address field contained in the message, the gap timer means being connected to the transmission means to indicate when the current time slot value is equal to a fixed time slot allocated for transmission from a particular node; and
   gap clock means for incrementing the gap timer means to the next time slot in the round robin sequence immediately after the end of a message.

9. The network of claim 8 in which the gap clock means also increments the gap timer means to the next time slot in the round robin sequence periodically after the end of one message and before the start of a next message is detected, with the period of increments being a fixed, predetermined amount of time greater than twice the maximum one way propagation delay between any two nodes on the network.

10. The network of claims 8 or 9 in which the duration of each time slot is variable and is determined by the amount of time that each individual node transmits.

11. A method for processing data in a receiving node which is a part of a bit oriented communications network which includes one or more additional nodes interconnected by a broadcast communications medium in which at least one of the additional nodes is a sending node capable of originating a broadcast message onto the broadcast communications medium, the receiving node being connected between the communications network and an output resource for processing messages received from the sending node, comprising the steps of:

(a) receiving a message from the broadcast communications medium which was broadcast by the sending node, the received message including a source address field which indicates the source address of the sending node and a data field which includes a set of current input values from an input resource connected to the sending node occupying a contiguous series of bit positions in the data field in a predetermined sequential order;

(b) mapping the current input values in the received message to at least one output resource bit in an output resource, wherein each output resource bit is associated with one of said contiguous bit positions from one sending node, the mapping of step (b) including the steps of:

(i) examining the source address field in the received message, and if the source node identified by the source address field is associated with one of the output resource bits, then extracting the current input value at the associated bit position from the data field in the received message; and (ii) setting the state of said at least one output resource bit to correspond to the value of the associated current input value.

12. The method of claim 11 in which said at least one output resource bit comprises a predetermined location in a shared memory, shared between the receiving node and an external system, and the mapping of step (b)(ii) comprises the step of writing the associated current input value into the shared memory at the predetermined location.

13. The method of claim 11 in which said at least one output resource bit comprises one or more physical output bits.

14. The method of claims 11, 12, or 13 in which step (a) includes the steps of:

(i) testing each bit of the message as it is received;

(ii) if a bit error is detected during reception of the source address field, then skipping step (b) for that message; and (iii) if a bit error is detected while receiving the current input values, then selectively not mapping in step (b) each current input value which is in error.

15. The method of claims 11, 12 or 13 which further includes the steps of:

(c) updating a gap timer, which contains a current time slot value, with a time slot value corresponding to the source address field from the received message;

(d) incrementing the gap timer when the received message ends; and (e) incrementing the gap timer periodically after the end of the received message and before the start of a next message is detected, with the period of increments being a fixed, predetermined amount of time greater than twice the maximum one way propagation delay between any two nodes on the network.

16. A method for processing data in a sending node which is a part of a bit oriented communications network which contains one or more additional nodes interconnected by a broadcast communications medium, comprising the steps of:

(a) transferring at least one input value from an input resource into a data field of an outgoing message buffer in the sending node, the data field occupying a fixed, predetermined position in the outgoing message buffer, and each input value being placed in a unique, predetermined bit position in the data field;

(b) placing a first source address which identifies the sending node into a first source address field in the outgoing message buffer, the outgoing message buffer thereby consisting essentially of the first source address field and data field; and (c) broadcasting the outgoing message buffer onto the broadcast communications medium by performing the steps of:

(i) maintaining a current time slot value contained in a gap timer by receiving other messages on the network, setting the current time slot value to a second source address contained in a second source address field of each said other message received, and incrementing the current time slot value at a predetermined interval when no said other messages are being received;

(ii) comparing the current time slot value with a fixed time slot value assigned for transmission by the sending node; and (iii) if the fixed time slot value assigned for transmission by the sending node is equal to the current time slot value contained in the gap timer, then commencing transmission of the outgoing message buffer.

17. The method of claim 16 in which the input resource comprises a shared memory, shared between the sending node and an external system, and the transferring of step (a) comprises the steps of (i) reading said at least one input value from the shared memory, and (ii) writing each input value into the corresponding bit position in the data field.

18. The method of claim 16 in which the input resource comprises at least one physical input bit connected directly to the sending node, and the transferring of step (a) comprises the steps of (i) reading said at least one input value from the physical input bit, and (ii) writing each input value into the corresponding bit position in the data field.

19. A method for processing data in a node which is a part of a bit oriented communications network which contains a plurality of nodes, comprising the steps of:

(a) receiving a message which was broadcast from a sending node on the network, the received message including the source address of the sending node and current input values from an input resource connected to the sending node;

(b) mapping the input values in the received message to an output resource;

(c) updating a gap timer, which contains a current time slot value, with a time slot value corresponding to the source address from the received message;

(d) incrementing the gap timer when the received message ends;

(e) incrementing the gap timer periodically after the end of the received message and before the start of a next message is detected, with the period of increments being a fixed, predetermined amount of time greater than twice the maximum one way propagation delay between any two nodes on the network;

(f) after incrementing the current time slot value at the end of the received message, comparing the current time slot value with a fixed time slot value assigned for transmission by the node; and (g) if after performing step (f) the current time slot value is equal to the fixed time slot value, then transmitting an outgoing message by performing the steps of:
- (h) mapping at least one input value from an input resource into a data field of an outgoing message buffer;
- (j) placing a source address field which identifies the node into the outgoing message buffer, the outgoing message buffer thereby consisting essentially of the source address field and data field; and
- (k) broadcasting the outgoing message buffer onto the metwork.

20. The method of claim 19 in which the output resource is a shared memory shared between the node and an external system, and the mapping of step (b) comprises the step of writing the input values into the shared memory at a location which corresponds to the source address.

21. The method of claim 19 in which the output resource includes at least one physical output bit and the mapping of step (b) comprises the steps of:
- (i) comparing the source address contained in the received message to a source address portion of a map address maintained by the node;
- (ii) if a match is found between the source address contained in the received message and the source address portion of the map address, then extracting the input value indicated by a bit address portion of the map address; and
- (iii) transferring the extracted input value to the physical output bit.

22. The method of claims 19, 20, or 21 in which step (a) includes the steps of:
- (i) testing each bit of the received message as it is being received;
- (ii) if a bit error is detected during reception of any bit of the source address, then skipping steps (b) and (c), for that message; and
- (iii) if a bit error is detected while receiving the current input values, then selectively not mapping in step (b) each input value which is in error.

23. The method of claim 22 which further includes the steps of:
- (1) comparing the current time slot value contained in the gap timer with a second fixed time slot value assigned for transmission of programming messages;
- (m) testing a programming port to determine if programming information is available from a programming terminal;
- (n) if the current time slot value is equal to the second fixed time slot value and the programming information is available, then transmitting a programming message containing the programming information.

24. The method of claim 21 in which step (a) includes the step of testing the received message to determine if it is a programming message, and if it is then replacing step (b) with the steps of:
- (o) examining the programming information contained in the programming message to determine if the programming information is directed to the node; and
- (p) if the programming information is directed to the node, then updating the map address with a new map address contained in the programming information.

25. A receiving node which is a part of a bit oriented communications network which includes one or more additional nodes interconnected by a broadcast communications medium in which at least one of the additional nodes is a sending node capable of originating a broadcast message onto the broadcast communications medium, the receiving node being connected between the communications network and an output resource for processing messages received from the sending node, the receiving node comprising:
- reception means for receiving a message from the broadcast communications medium which was broadcast by the sending node, the received message including a source address field which indicates the source address of the sending node and a data field which includes a set of current input values from an input resource connected to the sending node, with the set of current input values occupying contiguous bit positions in the data field to form a sequence of current input values in a predetermined order;
- output means connected to at least one output resource bit in the output resource and connected to the reception means, the output means including mapping means for associating each output resource bit with one of said contiguous bit positions from one sending node, and for examining the source address field in the received message, wherein if the source node identified by the source address field is associated with one of the output resource bits, then the mapping means extracts the current input value at the associated bit position from the data field in the received message and sets the state of said at least one output resource bit to correspond to the value of the associated current input value.

26. The node of claim 25 in which the output resource comprises a shared memory, shared between the node and an external system, and the mapping means includes means for writing the current input value into the shared memory at a location which corresponds to the output resource bit.

27. The node of claim 25 in which said at least one output resource bit comprises at least one physical output bit.

28. The node of claims 25, 26 or 27 in which the reception means includes bit error test means for testing each bit of the received message as it is being received and which operates to suppress the entire received message from being processed by the mapping means if a bit error is detected during reception of the source address, and to individually suppress setting the state of each output resource bit for which a bit error is detected while receiving the associated current input values.

29. The node of claims 25, 26 or 27 which further includes:
- gap timer means for maintaining a current time slot value, the current time slot value being updated with a time slot value corresponding to the source address from the received message; and
- gap clock means for incrementing the current time slot value when the received message ends and incrementing the current time slot value periodically after the end of the received message and before the start of a next message is detected, with the period of increments being a fixed, predetermined amount of time greater than twice the maximum one way propagation delay between any two nodes on the network.

30. A sending node which is a part of a bit oriented communications network which includes one or more additional nodes interconnected by a broadcast communications medium, the sending node comprising:

input means for transferring at least one input value from an input resource into a data field of an outgoing message buffer, the data field occupying a fixed, predetermined position in the outgoing message buffer, and each input value being placed in a unique, predetermined bit position in the data field, and for placing a first source address which identifies the sending node into a first source address field in the outgoing message buffer, the outgoing message buffer thereby consisting essentially of the first source address field and data field;

reception means for receiving other messages from the network, each said other message including a second source address contained in a second source address field; and transmission means for broadcasting the contents of the outgoing message buffer onto the broadcast communications medium, the transmission means including (i) a gap timer containing a current time slot value, (ii) means for updating the current time slot value by setting the current time slot value to the second source address of each said other message received by the reception means and incrementing the current time slot value at a predetermined interval when no said other messages are being received, and (iii) means for comparing the current time slot value with a fixed time slot value assigned for transmission by the node, whereby transmission of the outgoing message buffer is commenced when the fixed time slot value is equal to the current time slot value.

31. The sending node of claim 30 in which the input resource comprises a shared memory, shared between the sending node and an external system, and the input means includes means for reading said at least one input value from the shared memory.

32. The sending node of claim 30 in which the input resource includes at least one physical input bit connected directly to the sending node, and the input means includes means for reading said at least one input value from said at least one the physical input bit.

33. A node which is a part of a bit oriented communications network, comprising:

reception means for receiving a message which was broadcast from a sending node on the network, the received message including the source address of the sending node and current input values from an input resource connected to the sending node;

output mapping means for mapping the input values in the received message to an output resource;

gap timer means for maintaining a current time slot value, the current time slot value being updated with a time slot value corresponding to the source address from the received message;

gap clock means for incrementing the current time slot value when the received message ends and incrementing the current time slot value periodically after the end of the received message and before the start of a next message is detected, with the period of increments being a fixed, predetermined amount of time greater than twice the maximum one way propagation delay between any two nodes on the network;

input mapping means for mapping at least one input value from an input resource into a data field of an outgoing message buffer and placing a source address field which identifies the node into the outgoing message buffer, the outgoing message buffer thereby consisting essentially of the source address field and data field;

transmission means which includes first comparison means for comparing the current time slot value with a first fixed time slot value assigned for transmission by the node, whereby transmission of the outgoing message buffer is commenced when the current time slot value is equal to the first fixed time slot value.

34. The node of claim 33 in which the output resource is a shared memory shared between the node and an external system, and the output mapping means includes means for writing the input values into the shared memory at a location which corresponds to the source address.

35. The node of claim 33 in which the output resource includes at least one physical output bit and the output mapping means includes:

comparison means for comparing the source address of the sending node contained in the received message to a source address portion of a map address maintained in the comparison means;

extraction means for extracting the input value indicated by a bit address portion of the map address if a match is found between the source address by the comparison means; and means for transferring the extracted input value to the physical output bit.

36. The node of claims 33, 34, or 35 in which the reception means includes bit error test means for testing each bit of the received message as it is being received and which operates to suppress the entire received message from being mapped by the output mapping means if a bit error is detected during reception of the source address, and to suppress individual bits of the current input values from being mapped by the output mapping means for each individual bit in which a bit error is detected while receiving the current input values.

37. The node of claim 36 which includes a programming port for accepting programming information from a programming terminal, the programming information including a new map address and a destination field indicating the output resource to which the new map address is directed, and the transmission means includes second comparison means for comparing the current time slot value with a second fixed time slot value assigned for transmission of a programming message which contains the programming information, whereby if the programming information is available from the programming terminal, then transmission of the programming message is commenced when the current time slot value is equal to the second fixed time slot value.

38. The node of claim 35 in which the output mapping means includes means to update the map address with a new map address contained in a programming message if the received message is a programming message and if the programming message is directed to the output resource connected to the node.

* * * * *

UNITED STATES PATENT AND TRADEMARK OFFICE
CERTIFICATE OF CORRECTION

PATENT NO. : 4,897,834

DATED : January 30, 1990

INVENTOR(S) : James R. Peterson et al.

It is certified that error appears in the above-identified patent and that said Letters Patent is hereby corrected as shown below:

In Column 1,
 at Line 31, Change "connectios" to --connections--

In Column 1,
 at Line 31, change "in" to --In--

In Column 4,
 at Line 58, change "type I" to --Type I--.

In Column 6,
 at Line 19, Change "Type Ii" to --Type II--

In Column 9,
 at Line 60, change "tru" to --true--

In Column 13,
 at Line 20, change "5" to --53--.

UNITED STATES PATENT AND TRADEMARK OFFICE
CERTIFICATE OF CORRECTION

PATENT NO. : 4,897,834
DATED : January 30, 1990
INVENTOR(S) : James R. Peterson et al.

It is certified that error appears in the above-identified patent and that said Letters Patent is hereby corrected as shown below:

In Column 13,
    at Line 31, Change "addrss" to --address--

In Column 16,
    at Line 53, change "2232" to --223--

In Column 17,
    at Line 13, change "SHIT" to --SHIFT--.

In Column 19,
    at Line 35, Change "AD" to --QD--

In Column 23,
    at Line 19, change "GAPa" to --GAP--

In Column 29,
    at Line 64, change "rmain" to --remain--.

In Column 35,
    at Line 54, Change "thre" to --three--

In Column 35,
    at Line 55, change "thre" to --three--

UNITED STATES PATENT AND TRADEMARK OFFICE
CERTIFICATE OF CORRECTION

PATENT NO. : 4,897,834

DATED : January 30, 1990

INVENTOR(S) : James R. Peterson et al.

It is certified that error appears in the above-identified patent and that said Letters Patent is hereby corrected as shown below:

Col. 40,

In Claim 6,
    at Line 4, change "at least one indicating a selected output means" to --at least one selected output resource bit and a destination field indicating a selected output means--.

Signed and Sealed this

Thirteenth Day of October, 1992

*Attest:*

DOUGLAS B. COMER

*Attesting Officer*      *Acting Commissioner of Patents and Trademarks*